United States Patent
Moffitt et al.

(10) Patent No.: US 10,940,630 B2
(45) Date of Patent: Mar. 9, 2021

(54) METHODS FOR PROCESSING AND PLASTICIZING POLY(ETHYLENE FURANOATE) PREFORMS BY WATER SORPTION

(71) Applicant: THE COCA-COLA COMPANY, Atlanta, GA (US)

(72) Inventors: Ronald D. Moffitt, Spartanburg, SC (US); Robert Kriegel, Decatur, GA (US); Mikell W. Schultheis, Acworth, GA (US); Yu Shi, Branchburg, NJ (US)

(73) Assignee: THE COCA-COLA COMPANY, Atlanta, GA (US)

( * ) Notice: Subject to any disclaimer, the term of this patent is extended or adjusted under 35 U.S.C. 154(b) by 378 days.

(21) Appl. No.: 15/511,382

(22) PCT Filed: Sep. 15, 2015

(86) PCT No.: PCT/US2015/050241
§ 371 (c)(1),
(2) Date: Mar. 15, 2017

(87) PCT Pub. No.: WO2016/044305
PCT Pub. Date: Mar. 24, 2016

(65) Prior Publication Data
US 2018/0154570 A1 Jun. 7, 2018

Related U.S. Application Data

(60) Provisional application No. 62/051,165, filed on Sep. 16, 2014.

(51) Int. Cl.
*B29C 49/00* (2006.01)
*B29B 13/06* (2006.01)
(Continued)

(52) U.S. Cl.
CPC .......... *B29C 49/0005* (2013.01); *B29B 13/00* (2013.01); *B29B 13/06* (2013.01);
(Continued)

(58) Field of Classification Search
CPC ..... B29C 49/0005; B29B 13/00; B29B 13/06; B65D 1/0207; B29K 2023/06; B29K 2067/00; B29L 2031/712
See application file for complete search history.

(56) References Cited

U.S. PATENT DOCUMENTS 6,406,661 B1  6/2002  Schloss
2012/0258299 A1 10/2012  Matsuda et al.
(Continued)

FOREIGN PATENT DOCUMENTS

WO  WO-199961220  * 12/1999 ............ B29C 49/42
WO  2013062408 A1  5/2013
(Continued)

OTHER PUBLICATIONS

PCT International Search Report and Written Opinion for International Application No. PCT/US2015/050241 dated Dec. 23, 2015.
(Continued)

*Primary Examiner* — Robert S Walters, Jr.
(74) *Attorney, Agent, or Firm* — Eversheds Sutherland (US) LLP

(57) ABSTRACT

This disclosure provides effective methods for expanding the processing window for poly(ethylene furanoate) (PEF) and poly(ethylene furanoate) co-polymer (PEF co-polymer) polyester preforms, such that these preforms can be beneficially used in the fabrication of bottles and containers, including bottles for carbonated soft drinks. The processing window is expanded by, for example, pre-conditioning the PEF or PEF co-polymer preform prior to stretch blow-molding by contacting the PEF or PEF co-polymer preform (Continued)

with water or high (>50%) relative humidity air for a desired time period and at a temperature greater than or equal to ambient temperature, to take advantage of the unique and unexpected properties afforded the preform by water sorption at these temperatures.

15 Claims, 24 Drawing Sheets

(51) Int. Cl.
    *B29B 13/00*     (2006.01)
    *B65D 1/02*     (2006.01)
    *B29K 67/00*     (2006.01)
    *B29L 31/00*     (2006.01)

(52) U.S. Cl.
    CPC ........ *B65D 1/0207* (2013.01); *B29K 2023/06* (2013.01); *B29K 2067/00* (2013.01); *B29L 2031/712* (2013.01)

(56) References Cited

U.S. PATENT DOCUMENTS

| | | |
|---|---|---|
| 2013/0011631 A1 | 1/2013 | Sakellarides et al. |
| 2013/0270212 A1 | 10/2013 | Collias et al. |
| 2014/0065398 A1 | 3/2014 | Siu et al. |
| 2014/0336349 A1* | 11/2014 | Sipos .................. C08G 63/181 528/285 |
| 2017/0306119 A1 | 10/2017 | Moffitt et al. |

FOREIGN PATENT DOCUMENTS

| | | |
|---|---|---|
| WO | 2013182541 A1 | 12/2013 |
| WO | 2014032730 A1 | 3/2014 |
| WO | 2014100265 A1 | 6/2014 |
| WO | 2014101957 A1 | 7/2014 |
| WO | WO-2014101957 A1 * | 7/2014 ......... B65D 71/0096 |
| WO | 2015031910 A1 | 3/2015 |

OTHER PUBLICATIONS

PCT International Search Report and Written Opinion for International Application No. PCT/US2015/050244 dated Jan. 4, 2016.

Burgess, S.K., et al., Chain Mobility, Thermal, and Mechanical Properties of Poly(ethylene furanoate) Compared to Poly(ethylene terephthalate), Macromolecules, 2014, vol. 47, No. 4, pp. 1383-1391. (Abstract).

Australian Examination Report of Application No. 2015317998 dated Oct. 25, 2018.

* cited by examiner

METHODS FOR PROCESSING AND PLASTICIZING POLY(ETHYLENE FURANOATE) PREFORMS BY WATER SORPTION

CROSS REFERENCE TO RELATED APPLICATIONS

This application is a 35 U.S.C. § 371 National stage application of International Patent Application No. PCT/US2015/050241, filed Sep. 15, 2015, which claims priority benefit of U.S. Provisional Application No. 62/051,165, filed Sep. 16, 2014, which is incorporated by reference herein in its entirety.

FIELD OF THE DISCLOSURE

The present disclosure is generally related to methods of using poly(ethylene furanoate) for fabricating polymer-based packaging, particularly for carbonated beverages.

BACKGROUND OF THE DISCLOSURE

Interest in poly(ethylene furanoate) (PEF) polyesters, also termed poly(ethylene-2, 5-furandicarboxylate), as a potential replacement for poly(ethylene terephthalate) (PET) has increased in recent years, largely due to the ability to synthesize PEF from bio-based sources. Generally, the differences between the physical-chemical behavior of PEF versus PET has presented substantial challenges to the wholesale use of PEF in conventional PET-based applications. For example, compared to standard commercial grade PET, the poly(ethylene furanoate) (PEF) polyesters often possess lower crystallinity, crystallize at slower rates, and are entangled to a lesser extent.

Replacing PET with PEF has been particularly difficult when the polyester is used for packaging beverages such as carbonated soft drinks (CSD). One elusive goal has been to provide PEF bottles or containers that are commercially viable by having comparable or even superior properties such as barrier, thermal, and mechanical properties, compared to that of conventional PET. However, the differences in the behavior of these polyesters noted above present significant processing challenges that must be overcome in the design and fabrication of preforms, as well as in the stretch blow molding processing of the preforms in the production of commercially viable PEF bottles.

In order to develop a roadmap for increased use of PEF, particularly as an prospective PET replacement, it has been of interest to examine the differences in the fundamental materials and engineering aspects of PEF and poly(ethylene furanoate) co-polymers (PEF co-polymers) versus PET. In particular, a better understanding of the thermodynamic and kinetic differences between PEF (and co-polymers) and PET in their water sorption properties and other factors that affect plasticization would be useful. It would also be desirable to develop preform design parameters for a preform that is fabricated at least partially or substantially from poly(ethylene furanoate) (PEF) polyesters, based on material-specific processing parameters.

DISCLOSURE OF THE INVENTION

Figure 1:
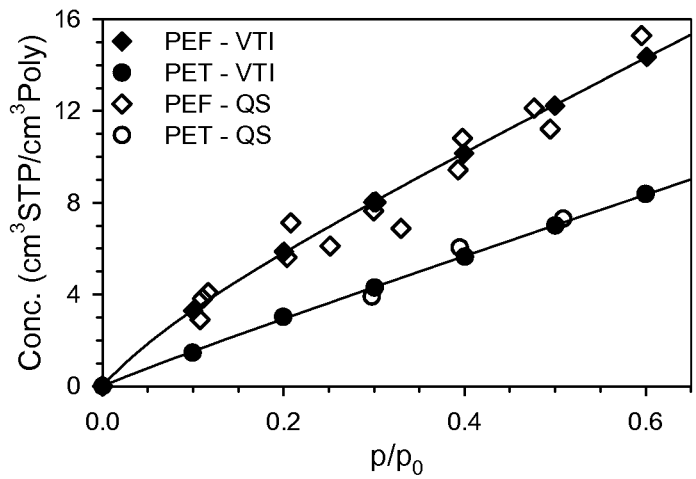
FIG. 1 shows initial equilibrium water sorption values for water at 35° C. in PEF (diamonds) and PET (circles). Solid data points represent measurements from the automated VTI system, while hollow points represent measurements from the quartz spring (QS) apparatus.

This disclosure provides, among other things, methods for expanding the processing window for poly(ethylene furanoate) (PEF) and poly(ethylene furanoate) co-polymer (PEF co-polymer) polyester preforms such that these preforms can be beneficially used in the fabrication of bottles and containers, including bottles for carbonated soft drinks. For example, expanding the processing window for PEF and PEF co-polymer preforms can be carried out by the ambient or higher temperature water (or high humidity air) plasticization of the PEF and PEF co-polymer preform. In one aspect of this disclosure, the modification (plasticization) is carried out on the preform itself rather than on the PEF polymer prior to being injection molded into a preform.

Plasticization can be described in terms of the effect of water on increasing the mobility of the PEF amorphous phase. In this disclosure, it has been discovered that using moisture in conjunction with heat (temperature) to pre-condition the PEF material broadens the stretch blow molding processing range of the PEF material. Therefore, as used herein, terms such as "conditioning" or "pre-conditioning" are used to distinguish the combined effect of moisture and heat, from mere plasticization from the effect of water on the mobility of the PEF amorphous phase, because "conditioning" or "pre-conditioning" can encompass effects to both plasticization and resulting crystalline structure.

While not intending to be bound by theory, there is a difference between what is observed inside versus outside of the preform skin, which appears to be due to the effect of moisture over time. Thus, with respect to using moisture in combination with heat (temperature) to pre-condition the PEF material, it has been discovered that there is a processing "sweet spot", that is optimum conditions that lead to improved performance. For example, too much moisture and temperature can lead to too much crystallization. There can be an optimum range of moisture over time to achieve the preferred morphology, size, and distribution of crystallinity, in accordance with this disclosure. Establishing a distinction between plasticization only and pre-conditioning (plasticization with crystallization) can be beneficial in distinguishing the approach outlined in this application from Applicant's approach that uses cold water sorption only.

This disclosure also provides a comparison of the water sorption properties in poly(ethylene furanoate) (PEF) compared to poly(ethylene terephthalate) (PET), and demonstrates new methods for plasticization of PEF by water sorption. This disclosure is provided in three (3) Sections: Part 1, drawn to the thermodynamics of water sorption, that is, "equilibrium sorption"; Part 2 (including supplemental information), drawn to the kinetics of water sorption, that is "kinetic sorption"; and Part 3, drawn to the thermal analysis of PEF and PEF co-polymer preforms at different ambient or hot water treatment times, and using this analysis to provide PEF-specific processing parameters. It is to be understood that the following detailed description is exemplary and explanatory only and is not restrictive.

Additional aspects will be set forth in part in the description that follows, and in part will be obvious from the description, or may be learned by practice of the aspects described below. The advantages described below will be realized and attained by means of the elements and combinations particularly pointed out in the appended claims. It is to be understood that the following detailed description is exemplary and explanatory only and is not restrictive.

In the following description, numerous specific details are given to provide a thorough understanding of embodiments. The embodiments can be practiced without one or more of the specific details, or with other methods, components, materials, etc. In other instances, well-known structures, materials, or operations are not shown or described in detail to avoid obscuring aspects of the embodiments.

Reference throughout this specification to "one embodiment," "an embodiment," or "embodiments" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Part 1. Equilibrium Sorption

Overview

Equilibrium water sorption properties of amorphous poly (ethylene furanoate) (PEF) and amorphous poly(ethylene terephthalate) (PET) were studied at 35° C. over the entire water activity range. PEF exhibits a largely increased equilibrium water sorption capacity of ~1.8× averaged over the entire concentration range compared to PET, resulting from substitution of the non-polar phenyl ring in PET with the polar furan ring in PEF. Both polyesters exhibit dual-mode sorption up to ~0.6 activity, after which the onset of plasticization produces a noticeable upturn in concentration vs. activity for both polyesters. Excellent agreement was observed between three independent sorption measurement techniques, thereby providing a consistency check for the reported data. Sorption measurements performed at 15, 25, 35, and 45° C. allowed estimation of the effective enthalpy of water sorption for both polyesters, which were similar to the enthalpy of condensation for pure water. The current disclosure demonstrates the importance of structure on sorption and transport properties in these two important polyesters.

1. Introduction

Understanding the sorption and transport behavior of water in polymeric materials can be important for barrier applications involving contact with liquid water and high activity water vapor. Moisture can have significant detrimental effects on mechanical, thermal, and barrier properties of such polymers [1-4], due primarily to plasticization of the matrix. Recent advancements have enabled cost-effective production of poly(ethylene furanoate) (PEF), a new biologically sourced polyester showing enhanced performance compared to petroleum-based PET [5]. Currently, no data exists in the literature regarding the water sorption properties of PEF compared to PET; however, detailed understanding of these properties is needed before PEF can be integrated into the global polyester market.

Previous research into the fundamental properties of PEF has focused on lab scale synthesis and characterization of thermal, mechanical, and crystallization properties, among others [6-10]. Recent work examined performance enhancements for PEF compared to PET related to differences in segmental mobility, which result from differences in ring type and connectivity and the subsequent relative ease of ring flipping mechanisms [11]. Additional work has focused on understanding the fundamental oxygen sorption and transport properties of PEF at various temperatures, where the significantly reduced oxygen permeability for PEF compared to PET was again related to differences in segmental mobility [12]. Water sorption in polyesters is notably more complex than oxygen sorption, since water is more condensable and shows greater interaction with the polymer matrix. Consequently, water is known to plasticize the PET matrix, thereby resulting in a reduction in glass transition temperature [13].

The current disclosure provides a detailed investigation of the equilibrium water sorption properties in amorphous PEF and PET at 35° C. via three different gravimetric techniques, while complementary kinetic sorption data are provided in Part 2 [14]. Compared to PET, PEF exhibits a 1.8× higher water sorption capacity averaged over the entire water activity range. Increased water uptake for PEF reflects the substitution of the non-polar phenyl ring in PET with the polar furan ring in PEF, also in part from the higher free volume in PEF compared to PET [11]. Related observations were made by Rueda et al. [15, 16] for water solubility in poly(ethylene naphthalate) (PEN), where the increased water uptake for PEN compared to PET based on respective differences in free volume was explained.

Both polyesters in the current disclosure exhibited so-called "dual-mode sorption" reflected by concavity in the isotherms up to ~0.6 activity, after which distinct upturns occurred at high water activity. Morphological changes induced at high activity are indicated for both polyesters via distinct sorption hysteresis. These hysteretic responses correlate with the presence of non-Fickian relaxations during sorption at high activity described in Part 2 [14]. Excellent agreement is observed in sorption values over the entire water activity range for all three independent methods, thereby illustrating internal consistency for the reported data. Additional measurements performed at different temperatures allowed calculation of the enthalpy of water sorption in both polyesters, which can be combined with the diffusion activation energy presented in Part 2 to estimate values for the activation energy of water permeation in both polyesters [14]. The current disclosure, in combination with our kinetic sorption counterpart, presents the first in-depth analysis of water transport in PEF.

2. Experimental 2.1 Materials and Film Preparation

Both poly(ethylene furanoate) (PEF) and poly(ethylene terephthalate) (PET) were provided by The Coca-Cola Company and are identical to the materials considered in our previous work [11, 12]. Structural information for both PEF and PET is provided in Table 1. An identical melt-press/quench methodology used in prior work [11] was utilized to prepare amorphous polyester films for sorption testing. De-ionized water was used for all sorption testing, and the nitrogen (UHP grade) carrier gas utilized in the automated sorption system was provided by Airgas (Radnor, Pa.).

TABLE 1

Structural information for poly(ethylene furanoate) (PEF) and poly(ethylene terephthalate) (PET).

| Polymer | Structure |
|---|---|
| Poly(ethylene furanoate) | |
| Poly(ethylene terephthalate) | |

2.2 Sorption Measurements

Gravimetric sorption measurements were recorded for both polyesters between 0-0.95 activity on a TA VTI-SA+ automated vapor sorption analyzer (TA Instruments, New Castle, Del.). This system provides a humidified nitrogen stream by mixing a separate wet and dry stream, which are controlled by two individual mass flow controllers. The resulting humidified stream flows through a dew point analyzer, which continuously measures the water content in the stream and provides feedback to the instrument to allow for automated control. After exiting the dew point analyzer, the humid stream passes over a quartz basket containing the polymer sample, which is attached to a sensitive microgram balance (accuracy±0.1%). Once the mass uptake for a given activity has reached equilibrium, the system automatically proceeds to the next programmed activity step. Equilibrium is realized when the mass uptake over a specified time interval falls below a threshold limit, e.g. 0.0015% mass change in 99 minutes. Multiple equilibration intervals were needed at high activity for both polyesters due to the protracted gradual increase in water uptake resulting from non-Fickian relaxations. Film samples with an approximate thickness of ~160 microns were initially dried in the instrument at 45° C. until constant mass was achieved, prior to commencing sorption. Interval sorption measurements were recorded using water activities ranging from 0-0.9 in increments of 0.1, along with a final value of 0.95. Both sorption and desorption interval measurements were recorded over the entire activity range, followed by a second set of interval sorption and desorption measurements recorded at 0.3, 0.6, and 0.95 activity. The presence of long-term non-Fickian relaxations prevented attainment of true equilibrium mass uptake between the sorption values of 0.7-0.95. However, as will be shown later in this part and in Part 2 of this disclosure [14], the overall implications of this second order effect appear to be negligible.

The McBain quartz spring technique [17] was also used to manually record sorption measurements at 35° C. between the range of 0-0.6 activity. The apparatus has been described elsewhere [18-20]. Film thickness values for different samples ranged from 50-150 microns. Sorption values measured via this technique provide a consistency check when compared to the values determined from the automated VTI system. The McBain measurements were recorded via integral sorption as opposed to the alternative interval sorption methodology used in the VTI instrument.

Both the automated VTI sorption system and the manual quartz spring system are unable to measure water sorption data at complete saturation (i.e. unit activity) due to water condensation. To circumvent this problem, measurements at unit activity were made by submerging thick polymer samples in de-ionized liquid water at 35° C. and periodically removing the samples and recording their masses on a sensitive microgram balance (Mettler Toledo XP6). The samples were sufficiently thick (i.e. ~500 microns for PEF, ~890 microns for PET) so that desorption during the weighing step was insignificant. Mass measurements were recorded until constant uptake was achieved, and the corresponding values represent the integral sorption step between zero and unit activity. Four replicate samples were tested for both polyesters to allow calculation of uncertainty limits via the standard error. Thickness values for the polymer films were measured on the initially dry samples and again after exposure to liquid water at 35° C. for approximately four months to quantify the effect of swelling. This gravimetric sorption technique allows for completion of the sorption data set by covering the entire activity range from zero to unit activity. The water uptake measured via this technique allowed determination of the true equilibrium uptake at unit activity, and provides a consistency check for data obtained using the other sorption techniques.

3. Results and Discussion 3.1 Initial Sorption at 35° C.

Vapor sorption in glassy polymers is often characterized by dual-mode sorption at low activities, and can be described by the dual-mode model [21] in Equation 1. Such data exhibit concavity in concentration with respect to penetrant pressure, and resemble the dual-mode sorption behavior for non-condensable gases (i.e. oxygen [12] and nitrogen [22]) in glassy polymers.

$$C = k_D p + \frac{C_H' b p}{1 + bp} \quad (1)$$

In Equation 1, p represents pressure (atm), $k_D$ is the Henry's law solubility coefficient ($cm^3STP/cm^3Poly \cdot atm$), $C_{H'}$ is the Langmuir capacity constant ($cm^3STP/cm^3Poly$), and b is the Langmuir affinity parameter ($atm^{-1}$). Water sorption data at 35° C. is plotted in FIG. 1 up to 0.6 activity for PEF (diamonds) and PET (circles), and reflects data measured from both the VTI system (solid points) and the quartz spring system (hollow points). Dual-mode model fits from Equation 1 are plotted via the solid lines in FIG. 1, and the corresponding model parameters are listed in Table 2. Excellent agreement between data measured from the two independent sorption methodologies provides a consistency check for the reported data. Noticeable deviation from dual-mode behavior was observed after 0.6 activity, and will be discussed later in the document.

TABLE 2

Dual-mode parameters from Equation 1 for water sorption and subsequent desorption in PEF and PET at 35° C. The uncertainty limits represent the standard error as determined from the curve fitting program. Parameters for desorption are described in Section 3.3

| Activity Range | Sample | $k_D$ ($cm^3STP/cm^3$ Poly · atm) | b ($atm^{-1}$) | $C_{H'}$ ($cm^3STP/cm^3$ Poly) | k* ($cm^3STP/cm^3$ Poly · atm) |
|---|---|---|---|---|---|
| Sorption (0-0.6) | PEF | 354 ± 7 | 141 ± 30 | 3.07 ± 0.4 | 787 ± 110 |
| | PET | 237 ± 16 | 88.7 ± 180 | 0.599 ± 0.9 | 290 ± 140 |
| Desorption (0.95-0) | PEF | 421 ± 25 | 141[a] | 5.82 ± 1.7 | 1240 ± 297 |
| | PET | 274 ± 7 | 88.7[a] | 1.62 ± 0.6 | 418 ± 297 |

[a]The value of b from sorption was fixed in the determination of desorption parameters.

The sorption values reported in FIG. 1 for water in amorphous PET exhibit excellent agreement with the results from various studies in the literature on amorphous PET [1, 15, 23]. Water sorption results from semicrystalline PET can be compared to the current amorphous data via the relationship $S=S_a X_a$ validated by Lasoski and Cobbs [24], where S represents the solubility (analogous to C or $k_D$ from Equation 1) and $X_a$ represents the amorphous fraction of the polymer. Comparisons performed in this manner reveal that the data for amorphous PET in FIG. 1 are slightly lower than the normalized semicrystalline data from various studies [25, 26]. This behavior can be rationalized by the likelihood of increased sorption in the dedensified rigid amorphous fraction surrounding the immediate vicinity of the crystallites in the semicrystalline samples [27].

The Langmuir affinity parameter (b) value of 88.7 $atm^{-1}$ for water in amorphous PET reported in Table 2 agrees well with the value of 94.6 $atm^{-1}$ reported by Shigetomi et al. [26] for water in semicrystalline PET. This result is expected, since the impermeable crystallites should ideally not affect the thermodynamic interaction between the penetrant and polymer sites within the amorphous domain [21]. The $k_D$ and $C_{H'}$ parameters for the semicrystalline sample, however, will be affected by the presence of crystallinity [21]. A value of 237 $cm^3STP/cm^3Poly \cdot atm$ for $k_D$ in the present disclosure (Table 2) is similar in magnitude to the amorphous value of 285 $cm^3STP/cm^3Poly \cdot atm$ by Fukuda et al. [23] and the normalized semicrystalline value of 284 $cm^3STP/cm^3Poly \cdot atm$ from Shigetomi et al. [26]. In contrast to b and $k_D$, the value of $C_{H'}$ in the current disclosure differs significantly from the value reported by Shigetomi et al. [26]. This difference can be explained by potential variations in either sample processing [18], prior thermal history, or from differences in crystallinity [21].

FIG. 1 reveals that water is noticeably more sorptive in PEF compared to PET. This result can be interpreted via the dual-mode parameters listed in Table 2, which show a larger $k_D$ for PEF compared to PET. The interaction parameter (b) for PEF is also significantly larger than the value for PET, thus indicating a stronger interaction between water and the polymer matrix. This behavior is expected, especially when considering the polar nature of the furan ring in PEF compared to the non-polar phenyl ring in PET. Values of b for water in both polyesters are also significantly larger than the respective values for oxygen [12], which is attributable to large differences in critical temperature and the Lennard-Jones force constant for the two penetrants [19]. Aside from $k_D$ and b, a larger $C_{H'}$ is observed for PEF compared to PET and likely originates from the larger fractional free volume (FFV) for PEF [11].

High activity vapor sorption in glassy polymers is often characterized by an upturn in solubility with respect to activity [18, 19, 28-30]. Such isotherms have been described using the modified dual-mode model proposed by Mauze and Stern [31] or more recently by the unified dual-mode model proposed by Guo and Barbari [32]. Satisfactory description of the data can also be provided by the Flory-Huggins representation developed for sorption in rubbery materials via Equation 2 [33], despite both polymers existing in the glassy state at 35° C. In Equation 2, p is the penetrant pressure, $p_0$ is the saturation vapor pressure, $\phi_1$ is the volume fraction of the penetrant, and $\chi$ is the "effective" Flory-Huggins interaction parameter. Calculation of $\phi_1$ can be achieved through Equation 3 [28], where $V_1$ is the molar volume of water at 35° C. (18.02 g/mol divided by 0.9941 g/cm³) and C is the concentration (cm³STP/cm³Poly).

$$\ln\left(\frac{p}{p_0}\right) = \ln\phi_1 + (1-\phi_1) + \chi(1-\phi_1)^2 \quad (2)$$

$$\phi_1 = \frac{C\left(\frac{V_1}{22414}\right)}{1 + C\left(\frac{V_1}{22414}\right)} \quad (3)$$

Use of Equation 2 coupled with a constant interaction parameter signifies the ideal case of random mixing between penetrant and polymer [34-36]. Sorption data for iso-propanol, ethanol, and methanol in PET are well described via this simplified methodology [18, 19]. More complicated sorption cases, however, require a concentration dependent expression for $\chi$ and can suggest deviations from random mixing. Equation 4 represents a simple model for capturing the concentration dependence of $\chi$, where $\chi_0$, $\chi_1$, and $\chi_2$ are constants associated with the model fit [37, 38].

$$\chi = \chi_0 + \chi_1(1-\phi_1) + \chi_2(1-\phi_1)^2 \quad (4)$$

Figure 2:
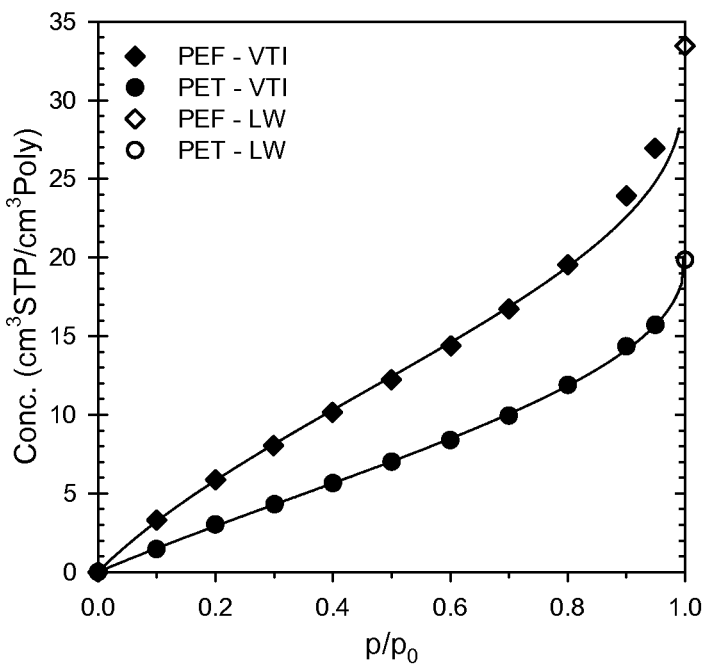
FIG. 2 shows equilibrium sorption values for water at 35° C. in PEF (diamonds) and PET (circles) at 35° C. during the first sorption cycle. Solid data points represent measurements from the automated VTI system, while hollow points at unit activity represent gravimetric sorption data measured in liquid water (LW).
Figure 3:
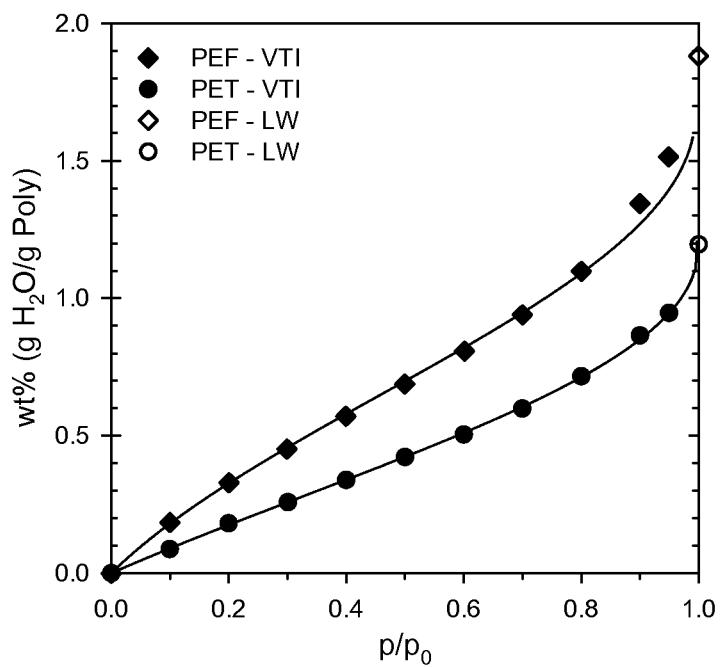
FIG. 3 shows equilibrium sorption values for water at 35° C. in PEF (diamonds) and PET (circles) at 35° C. during the first sorption cycle. Solid data points represent measurements from the automated VTI system, while hollow points at unit activity represent gravimetric sorption data measured in liquid water (LW).

Water sorption data for both polyesters are provided over the entire activity range in FIG. 2 via units of concentration (cm³STP/cm³Poly) and in FIG. 3 via units of wt % (g H₂O/g Poly), along with the Flory-Huggins fit from Equation 2 coupled with a concentration-dependent interaction parameter. A graph of the Flory-Huggins interaction parameter vs. volume fraction water is provided in FIG. 4, with model parameters from Equation 4 for PEF as follows: $\chi_0$=−2273±157, $\chi_1$=4623±318, and $\chi_2$=−2347±161. Corresponding model parameters for PET are: $\chi_0$=−3373±277, $\chi_1$=6800±558, and $\chi_2$=−3424±281. The solid points in FIGS. 2 and 3 represent data measured via the automated VTI sorption system, while the hollow points represent data measured in liquid water.

As mentioned previously, the solid data points in FIGS. 2 and 3 measured between 0.7-0.95 activity from the automated VTI system are slightly lower than the true equilibrium values due to the presence of long-term non-Fickian relaxations at high activity [14] Similar termination of sorption before achieving true equilibrium was also done by Berens, who noted that determination of the true equilibrium sorption isotherm at high activity "would be excessively time-consuming" [39]. The differences between the equilibrium values reported in FIGS. 2 and 3 between 0.7-0.95 activity and the true equilibrium values are minor, due to small "extra" relaxation-induced uptake associated with the non-Fickian relaxations [14]. Further verification of this notion is provided by excellent agreement of the data in FIGS. 2 and 3 (solid points) with the data recorded at unit activity and true equilibrium (hollow points).

From FIG. 2, it is apparent that the water uptake data in both PEF and PET exhibit an upturn in concentration at high activity and that the Flory-Huggins model coupled with a concentration-dependent $\chi$ interaction parameter accurately describes the data. A distinct sorption upturn at high activity for PET has also been reported for both amorphous [23] and semicrystalline PET samples [25, 40], however the degree of upturn in the semicrystalline samples is less significant than in the current disclosure due to the presence of impermeable crystallites acting to stabilize the matrix against swelling. Additional studies have reported linear sorption isotherms for both amorphous [1, 13] and semicrystalline PET [41], which contrasts to the trend observed in the current disclosure. The water sorption value for PET measured in liquid water (hollow circle in FIG. 3) agrees well with the normalized semicrystalline value reported by Park [42] using a similar measurement methodology. Deviations from dual-mode equilibrium behavior above 0.6 activity correlate with the onset of non-Fickian kinetic relaxations observed in FIGS. 4 and 5 of Part 2 for both polyesters [14].

Similar to PET, PEF also exhibits a distinct upturn in concentration at high activities as seen in FIGS. 2 and 3. As mentioned previously, higher water solubility in PEF compared to PET is expected due to the increased polarity of the furan ring compared to the non-polar phenyl ring in PET. The upturn for both polyesters signifies the presence of either water clustering, plasticization, or both, and will be discussed in the next section.

Figure 4:
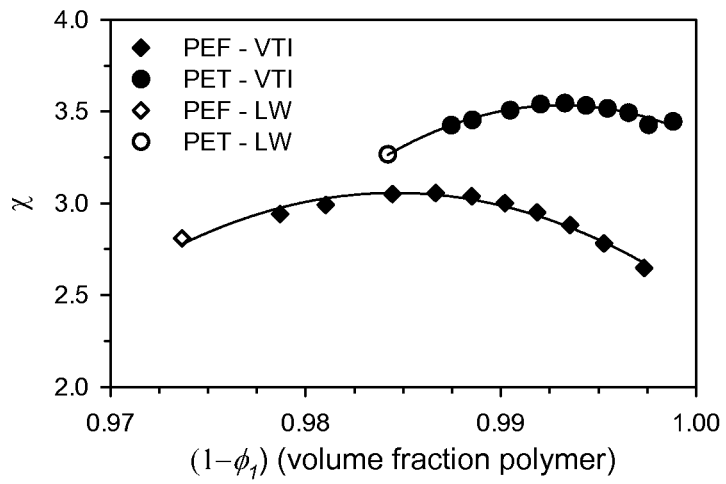
FIG. 4 shows interaction parameters for water at 35° C. in PEF (diamonds) and PET (circles) at 35° C. Solid data points represent measurements from the automated VTI system, while hollow points represent gravimetric sorption data measured in liquid water (LW). Lines represent model fits from Equation 4.

The polymer-solvent interaction parameters plotted in FIG. 4 reveal a distinct concentration dependence for both polyesters. In the context of previous work [34-36], this dependence can reveal a departure from random mixing (i.e. clustering) in the water/polyester system as specified by Flory-Huggins theory. Validation of the interaction parameters from FIG. 4 can be investigated using the solubility parameter ($\delta$) framework, which utilizes the relationship shown in Equation 5 [43].

$$\chi \approx 0.34 + \frac{V_s}{RT}(\delta_1 - \delta_2)^2 \quad (5)$$

In Equation 5, subscripts refer to the penetrant (1) and polymer (2), $V_s$ is the molar volume of the penetrant, R is the universal gas constant, and T is the temperature in Kelvin. Using this framework, it is possible to predict values of the polymer-solvent interaction parameter based solely on the independent properties of the polymer and solvent. While the solubility parameters for PET and PEF are available via group contribution methods [43], considerable inaccuracy exists in estimation of $\delta_1$ for water. In fact, the behavior of water can vary based on the local environment, thereby rendering predictions using Equation 5 somewhat speculative [44]. Qualitative applicability of Equation 5, however, is still justified in comparing polymers with similar values of $\delta_2$ due to the expected similarity of $\delta_1$ for water.

The solubility parameter for PET as estimated by van Krevelen [43] is 20.5 (MJ/m³)$^{1/2}$ and the average value of $\chi$ from FIG. 4 for PET over the entire activity range is 3.47. A value of 3.69 for the average $\chi$ for poly(methyl acrylate) (PMA) was reported by Williams et al. [35]. This value is consistent our value of $\chi$ for PET, since the solubility parameter for PMA (19.9 (MJ/m³)$^{1/2}$[43]) is similar to that reported for PET. An estimate of the solubility parameter for PEF, and polymers in general, can be obtained from the square root of the cohesive energy density (i.e. $\delta_2 \approx (E_{coh})^{1/2}$) [43]. Cohesive energy density values of 560 J/cm³ for PEF and 540 J/cm³ for PET are available from prior work [12], and exhibit a slightly larger $\delta_2$ value for PEF compared to PET. This trend is also reflected experimentally by the average $\chi$ value of 2.92 for PEF, which is lower than the value of 3.47 for PET. A lower $\chi$ value for PEF therefore suggests a higher degree of compatibility with water, which can easily be rationalized when considering the increased polarity of PEF compared to PET.

3.2 Clustering vs. Plasticization

A positive deviation from dual-mode or Henry's law sorption at high vapor activities can indicate simple swelling or clustering, which is the nonrandom distribution of a penetrant within the polymer matrix [34, 45]. Plasticization is indicated when the upturn in solubility accompanies a simultaneous increase in diffusion coefficient, thus giving evidence for increased segmental mobility. Alternatively, clustering is indicated when the upturn in solubility accompanies a decrease in diffusion coefficient, which results from an increase in the effective diameter of the diffusing water (i.e. water molecules cluster together) [35]. Permeation experiments can also be used to differentiate between the two phenomena, as plasticization yields an increase in permeability at high activity while clustering exhibits a more or less constant permeability with increasing activity. Both plasticization [45-48] and clustering [28, 34-36, 49-52] phenomena have been reported for a wide range of penetrants and polymers.

Besides clustering, penetrant plasticization in glassy polymers is quite common. Numerous studies have focused on carbon dioxide-induced dilation and plasticization in polymer membranes [53-61], since such behavior can compromise the separation efficiency of the membrane. Several recent studies have examined related plasticizing effects via various computer modeling techniques [62-65]. Using molecular dynamics simulations, Neyertz and Brown determined that the free volume within a polyimide increased with carbon dioxide-induced swelling [65]. A further study examined both para- and meta-substituted polyimide isomers, and concluded that the swelling behavior upon carbon dioxide sorption resulted from localized relaxations in the respective matrices rather than larger structural changes [66]. Aside from carbon dioxide, which typically plasticizes glassy polymers at relatively high pressures [67], water and organic vapors are also prone to induce plasticization effects in various polymers as evidenced by sorption hysteresis due to increased condensability and interactions with the matrix [18, 45-47, 52, 68].

The onset of clustering or plasticization can be qualitatively determined using the analysis proposed by Zimm and Lundberg [69], which interprets the shape of the equilibrium sorption isotherm in terms of a so-called cluster integral ($G_{11}$). Equation 6 reflects their methodology, where $a_1$ is the activity of the penetrant (i.e. $p/p_o$), $\phi_1$ is the volume fraction of the penetrant, and $\bar{V}_1$ represents the penetrant partial molar volume.

$$\frac{G_{11}}{\bar{V}_1} = -(1-\phi_1)\left[\frac{\partial(a_1/\phi_1)}{\partial a_1}\right]_{p,T} - 1 \quad (6)$$

The quantity $\phi_1 G_{11}/\bar{V}_1$, represents the number of penetrant molecules in a cluster in excess of single, isolated penetrant molecules. Consequently, this parameter is typically non-zero at high activity and approximately zero at low activities, where clustering is less common. As mentioned previously, both clustering and plasticization phenomena exhibit an upturn in solubility at high activities. Equation 6 can be used to detect a departure from ideality and the onset of plasticization or clustering as indicated by values of $\phi_1 G_{11}/\bar{V}_1$ greater than zero. Application of Equation 6 to the sorption data from FIG. 2 for both polyesters is provided in FIG. 5.

Figure 5:
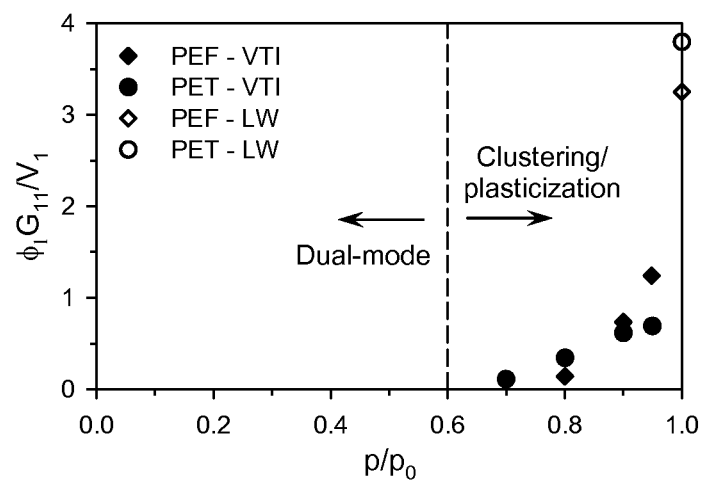
FIG. 5 shows that the onset of clustering/plasticization is realized when the quantity $\phi_1 G_{11}/\overline{V}_1$ is greater than zero.

From FIG. 5, it is evident that the onset of either clustering or plasticization occurs at an activity of ~0.6 for both polyesters. Caution should be emphasized regarding the physical interpretation of FIG. 5 as definite proof for the presence of clustering, as some authors have found notable differences between the results from this methodology and other techniques, such as FTIR [51]. Analysis of the diffusion coefficient behavior vs. activity for both PEF and PET can help distinguish between clustering and plasticization. Detailed kinetic data reported in Part 2 reveal that both PEF and PET exhibit increasing diffusion coefficients with increasing concentration over the entire activity interval, which is consistent with the notion of plasticization [14]. However, as noted above, it is still a possibility that both clustering and plasticization could be occurring simultaneously.

Additional differentiation between the clustering and plasticization phenomena can be obtained by examining the permeability vs. activity dependence for both polyesters [49]. While not measured in this analysis, various researchers have reported both an activity independent permeability [41] and a slight increase in permeability at high activity for semicrystalline PET [40, 70]. The latter behavior is consistent with increased chain mobility resulting from the onset of plasticization in the amorphous environment at high activity; however, the presence of impermeable crystallites may dampen the magnitude of the permeability increase due to reduction of the amorphous fraction which is available for plasticization. Regardless, the permeability increase resulting from plasticization in amorphous PET is not expected to be large due to the minor positive correlation between diffusion coefficient and activity reported elsewhere [14]. Currently, to our knowledge, there exists no literature report on the water permeability in PEF vs. activity. The diffusion coefficient for water in PEF slightly increases with increasing activity, thereby suggesting the possibility of plasticization. However, independent permeability measurements are needed to verify the presence or absence of either clustering or plasticization.

Agreement between solubility coefficients obtained from both permeation time lags and independent sorption measurements also indicate the absence of clustering [34], since the entirety of the sorbed penetrant population contributes to the permeation process. Such agreement has been observed for semicrystalline PET by multiple researchers [40, 41], and thus corroborates the evidence that plasticization is occurring in PET.

3.3 Hysteresis

Sorption hysteresis occurs when the penetrant sorption and subsequent desorption cycles do not superimpose, and can occur in a wide variety of penetrant-material combinations [71-73]. Some have linked hysteretic behavior to swelling of the polymer matrix, where the chains irreversibly relax to incorporate the extra penetrant at high concentrations [18, 32, 39, 74, 75]. Time-dependent non-Fickian relaxations induced by this swelling have been directly observed in Part 2 at high water vapor activities (cf. FIGS. 4 and 5 in [14]).

Figure 6:
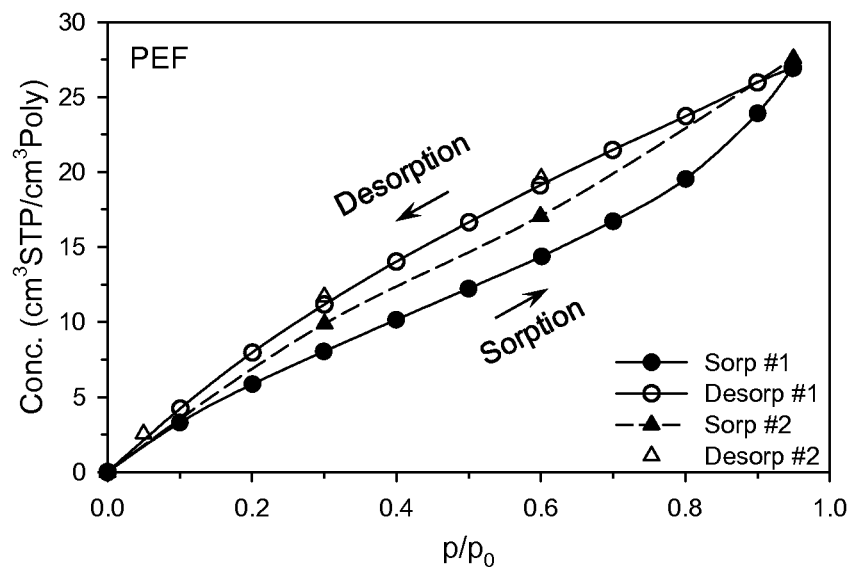
FIG. 6 shows sorption hysteresis at 35° C. for PEF recorded using the automated VTI sorption system. Filled and hollow circles represent the initial sorption and desorption cycle, respectively, while filled and hollow triangles represent the second sorption and desorption cycle, respectively. Lines are drawn to aid the eye and do not represent model fits.
Figure 7:
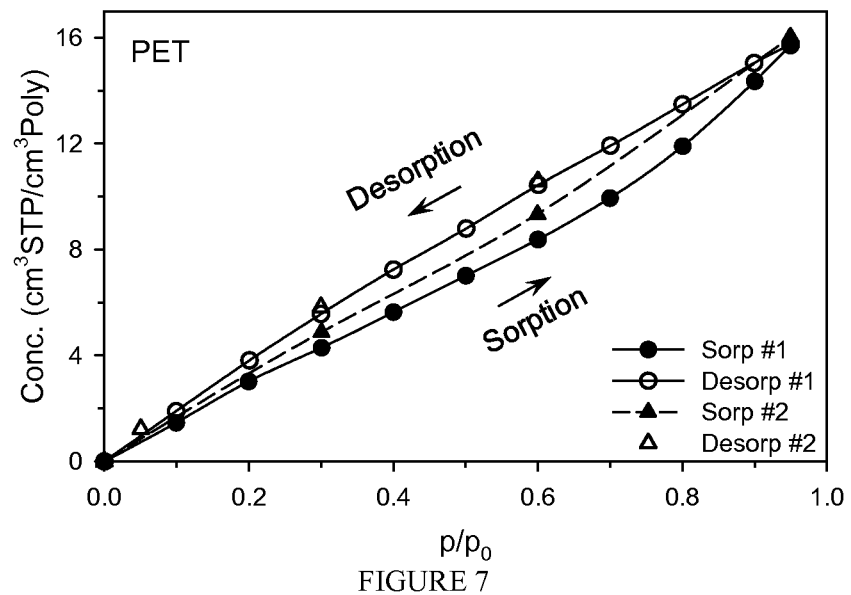
FIG. 7 shows sorption hysteresis at 35° C. for PET recorded using the automated VTI sorption system. Filled and hollow circles represent the initial sorption and desorption cycle, respectively, while filled and hollow triangles represent the second sorption and desorption cycle, respectively. Lines are drawn to aid the eye and do not represent model fits.

Water uptake in both PEF and PET in the current disclosure exhibited distinct hysteresis between sorption and subsequent desorption cycles. This behavior correlates with the upturn in concentration vs. activity for both polyesters in FIG. 2 and the presence of non-Fickian relaxations at high activities [14]. Initial sorption/desorption data measured using the automated VTI instrument up to 0.95 activity for PEF and PET at 35° C. are provided in FIGS. 6 and 7, respectively, where the solid circles represent sorption and the hollow circles represent subsequent desorption. The samples were dried at 45° C. after completion of the first cycle, and followed by a second sorption/desorption cycle, which consisted of fewer data points (filled and hollow triangles for the second sorption and desorption cycle, respectively).

Dual-mode model parameters for both sorption (from 0-0.6 activity) and desorption data (from 0.95-0 activity) are provided in Table 2 for both polyesters. The Langmuir affinity parameter (b) is associated with the thermodynamic polymer/penetrant interactions, and is not expected to change during the sorption process. Consequently, values of b obtained from the initial sorption isotherms were fixed when calculating the model parameters for desorption. Inspection of the parameters in Table 2 reveals that both $k_D$ and $C_{H'}$ for desorption are larger when compared to the respective sorption values for both polyesters. Such behavior can be understood as reflecting morphological changes in the glassy matrix resulting from swelling. Larger values of $C_{H'}$ are consistent with an increase in either number and/or approximate size of the Langmuir microvoids, and as a result, represent an increase in free volume in the swollen samples. The increased water sorption capacity is readily observed by the upturn in concentration vs. activity in FIG. 2. Quantitative interpretation of the classic dual-mode parameters for sorption and subsequent hysteretic desorption suggest that the glass has been conditioned to a different non-equilibrium state before and after exposure to the maximum conditioning activity. As a result, the dual-mode parameters for desorption should be considered approximate, and are included in Table 2 for completeness.

The desorption trajectory and degree of hysteresis for both polyesters is directly related to the maximum value obtained during initial sorption, as observed in the acetonitrile/cellulose acetate system in other works [32, 74]. Hysteresis is not expected to occur appreciably in the water/polyester systems for initial sorption values up to ~0.6 activity, which marks the transition between dual-mode and plasticization behavior (cf. FIG. 5). The presence of simple Fickian diffusion up to ~0.6 activity corroborates this notion, as observed in FIGS. 4 and 5 from Part 2 [14].

A second sorption/desorption cycle using larger sorption intervals was performed after drying both polyesters at 45° C. to investigate the permanence of the morphological changes. Resorption values in both polyesters at 0.3 and 0.6 activity (solid triangles in FIGS. 6 and 7) exhibit an increase in sorption capacity when compared to the initial sorption isotherm (solid circles), which is consistent with sorption in the increased free volume in the conditioned samples compared to the virgin samples. These results also suggest that the timescale of free volume collapse is slower than the experimental sorption experiments, thereby corroborating the observation of predominantly Fickian kinetics over the entire activity range during desorption (cf. FIGS. 4 and 5 in [14]). The resorption data points are slightly reduced when compared to the initial desorption isotherms (hollow circles). Such behavior suggests that the morphological changes induced during swelling of the glassy matrix at high activity are only semi-permanent and that deswelling is indeed occurring. Resorption values at 0.95 activity for both polyesters (solid triangles) are approximately equal to the initial sorption values at 0.95 activity (solid circles), and the subsequent desorption values for both cycles (hollow circles, hollow triangles) are satisfyingly similar. These results corroborate the notion that the desorption trajectory is dependent on the maximum sorption level achieved. Similar hysteretic behavior to that observed in the current disclosure (FIGS. 6 and 7) has been reported for multiple polymer/penetrant systems [39, 45-47, 68].

A recent study by Visser and Wessling [76] illustrates the importance of volume dilation in determining the onset of sorption-induced relaxations in Matrimid polyimide. The authors show how any gas, even relatively inert gases such as Krypton, can cause non-Fickian sorption relaxations above a threshold volume dilation. Equation 7 can be used to estimate the swelling (volume change, $\Delta V$) of a polymer sample based on the change in sample thickness (l) [74, 77], with the assumption that the sample is an isotropic medium. In Equation 7, $V_0$ and $l_0$ represent the volume and thickness of the pure, dry polymer, respectively.

$$\frac{\Delta V}{V_0} = \left[\left(\frac{l}{l_0}\right)^3 - 1\right] = \left[\left(1 + \frac{\Delta l}{l_0}\right)^3 - 1\right] \quad (7)$$

Calculation of swelling data via Equation 7 was only possible using the thick samples from sorption testing in liquid water. Thickness values were measured on both dry samples prior to sorption testing, and again after sorption equilibrium was achieved. Values for the percent change in thickness and volume change are provided in Table 3 for both PEF and PET, along with the final concentration of water at unit activity. At least four different samples were measured for both PEF and PET, and the uncertainty limits originate from the standard error. In the context of Visser and Wessling [76], a threshold dilation of ~1.2% was found for the onset of non-Fickian relaxations for various gases in Matrimid. This threshold value will vary for different polymers; however, the swelling values for PEF and PET at unit activity in Table 3 are unmistakably above the respective unknown threshold limits. The swelling data reported in Table 3 also allows calculation of the partial molar volume for water in both polyesters, denoted by $\overline{V}$, via Equation 8 [57].

TABLE 3

Swelling values for amorphous PEF and PET at 35° C. in liquid water calculated from Equation 7.

|     | Conc. at a = 1 ($cm^3$STP/$cm^3$Poly) | $\Delta l/l_0$ (%) | $\Delta V/V_0$ (%) |
| --- | --- | --- | --- |
| PEF | 33.4 ± 0.1 | 1.3 ± 0.3 | 4.1 ± 0.8 |
| PET | 19.8 ± 0.1 | 0.8 ± 0.2 | 2.4 ± 0.6 |

$$\overline{V} = \left(\frac{\partial V}{\partial n}\right) \approx \left(\frac{\Delta V}{\Delta n}\right) \quad (8)$$

Values of $\overline{V}$ obtained for PEF and PET are 27.5±5.6 $cm^3$/mol and 26.9±6.3 $cm^3$/mol, respectively, which are both larger than the molar volume of pure, liquid water (~18 $cm^3$/mol). Such seemingly anomalous behavior can be explained by three possibilities: 1) that plasticization at high activity in the polymer matrix is creating extra free volume which, in fact, is unoccupied by water molecules, thus resulting in a disproportionate volume change for the polymer/water "mixture" compared to the true amount of water added in the system, 2) the thickness measurements are not accurate enough to estimate the true values of $\bar{V}$, or 3) the assumption of an isotropic medium for both polyesters is inaccurate. Due to the large uncertainty limits reported in the values of $\bar{V}$ for both polyesters, it is believed that option 2 likely reflects reality. Consequently, ellipsometry or other techniques more suited to performing dilation measurements should be used to verify the data reported in Table 3 for both polyesters.

3.4 Enthalpy of Sorption

In addition to the equilibrium sorption measurements at 35° C., uptake values were also measured at 0.2 activity and 15, 25, and 45° C. for water in both polyesters. Kinetic uptake data between 0.1-0.2 activity are discussed in Part 2 [14], which also reports estimates for the activation energy of diffusion and activation energy of permeation for water in PEF and PET. Measurements were recorded at 0.2 activity on virgin films to ensure dual-mode behavior applied and to avoid the upturn in concentration observed in FIG. 2 at high activity. The van't Hoff relationship in Equation 9 can describe the temperature dependence of the equilibrium uptake data, where APIs is the effective enthalpy of sorption (kJ/mol), R is the universal gas constant, and $S_0$ is the pre-exponential factor. Uptake data at 0.2 activity and 15, 25, 35, and 45° C. are plotted in FIG. 8 for PEF (diamonds) and PET (circles), where the lines represent the respective model fit from Equation 9. The uncertainty limits for the APIs values depicted in FIG. 8 originate from the standard error of the model fit.

$$S=S_0 \exp(-\Delta H_S/RT) \quad (9)$$

Figure 8:
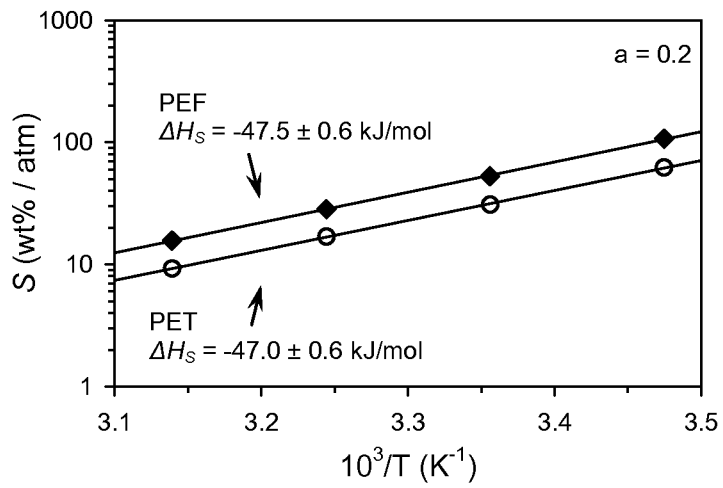
FIG. 8 shows a semi-logarithmic van't Hoff plot of water sorption at 0.2 activity in amorphous PEF (filled diamonds) and amorphous PET (hollow circles). Lines represent the van't Hoff representation from Equation 9.

The data in FIG. 8 exhibit excellent linearity for both polyesters, and produce estimates of $\Delta H_S$ which are quite similar in magnitude to the enthalpy of condensation for pure water [78]. Such behavior is not surprising, and indicates that the overall enthalpy of sorption is dominated by the exothermic contribution from the enthalpy of condensation [36]. The remaining contribution from the enthalpy of mixing is therefore rationalized to be small. Values of $\Delta H_S$ for water in PET from the literature are sparse and variable [26, 42, 79], while no additional data exists in the literature for PEF. Values of $\Delta H_S$ can be estimated from the Hildebrand equation [80]; however, predictions which utilize the solubility parameter for water are not recommended due to the likelihood of non-ideal behavior [44].

4. Summary

The current disclosure examines the equilibrium water uptake properties of amorphous PEF and PET at 35° C. over the entire water activity range, with the corresponding kinetic uptake data reported in Part 2 [14]. Water sorption values were measured using the following activity ranges and techniques: 1) 0-0.6 activity with the McBain quartz spring technique, 2) 0-0.95 activity with the automated TA VTI-SA+sorption apparatus, and 3) at unit activity using samples immersed in liquid water, with the water uptake determined using a microgram balance. A consistency check was provided through excellent agreement in the uptake data measured from all three independent methods.

PEF exhibits higher equilibrium water uptake compared to PET over the entire activity range. While not bound by theory, this behavior is attributed to the higher affinity between water and the polar furan ring vs. the non-polar phenyl ring in PET. A lower average value of the Flory-Huggins interaction parameter ($\chi$) for PEF compared to PET also indicates a higher degree of compatibility between water and PEF. Dual-mode sorption behavior was observed at low water activity, and the onset of water plasticization occurred at approximately 0.6 activity for both polyesters as determined through a Zimm-Lundberg type analysis [69]. Verification of penetrant plasticization at high activity is provided elsewhere [14], and is evidenced by the positive correlation between diffusion coefficients and increasing activity for both polymers. Further verification between either plasticization or clustering behavior will require permeation experiments at high activity, which were not conducted in these studies. Additional complementary data and related discussions regarding the kinetic uptake analogy of the current disclosure are provided in Part 2 of this disclosure [14].

The current section (Part 1), in combination with Part 2 [14], presents the first detailed report of water sorption in PEF compared to PET. Such information is needed to advance the large-scale commercialization of PEF for a variety of markets. Further sections will discuss additional data regarding water uptake properties for both polyesters, with emphasis on the resultant thermal and mechanical properties of the dry and hydrated samples, and how this information is used in fabricating poly(ethylene furanoate) packaging, particularly for carbonated beverages.

REFERENCES

1. Langevin D, Grenet J, and Saiter J M. Moisture Sorption in PET: Influence on the Thermokinetic Parameters. European Polymer Journal 1994; 30(3):339-345.
2. Lahokallio S, Saarinen K, and Frisk L. Changes in water absorption and modulus of elasticity of flexible printed circuit board materials in high humidity testing. Microelectronics and Packaging Conference (EMPC), 2011 18th European, 2011. pp. 1-6.
3. Mali S, Sakanaka L S, Yamashita F, and Grossmann M V E. Water sorption and mechanical properties of cassava starch films and their relation to plasticizing effect. Carbohydrate Polymers 2005; 60(3):283-289.
4. Auras R, Harte B, and Selke S. Effect of Water on the Oxygen Barrier Properties of Poly(ethylene terephthalate) and Polylactide Films. Journal of Applied Polymer Science 2004; 92:1790-1803.
5. Avantium—PEF bottles, www.avantium.com.
6. Gruter G-J M, Sipos L, and Adrianus Dam M. Accelerating research into bio-based FDCA-polyesters by using small scale parallel film reactors. Combinatorial Chemistry & High Throughput Screening 2012; 15(2):180-188.
7. Jong Ed, Dam M A, Sipos L, and Gruter G J M. Furandicarboxylic Acid (FDCA), A Versatile Building Block for a Very Interesting Class of Polyesters. Biobased Monomers, Polymers, and Materials, vol. 1105: American Chemical Society, 2012. pp. 1-13.
8. Knoop R J I, Vogelzang W, van Haveren J, and van Es D S. High molecular weight poly(ethylene-2,5-furanoate); key aspects in synthesis and mechanical property determination. Journal of Polymer Science Part A: Polymer Chemistry 2013; 51(19):4191-4199.
9. Papageorgiou G Z, Tsanaktsis V, and Bikiaris D N. Synthesis of poly(ethylene furandicarboxylate) polyester using monomers derived from renewable resources: thermal behavior comparison with PET and PEN. Physical Chemistry Chemical Physics 2014.
10. Jiang M, Liu Q, Zhang Q, Ye C, and Zhou G. A series of furan-aromatic polyesters synthesized via direct esterification method based on renewable resources. Journal of Polymer Science Part A: Polymer Chemistry 2012; 50(5): 1026-1036.
11. Burgess S K, Leisen J E, Kraftschik B E, Mubarak C R, Kriegel R M, and Koros W J. Chain Mobility, Thermal, and Mechanical Properties of Poly(ethylene furanoate) Compared to Poly(ethylene terephthalate). Macromolecules 2014; 47(4):1383-1391.
12. Burgess S K, Karvan O, Johnson J R, Kriegel R M, and Koros W J. Oxygen Sorption and Transport in Amorphous Poly(ethylene furanoate). Polymer 2014;Submitted.
13. Jabarin S A and Lofgren E A. Effects of water absorption on physical properties and degree of molecular orientation of poly (ethylene terephthalate). Polymer Engineering & Science 1986; 26(9):620-625.
14. Burgess S K, Mikkilineni D S, Yu D, Kim D J, Mubarak C R, Kriegel R M, and Koros W J. Water Sorption in Poly(ethylene furanoate) Compared to Poly(ethylene terephthalate). Part II: Kinetic Sorption. Polymer 2014;Submitted.
15. Rueda D R and Varkalis A. Water Sorption/Desorption Kinetics in Poly(Ethylene Naphthalene-2,6-Dicarboxylate) and Poly(Ethylene Terephthalate). Journal of Polymer Science Part B: Polymer Physics 1995; 33:2263-2268.
16. Rueda D R, Viksne A, Kajaks J, Balta-Calleja F J, and Zachmann H G. Properties of arylpolyesters with reference to water content. Macromolecular Symposia 1995; 94(1):259-268.
17. McBain J W and Bakr A M. A NEW SORPTION BALANCE1. Journal of the American Chemical Society 1926; 48(3):690-695.
18. Chandra P and Koros W J. Sorption and transport of methanol in poly(ethylene terephthalate). Polymer 2009; 50:236-244.
19. Chandra P and Koros W J. Sorption of lower alcohols in poly(ethylene terephthalate). Polymer 2009; 50:4241-4249.
20. Lee J S, Adams R T, Madden W, and Koros W J. Toluene and n-heptane sorption in Matrimid® asymmetric hollow fiber membranes. Polymer 2009; 50(25):6049-6056.
21. Michaels A S, Vieth W R, and Barrie J A. Solution of Gases in Polyethylene Terephthalate. Journal of Applied Physics 1963; 34(1):1-12.
22. Koros W J, Chan A H, and Paul D R. Sorption and transport of various gases in polycarbonate. Journal of Membrane Science 1977; 2(0):165-190.
23. Fukuda M, Kawai H, Yagi N, Kimura O, and Ohta T. FTi.r. study on the nature of water sorbed in poly(ethylene terephthalate) film. Polymer 1990; 31(2):295-302.
24. Lasoski S W and Cobbs W H. Moisture permeability of polymers. I. Role of crystallinity and orientation. Journal of Polymer Science 1959; 36(130):21-33.
25. Myers A W, Meyer J A, Rogers C E, Stannett V, and Szwarc M. Studies in the Gas and Vapor Permeability of Plastic Films and Coated Papers. Part VI. The Permeation of Water Vapor. Tappi 1961; 44(1):58-64.
26. Shigetomi T, Tsuzumi H, Toi K, and Ito T. Sorption and diffusion of water vapor in poly(ethylene terephthalate) film. Journal of Applied Polymer Science 2000; 76(1):67-74.
27. Lin J, Shenogin S, and Nazarenko S. Oxygen solubility and specific volume of rigid amorphous fraction in semicrystalline poly(ethylene terephthalate). Polymer 2002; 43(17):4733-4743.
28. Singh A, Freeman B D, and Pinnau I. Pure and mixed gas acetone/nitrogen permeation properties of polydimethylsiloxane [PDMS]. Journal of Polymer Science Part B: Polymer Physics 1998; 36(2):289-301.
29. Berens A R and Hopfenberg H B. Diffusion and relaxation in glassy polymer powders: 2. Separation of diffusion and relaxation parameters. Polymer 1978; 19(5):489-496.
30. Wellons J D and Stannett V. Permeation, sorption, and diffusion of water in ethyl cellulose. Journal of Polymer Science Part A-1: Polymer Chemistry 1966; 4(3): 593-602.
31. Mauze G R and Stern S A. The solution and transport of water vapor in poly(acrylonitrile): a re-examination. Journal of Membrane Science 1982; 12(1): 51-64.
32. Guo J and Barbari T A. Unified Dual Mode Description of Small Molecule Sorption and Desorption Kinetics in a Glassy Polymer. Macromolecules 2009; 42(15):5700-5708.
33. Flory P J. Stastical Mechanics of Swelling of Network Structures. The Journal of Chemical Physics 1950; 18(1): 108-111.
34. Orofino T A, Hopfenberg H B, and Stannett V. Characterization of penetrant clustering in polymers. Journal of Macromolecular Science, Part B 1969; 3(4): 777-788.
35. Williams J L, Hopfenberg H B, and Stannett V. Water transport and clustering in poly[vinyl cloride], poly [oxymethylene], and other polymers. Journal of Macromolecular Science, Part B 1969; 3(4):711-725.
36. Stannett V, Haider M, Koros W J, and Hopfenberg H B. Sorption and Transport of Water Vapor in Glassy Poly (Acrylonitrile). Polymer Engineering and Science, Mid-March 1980; 20(4):300-304.
37. Schuld N and Wolf B A. Solvent quality as reflected in concentration- and temperature-dependent Flory-Huggins interaction parameters. Journal of Polymer Science Part B: Polymer Physics 2001; 39(6):651-662.
38. Kamide K, Sugamiya K, Kawai T, and Miyazaki Y. The Concentration Dependence of the Polymer-Solvent Interaction Parameter for Polystyrene-Methylcyclohexane System. Polym J 1980; 12(1):67-69.
39. Berens A R. Effects of sample history, time, and temperature on the sorption of monomer vapor by PVC. Journal of Macromolecular Science, Part B 1977; 14(4): 483-498.
40. Hubbell W H, Brandt H, and Munir Z A. Transient and steady-state water vapor permeation through polymer films. Journal of Polymer Science: Polymer Physics Edition 1975; 13(3):493-507.
41. Yasuda H and Stannett V. Permeation, Solution, and Diffusion of Water in Some High Polymers. Journal of Polymer Science 1962; 57:907-923.
42. Park H. Characterization of Moisture Diffusion into Polymeric Thin Film Experimental Mechanics 2013; 53(9):1693-1703.
43. van Krevelen D W and to Nijenhuis K. Properties of Polymers: Their Correlation with Chemical Structure, Their Numerical Estimation and Prediction from Additive Group Contributions, 4th ed. Amsterdam: Elsevier Science & Technology, 2009.
44. Hansen C M. Hansen Solubility Parameters: A User's Handbook, 2 ed. Boca Raton: CRC Press, Taylor & Francis Group, 2007.
45. Schult K A and Paul D R. Water sorption and transport in a series of polysulfones. Journal of Polymer Science Part B: Polymer Physics 1996; 34(16):2805-2817.

46. Schult K A and Paul D R. Water sorption and transport in blends of poly(vinyl pyrrolidone) and polysulfone. Journal of Polymer Science Part B: Polymer Physics 1997; 35(4):655-674.
47. Schult K A and Paul D R. Water sorption and transport in blends of polyethyloxazoline and polyethersulfone. Journal of Polymer Science Part B: Polymer Physics 1997; 35(6):993-1007.
48. Wellons J D, Williams J L, and Stannett V. Preparation and characterization of some cellulose graft copolymers. Part IV. Some properties of isolated cellulose acetate-styrene graft copolymers. Journal of Polymer Science Part A-1: Polymer Chemistry 1967; 5(6):1341-1357.
49. Barrer R M and Barrie J A. Sorption and Diffusion in Ethyl Cellulose. Part IV. Water in Ethyl Cellulose. Journal of Polymer Science 1958;XXVIII:377-386.
50. Zhang Z, Britt I J, and Tung M A. Water absorption in EVOH films and its influence on glass transition temperature. Journal of Polymer Science Part B: Polymer Physics 1999; 37(7):691-699.
51. Davis E M and Elabd Y A. Water Clustering in Glassy Polymers. The Journal of Physical Chemistry B 2013; 117(36):10629-10640.
52. Barrie J A and Platt B. The diffusion and clustering of water vapour in polymers. Polymer 1963; 4(0):303-313.
53. Achoundong C S K, Bhuwania N, Burgess S K, Karvan O, Johnson J R, and Koros W J. Silane Modification of Cellulose Acetate Dense Films as Materials for Acid Gas Removal. Macromolecules 2013; 46(14):5584-5594.
54. Horn N R and Paul D R. Carbon dioxide plasticization and conditioning effects in thick vs. thin glassy polymer films. Polymer 2011; 52(7):1619-1627.
55. Horn N R and Paul D R. Carbon dioxide plasticization of thin glassy polymer films. Polymer 2011; 52(24):5587-5594.
56. Pantoula M and Panayiotou C. Sorption and swelling in glassy polymer/carbon dioxide systems: Part I. Sorption. The Journal of Supercritical Fluids 2006; 37(2):254-262.
57. Kamiya Y, Hirose T, Naito Y, and Mizoguchi K. Sorptive dilation of polysulfone and poly(ethylene terephthalate) films by high-pressure carbon dioxide. Journal of Polymer Science Part B: Polymer Physics 1988; 26(1):159-177.
58. Wonders A G and Paul D R. Effect of CO2 exposure history on sorption and transport in polycarbonate. Journal of Membrane Science 1979; 5(0):63-75.
59. Kamiya Y, Hirose T, Mizoguchi K, and Naito Y. Gravimetric study of high-pressure sorption of gases in polymers. Journal of Polymer Science Part B: Polymer Physics 1986; 24(7):1525-1539.
60. Wind J D, Sirard S M, Paul D R, Green P F, Johnston K P, and Koros W J. Relaxation Dynamics of CO2 Diffusion, Sorption, and Polymer Swelling for Plasticized Polyimide Membranes. Macromolecules 2003; 36(17): 6442-6448.
61. Wind J D, Sirard S M, Paul D R, Green P F, Johnston K P, and Koros W J. Carbon Dioxide-Induced Plasticization of Polyimide Membranes: Pseudo-Equilibrium Relationships of Diffusion, Sorption, and Swelling. Macromolecules 2003; 36(17):6433-6441.
62. Hölck O, Heuchel M, Böhning M, and Hofmann D. Simulation of experimentally observed dilation phenomena during integral gas sorption in glassy polymers. Journal of Polymer Science Part B: Polymer Physics 2008; 46(1):59-71.
63. Neyertz S, Brown D, Pandiyan S, and van der Vegt N F A. Carbon Dioxide Diffusion and Plasticization in Fluorinated Polyimides. Macromolecules 2010; 43(18):7813-7827.
64. Hölck O, Böhning M, Heuchel M, Siegert M R, and Hofmann D. Gas sorption isotherms in swelling glassy polymers—Detailed atomistic simulations. Journal of Membrane Science 2013; 428(0):523-532.
65. Neyertz S and Brown D. Molecular Dynamics Study of Carbon Dioxide Sorption and Plasticization at the Interface of a Glassy Polymer Membrane. Macromolecules 2013; 46(6):2433-2449.
66. Neyertz S and Brown D. The effect of structural isomerism on carbon dioxide sorption and plasticization at the interface of a glassy polymer membrane. Journal of Membrane Science 2014; 460(0):213-228.
67. Koros W J and Paul D R. CO2 Sorption in Poly(ethylene Terephthalate) above and below the Glass Transition. Journal of Polymer Science: Polymer Physics Edition 1978; 16:1947-1963.
68. Potreck J, Uyar F, Sijbesma H, Nijmeijer K, Stamatialis D, and Wessling M. Sorption induced relaxations during water diffusion in S-PEEK. Physical Chemistry Chemical Physics 2009; 11(2):298-308.
69. Zimm B H and Lundberg J L. Sorption of Vapors by High Polymers. Journal of Physical Chemistry 1956; 60(4):425-428.
70. Thornton E R, Stannett V, and Szwarc M. The permeation of vapors and liquids through polymer films. Journal of Polymer Science 1958; 28(117):465-468.
71. Martin R T. Water-vapor sorption on kaolinite: hysteresis. Clays and Clay Minerals. Berkeley, Calif.: Pergamon Press, 1959. pp. 259-278.
72. Okubayashi S, Griesser U J, and Bechtold T. Moisture sorption/desorption behavior of various manmade cellulosic fibers. Journal of Applied Polymer Science 2005; 97(4):1621-1625.
73. Champion D, Loupiac C, Simatos D, Lillford P, and Cayot P. Structural Relaxation During Drying and Rehydration of Food Materials—the Water Effect and the Origin of Hysteresis. Food Biophysics 2011; 6(1):160-169.
74. Guo J and Barbari T A. A dual mode interpretation of the kinetics of penetrant-induced swelling and deswelling in a glassy polymer. Polymer 2010; 51(22): 5145-5150.
75. Berens A R. The solubility of vinyl chloride in poly(vinyl chloride). Die Angewandte Makromolekulare Chemie 1975; 47(1):97-110.
76. Visser T and Wessling M. When Do Sorption-Induced Relaxations in Glassy Polymers Set In? Macromolecules 2007; 40(14):4992-5000.
77. Böhning M and Springer J. Sorptive dilation and relaxational processes in glassy polymer/gas systems—I. Poly (sulfone) and poly(ether sulfone). Polymer 1998; 39(21): 5183-5195.
78. Felder R M and Rousseau R W. Elementary Principles of Chemical Processes, 3rd ed.: John Wiley & Sons, Inc., 2005.
79. Launay A, Thominette F, and Verdu J. Water sorption in amorphous poly(ethylene terephthalate). Journal of Applied Polymer Science 1999; 73(7):1131-1137.
80. Comyn J. Polymer Permeability. New York: Elsevier Applied Science Publishers Ltd., 1985. pp. 383.

PART 2. Kinetic Sorption

Overview

Diffusion coefficients for water in amorphous poly(ethylene furanoate) (PEF) and poly(ethylene terephthalate) (PET) were studied at 35° C. over the entire water activity range. PEF exhibits a ~5× reduction in diffusion coefficient averaged over the entire concentration interval compared to PET. Fickian diffusion was observed for water in both polyesters up to ~0.6 activity, after which the presence of non-Fickian relaxations required treatment using the Berens-Hopfenberg modeling framework. Penetrant plasticization at high activity was found for both PEF and PET, as evidenced by a positive correlation between diffusion coefficient and increasing water concentration. Arrhenius interpretation of diffusion coefficients measured at 15, 25, 35, and 45° C. allowed calculation of the activation energies of diffusion for PEF and PET, which were similar at 47.1±2.8 kJ/mol and 46.4±3.0 kJ/mol, respectively. The information in the present disclosure complements the analysis pertaining to the equilibrium water sorption properties in both polyesters.

1. Introduction

Studies involving water transport in polymeric materials are important, since most polymers will realistically encounter humid environments at some point during their usable lifetime. Such transport data are particularly important for materials which will be in direct contact with liquid water, since water at unit activity can cause undesirable plasticization and swelling effects in a wide variety of polymers [1-4].

Recent innovation by Avantium (The Netherlands) has enabled economical, large-scale production of 2,5-furandicarboxylic acid (FDCA), which is one of two monomers needed to manufacture poly(ethylene furanoate) (PEF). Integration of PEF into the global polyester market is desirable, due to renewable sourcing of the monomers and the largely improved barrier, mechanical, and thermal properties compared to PET [5]. Multiple studies have focused on various aspects of PEF synthesis and/or material property characterization [6-11], however, no data exist in the literature regarding the fundamental water transport properties. Applications of PEF in the beverage and food packaging industry involve high humidity environments, and knowledge of the water transport properties at ambient temperature is therefore required for accurate shelf-life predictions.

In comparison to PET, the current disclosure indicates that PEF exhibits ~5× reduced water diffusion coefficients averaged over the entire concentration interval. This reduction is attributed to fundamental differences in segmental mobility, which originate from the rigid furan moiety in PEF compared to the mobile phenyl moiety in PET [5]. The results from the current disclosure can be compared to the diffusion of water in poly(ethylene naphthalate) (PEN), which exhibits somewhat analogous rigidity to PEF due to hindered flipping of the bulky naphthalene moiety [12]. Rueda and Varkalis report a ~3.2× reduction in diffusion coefficient for PEN compared to PET, where both polymers are amorphous and in the hydrated state [13]. Interestingly, the authors also report a higher equilibrium sorption in PEN compared to PET due to differences in free volume [13, 14], although the disparity in equilibrium uptake is not as significant as in the current disclosure comparing PEF to PET [15].

This section presents a detailed kinetic investigation of water diffusion in amorphous PEF and PET, and complements prior work regarding equilibrium sorption properties for water [15], oxygen transport [16], and fundamental segmental mobility [5]. Similar to the Part 1 section [15], gravimetric sorption experiments were performed using three independent techniques, thereby allowing verification of the reported diffusion coefficients. Concentration dependent diffusion coefficients are presented for amorphous PEF and PET at 35° C. over the entire water activity range, and exhibit plasticization type behavior as evidenced by the positive correlation with increasing activity. The presence of non-Fickian relaxations at high activity is consistent with this notion, as is the sorption/desorption hysteresis observed for both polyesters reported in Part 1 [15]. Additional measurements of the activation energy of diffusion can be combined with the enthalpy of sorption measurements provided elsewhere [15], thereby allowing a means to estimate the activation energy of water permeation in both polyesters. Similar calculations involving the diffusivity and solubility reveal a reduction in permeability of ~2.8× averaged across the entire concentration interval for PEF compared to PET, which is consistent with the reduction of ~2× for PEF vs. PET reported by Avantium [17]. This disclosure, in combination with the equilibrium sorption counterpart [15], presents the first detailed analysis of water transport in PEF.

2. Experimental

2.1 Materials and Sorption Measurements

Virgin poly(ethylene furanoate) (PEF) and poly(ethylene terephthalate) (PET) were provided by The Coca-Cola Company, and are characterized in previous works [5, 15, 16]. Repeat structures for both polyesters are shown in Table 4. Amorphous films were prepared using the same melt-press/quench methodology described in prior work [5]. Nitrogen carrier gas (Airgas, Radnor Pa.) was utilized by the TA-VTI SA+ sorption instrument, and de-ionized water was used for all sorption experiments.

TABLE 4

Poly(ethylene furanoate) (PEF) and poly(ethylene terephthalate) (PET) repeat structures.

| Polymer | Structure |
|---|---|
| PEF | [chemical structure of PEF repeat unit] |
| PET | [chemical structure of PET repeat unit] |

2.2 Sorption Measurements

Water uptake data between 0-0.95 activity were measured during sorption and subsequent desorption for both polyesters using an automated TA VTI-SA+ vapor sorption analyzer (TA Instruments, New Castle, Del.). In this system, the desired vapor concentration is obtained via mixing of separate wet and dry nitrogen streams, which are automatically controlled by the instrument via two separate mass flow controllers. Feedback is provided to the instrument from a dew point analyzer, which continually measures the water content in the stream. The sample mass is constantly monitored via a microgram balance, after which equilibrium is realized when no change in mass is observed versus time. Additional details regarding this technique are provided in Part 1 of this disclosure [15].

Two additional gravimetric methods, i.e. the McBain quartz spring technique [18] and gravimetric liquid water method, were used to verify and corroborate the measurements recorded by the automated VTI instrument. The former technique is more suitable to testing at low vapor activities, while the latter provides uptake data at unit activity. Additional details are provided in Part 1 of this disclosure [15].

3. Results and Discussion

3.1 Diffusion Model Development

Gravimetric water sorption values are typically reported in units of weight percent water (wt %, g $H_2O$/g dry polymer), and can be converted via Equation 10 to a non-dimensional form useful for extracting kinetic information.

$$\frac{M_t}{M_\infty}(t) = \left(\frac{m(t) - m_{initial}}{m_{final} - m_{initial}}\right) \quad (10)$$

In Equation 10, $M_t$ represents the water uptake at time t, $M_\infty$ is the water uptake at equilibrium (i.e. infinite time), m is the sample mass measured by the balance, initial represents the beginning of the sorption interval, and final represents the end of the sorption interval. The $M_t/M_\infty$ parameter in Equation 10 therefore represents a normalized, non-dimensional quantity that varies from zero to unity.

Solutions of the time-dependent diffusion equation have been widely tabulated for diffusion cases involving an infinite sheet geometry and a variety of boundary and initial conditions [19]. The simplest solution is obtained via implementing a constant initial concentration throughout the film (i.e. $C=C_0$ at $t=0$) and a constant concentration at the film surfaces for $t>0$ (i.e. $C=C_1$ at $x=\pm l/2$ for $t>0$, where l is the film full-thickness). Solution using these conditions is provided in Equation 11 [19], where the subscript "F" denotes the Fickian solution, $D_{Avg}$ (cm$^2$/s) is the effective diffusion coefficient averaged over the concentration interval, and l (cm) is the film full-thickness.

$$\frac{M_t}{M_\infty}\bigg|_F = 1 - \sum_{n=0}^{\infty} \frac{8}{(2n+1)^2\pi^2} \exp\left(\frac{-D_{Avg}(2n+1)^2\pi^2 t}{l^2}\right) \quad (11)$$

Equation 11 accurately describes the kinetic sorption behavior of relatively non-condensable gases in polymer materials (i.e. $O_2$ in PEF [16]) and some vapors at low activity [20, 21], consistent with the validity of the boundary and initial conditions in these applications. Equation 11 can also describe the water sorption data measured by the quartz spring system in the current disclosure (cf. FIG. 9, discussed later in the document). As mentioned previously, $D_{Avg}$ in Equation 11 represents the average "effective" diffusion coefficient over the specified concentration interval. Mathematical representation of this average is presented in Equation 12 [22]. Consequently, $D_{Avg}$ values reported in this paper are plotted at the midpoint of the respective sorption intervals.

$$D_{Avg} = \frac{\int_{C_1}^{C_2} D_{eff} dC}{C_2 - C_1} \quad (12)$$

Uptake data measured from the automated VTI instrument at low activities could not be accurately described by the Fickian model from Equation 11. All data recorded from this instrument exhibited a slight but distinct curvature convex to the time axis at short times, before approaching Fickian-like behavior at longer times (cf. FIG. 11, discussed later in the document).

The anomalous kinetics result primarily from a lag introduced by the process control scheme employed by the instrument. Recall that the VTI instrument produces a desired water concentration by mixing a dry nitrogen stream with a completely humidified stream and selectively controlling the respective flow rates using two separate mass flow controllers. After uptake equilibrium is achieved at the current water activity, the instrument automatically adjusts the flow rates of the wet and dry streams to produce the next desired activity. The automated control scheme obtains feedback from the measured water content determined by a dew point analyzer. Upon any activity change (sorption or desorption), the instrument will initially adjust the wet/dry flow rates to obtain a first guess for obtaining the new set-point activity. With the new flow rates held constant, the instrument then averages multiple activity readings over a discrete period of time (~1 min). If the averaged activity is different from the set-point after this period, the instrument implements a small change to the wet/dry flow rates, and the process is repeated until the set-point activity is achieved. While the system typically achieves the desired set-point after only a few minutes, this variability is enough to produce anomalous sorption kinetics.

The sigmoidal sorption data from FIG. 11 (discussed later in the document) can be modeled formally using the Long and Richman formulation of the time-dependent boundary condition shown in Equation 13, which states that the equilibrium concentration at the film surface ($C_1$) is described by an exponential approach to equilibrium [23].

$$C\left(\pm\frac{l}{2}, t > 0\right) = C_1\left(1 - \exp\left(-\frac{t}{\tau_S}\right)\right) \quad (13)$$

In Equation 13, $\tau_S$ is the time constant used for obtaining equilibrium saturation at the film surface, and in the current disclosure, represents an instrumental parameter related to how fast the control scheme in the VTI system can implement a step-change in concentration. Solution of the time-dependent diffusion equation with the boundary conditions in Equation 13 is provided in Equation 14 [19, 23], where l is the film thickness and the subscript "F-Exp" denotes the Fickian solution obtained after application of the exponential-type boundary condition.

$$\frac{M_t}{M_\infty}\bigg|_{F-Exp} = \left[1 - \exp\left(-\frac{t}{\tau_S}\right)\left(\frac{4\tau_S D_{Avg}}{l^2}\right)^{1/2} \tan\left(\frac{l^2}{4\tau_S D_{Avg}}\right)^{1/2} - \frac{8}{\pi^2}\sum_{n=0}^{\infty} \frac{\exp\left(-D_{Avg}(2n+1)^2\pi^2 \frac{t}{l^2}\right)}{(2n+1)^2\left(1 - (2n+1)^2\left(\frac{\tau_S D_{Avg}\pi^2}{l^2}\right)\right)}\right] \quad (14)$$

A useful feature regarding Equation 14 is that the original Fickian solution (Equation 11) is recovered when $\tau_S=0$, thereby signifying an instantaneous approach in surface concentration to the final equilibrium value (i.e. the instrumental control scheme "guesses" the correct wet/dry flow rates on the first guess during the step-change in concentration). To reiterate, the parameter $\tau_S$ in the current disclosure represents an instrumental time constant and does not represent a fundamental property of the polymer. Additional applications of Equation 14 and variations thereof can be found in multiple articles in the literature [24-27]. Further experimental verification for the validity of Equation 14 is provided in the supplemental information, which provides values of $D_{Avg}$ and $\tau_S$ measured using nitrogen, argon, and helium as carrier gases along with variable flow rates.

The discussion thus far has focused on simple penetrant diffusion in the absence of long-term non-Fickian relaxations. As discussed previously, such relaxations are known to occur in a wide variety of penetrant and polymer systems, and can indicate the occurrence of morphological changes in the polymer. Informative discussions regarding the physical origins of non-Fickian relaxations can be found in the works by Sanopoulou et al. [28, 29] and Crank [19]. Non-Fickian relaxations can be modeled using the formalism proposed by Berens and Hopfenberg [30], shown in Equations 15 and 16, which states that both Fickian diffusion and first-order relaxation processes exist independently and can be combined using simple linear superposition. In Equation 15, $M_t$ represents the total mass uptake from both mechanisms at time t, $M_{t,F}$ is the mass uptake from the Fickian mode, and $M_{t,R}$ is the mass uptake from the first-order relaxation mode.

$$M_t = M_{t,F} + M_{t,R} \quad (15)$$

$$\frac{M_t}{M_\infty}\bigg|_{BH} = \left[\phi_F\left(\frac{M_t}{M_\infty}\bigg|_F\right) + (1-\phi_F)\left(1-\exp\left(-\frac{t}{\tau_R}\right)\right)\right] \quad (16)$$

In Equation 16, $\phi_F$ represents the weighting factor which specifies the relative contribution of each uptake mode, $\tau_R$ is the time constant for the non-Fickian relaxations, and the subscripts "BH" and "F" represent the infinite series solutions obtained using the Berens-Hopfenberg (BH) and Fickian (Equation 11) formalisms, respectively. Additional models exist in the literature for describing diffusion/relaxation phenomenon [31-33], but none are as simple and straightforward to implement as the BH model. Moreover, the BH framework specified in Equation 16 is versatile in that the infinite series solution from the simple Fickian case (Equation 11) can be replaced with the more complex solution provided in Equation 14. The final representation used in the current disclosure is provided in Equation 17, which can effectively model both the exponential approach to steady-state concentration at the film surface (for data measured from the VTI system) and the superposition of non-Fickian relaxations at high water concentrations.

$$\frac{M_t}{M_\infty}\bigg|_{BH-Exp} = \left[\phi_F\left(\frac{M_t}{M_\infty}\bigg|_{F-Exp}\right) + (1-\phi_F)\left(1-\exp\left(-\frac{t}{\tau_R}\right)\right)\right] \quad (17)$$

In the following discussions throughout the paper, Equation 17 will be referenced as the "BH-Exp" model. It is important to recognize that Equations 16, 14 and 11 can all be recovered from Equation 17 depending on the shape of the kinetic curve. For example, use of Equation 17 to model a strictly Fickian uptake curve (cf. FIG. 9, discussed later in the document) will return values of $\phi_F \approx 1$ and $\tau_S \sim 0$. Similarly, use of Equation 17 to model the kinetic data from the VTI system at low water concentrations (cf. FIG. 11, i.e. absence of non-Fickian relaxations) will return values of $\phi_F \approx 1$ and $\tau_S \neq 0$. The model in Equation 17 therefore represents a robust representation which is capable of describing a wide variety of kinetic phenomena.

Application of Equation 17 to experimental kinetic sorption data was achieved using a similar MATLAB® non-linear least squares fitting routine as described in previous work [34]. Due to the presence of four unknown parameters in Equation 17, caution should be exercised regarding the selection of "initial guess" parameters required by the non-linear least squares fitting routine and how these parameters affect the final optimized model parameters. For example, the functional form of Equation 14 (cf. FIG. 11), especially for large values of $\tau_S$, can resemble the sigmoidal shape of the exponential relaxation term in Equation 17. Selecting a purely non-physical initial guess of 3000 s for $\tau_S$ when modeling the data in FIG. 11b (which clearly has a $\tau_S$ on the order of 200 s), could result in the MATLAB® routine "optimizing" the solution by selecting a local minima in the solution-optimization space which exhibits no physical significance. Consequently, care should be taken to ensure that the final optimized parameters truly reflect the physical phenomena occurring during diffusion. An additional discussion regarding the selection of initial guess parameters in the MATLAB® fitting routine is provided elsewhere [34].

A final note should be mentioned regarding the relative time-scales of both Fickian diffusion and first-order relaxations. Direct comparison of these parameters can be obtained via the Deborah number (De) for diffusion given in Equation 18 [35], where $\tau_R$ is the time constant for the first-order relaxations obtained from Equation 17, and $\tau_D$ is the time constant for Fickian diffusion.

$$De = \frac{\tau_R}{\tau_D} = \frac{\tau_R}{\left(\frac{l^2}{D}\right)} \quad (18)$$

Simple Fickian behavior will be observed in the kinetic uptake data for both limiting cases where De>>1 and De<<1, while diffusion cases which involve comparable diffusion and relaxation time scales (De≈1) require treatment with a relaxation-based model (i.e. BH model). Further discussions on the Deborah diffusion number can be found in the literature [31, 35, 36].

3.2 Sorption/Desorption at 35° C. (First Cycle)

Figure 9:
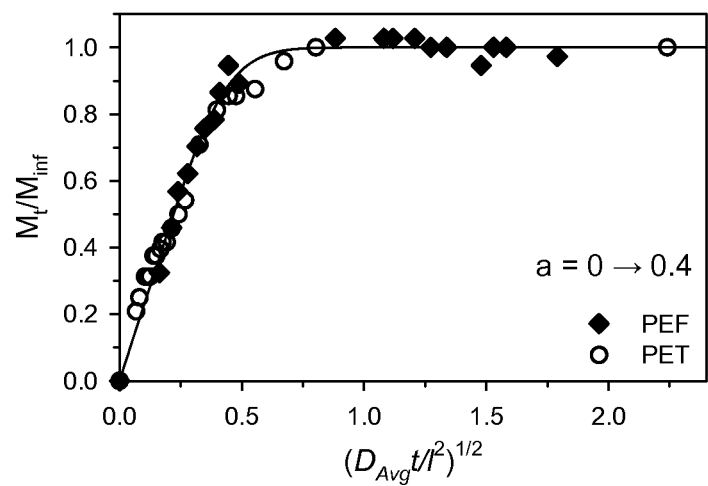
FIG. 9 shows water uptake data at 35° C. for PEF (diamonds) and PET (circles) measured during sorption between 0-0.4 activity using the quartz spring system. Data are plotted versus a non-dimensional time, with the corresponding Fickian fit from Equation 11. Respective $D_{Avg}$ values are provided in the supplemental information.

Water uptake data for both polyesters measured by the manual quartz spring apparatus at low activities can be accurately described by the simple Fickian model from Equation 11. Example quartz spring data are provided in FIG. 9 for water vapor at 35° C. in PEF (diamonds) and PET (circles), and are plotted on the same graph via normalization using a non-dimensional time $(D_{Avg}t/l^2)^{1/2}$. The solid line in FIG. 9 represents the model fit from Equation 11 Similar agreement between Equation 11 and uptake data was also observed for measurements conducted in liquid water at 35° C., and will be discussed later in section 3.3. Diffusion coefficients obtained via the quartz spring method for both polyesters are provided in the supplemental information, and exhibit excellent agreement with the values obtained from automated VTI system.

Figure 10:
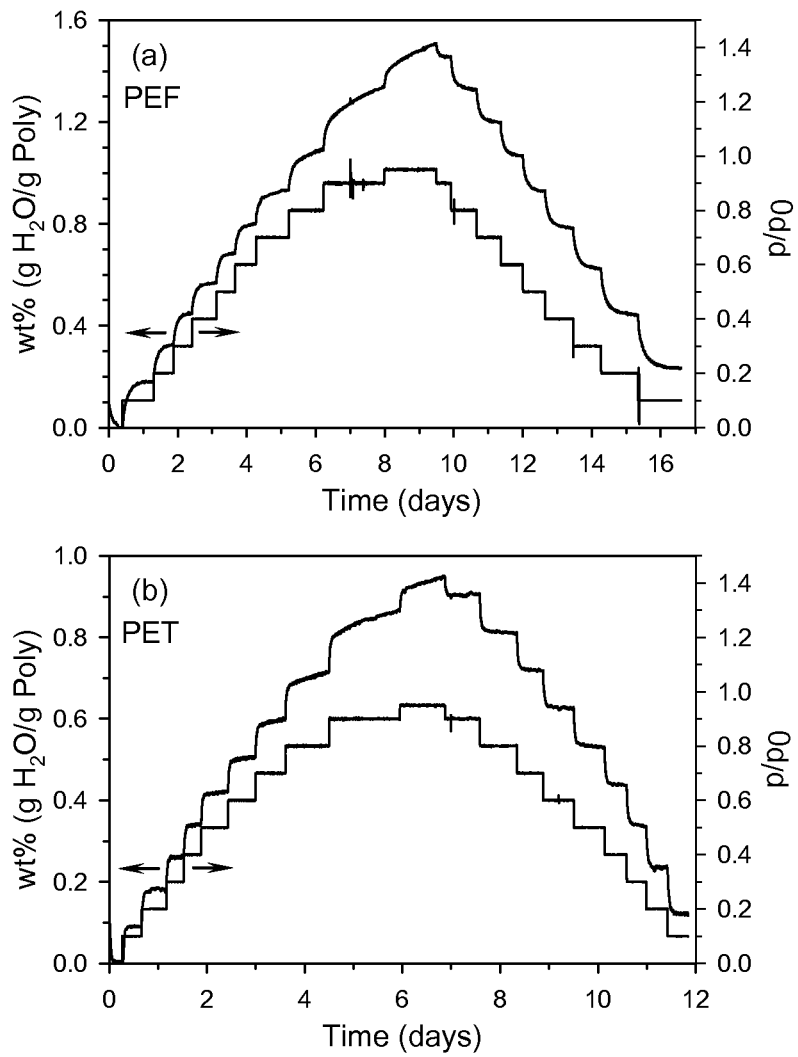
FIG. 10 shows sorption/desorption data for water in PEF at 35° C. from the automated VTI instrument. Both (a) and (b) contain complementary kinetic and equilibrium sorption data for PEF, where the equilibrium sorption data are summarized in FIGS. 6 and 7 of reference [15].

The raw kinetic sorption data measured at 35° C. from the automated VTI system are shown in FIG. 10a for PEF and FIG. 10b for PET between the activity range of 0-0.95 for sorption and subsequent desorption. First examination of FIG. 10 for both polyesters reveals a Fickian-type uptake behavior during sorption up to ~0.6 activity, as evidenced by a functional approach to equilibrium similar to that illustrated in FIG. 9 (i.e. negligible long-term relaxations). After ~0.6 activity, however, long-term non-Fickian relaxations are observed via a protracted incremental increase in sorption capacity. In fact, examination of FIG. 10 for both polyesters reveals that true sorption equilibrium was not reached for uptake curves between 0.6-0.95 activity during initial sorption. Implications of this reality on the final kinetic model parameters, although minor, will be discussed later in the paper. The non-Fickian relaxation behavior observed at high activity is consistent with the onset of sorption-induced morphological changes associated with plasticization and an overall increase in free volume in the conditioned samples. This behavior coincides with the positive deviation from dual-mode sorption observed in Part 1 above ~0.6 activity [15]. Data similar to that in FIG. 10 have also been observed for kinetic water sorption in sulfonated polyimide membranes [37].

The data in FIG. 10 can be partitioned into individual sorption/desorption curves via Equation 10, thereby facilitating application of Equation 17 and extraction of model parameters. The anomalous kinetics introduced by the process control lag are not apparent in FIG. 10 due to the small magnitude of $\tau_S$ (minutes) compared to the time-scale of the overall experiment (days). Closer examination of the kinetic uptake data for PEF from FIG. 10a is provided in FIG. 11a for the sorption interval 0-0.1 activity and in FIG. 11b for the sorption interval 0.1-0.2 activity. The uptake data in FIG. 11 are plotted versus (time)$^{1/2}$ to better illustrate the anomalous kinetics introduced by the control scheme lag, and both the Fickian model from Equation 11 (dashed line) and the BH-Exp model from Equation 17 (solid line) are shown in the figure for comparison. It was consistently observed during VTI operation that any concentration step starting from zero activity exhibited a much larger value of $\tau_S$ than if the instrument initiated a step change starting from a nonzero activity. This notion is demonstrated in FIGS. 11a and 3b, where $\tau_S$=1820 s in FIG. 11a (activity step 0-0.1) and $\tau_S$=214 s in FIG. 11b (activity step 0.1-0.2). Anomalous kinetic uptake curves similar to FIG. 11b have also been observed by Detallante et al. [37], who used a different automated vapor sorption system than in the current disclosure and attributed the anomalous behavior to similar variability in the water vapor concentration at the film surface.

Figure 11:
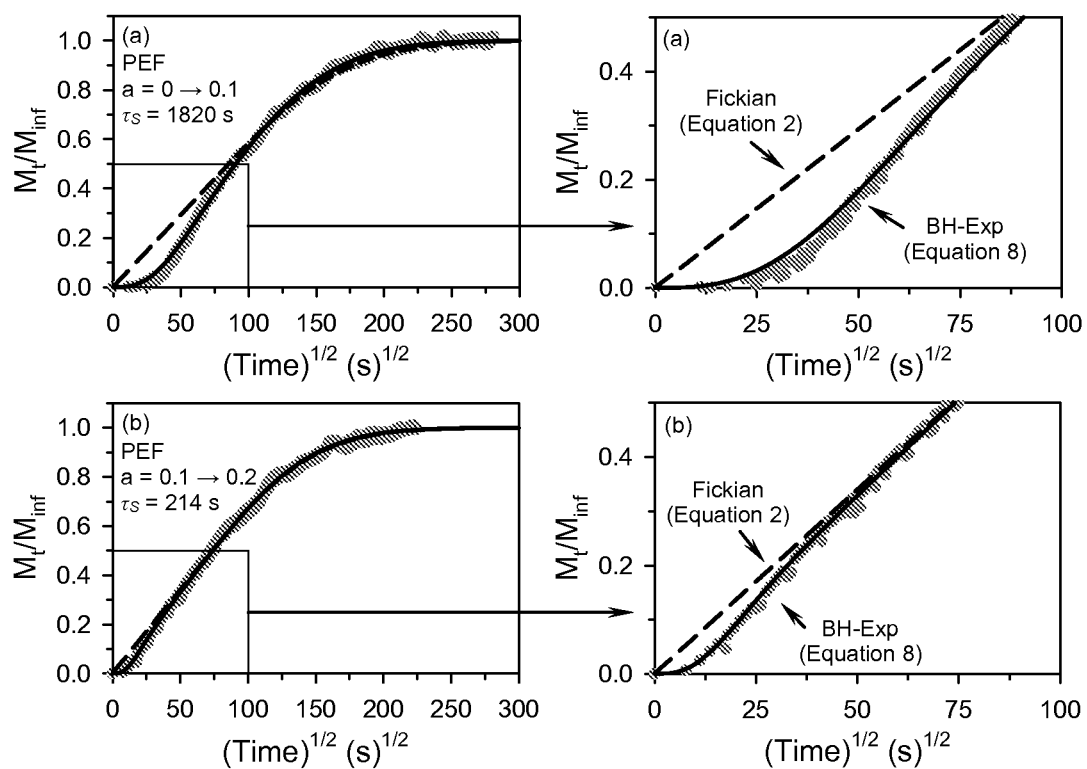
FIG. 11 shows water uptake data at 35° C. measured by the automated VTI system during sorption between 0-0.1 activity (a) and 0.1-0.2 activity (b). Dashed lines represent the Fickian fit from Equation 11, while solid lines represent the BH-Exp fit from Equation 17. Model parameters are as follows: (a) Fickian ($DA_{Avg}=1.55\times10^{-9}$ cm²/s), BH-Exp ($DA_{Avg}=1.83\times10^{-9}$ cm²/s, $\phi_F=1, \tau_R=$not used, $\tau_s=1820$ s), and for (b) Fickian ($D_{Avg}=2.09\times10^{-9}$ cm²/s), BH-Exp ($D_{Avg}=2.14\times10^{-9}$ cm²/s, $\phi_F=1$, $\tau_R=$not used, $\tau_s=214$ s).

In FIG. 11, it is apparent that the BH-Exp model from Equation 17 more accurately describes the experimental data than the ideal Fickian model from Equation 11. The model parameters for all four best fit lines in FIG. 11 are provided in the figure caption. Not surprisingly, differences between diffusion coefficients calculated from the two models are accentuated in FIG. 11a due to the larger value of $\tau_S$ compared to that illustrated in FIG. 11b. Furthermore, a value of $\tau_S$=214 s in FIG. 11b results in only a minor correction to $D_{Avg}$ calculated from the simple Fickian model. Values of $\phi_F$=1 were obtained from modeling Equation 17 to the data shown in FIG. 11, thereby indicating the absence of non-Fickian relaxations over the time-scale of these experiments. Significantly larger deviations between $D_{Avg}$ values calculated from the two models are realized when $\phi_F \ll 1$, as observed in the current disclosure during sorption at high activity for both polyesters.

Figure 12:
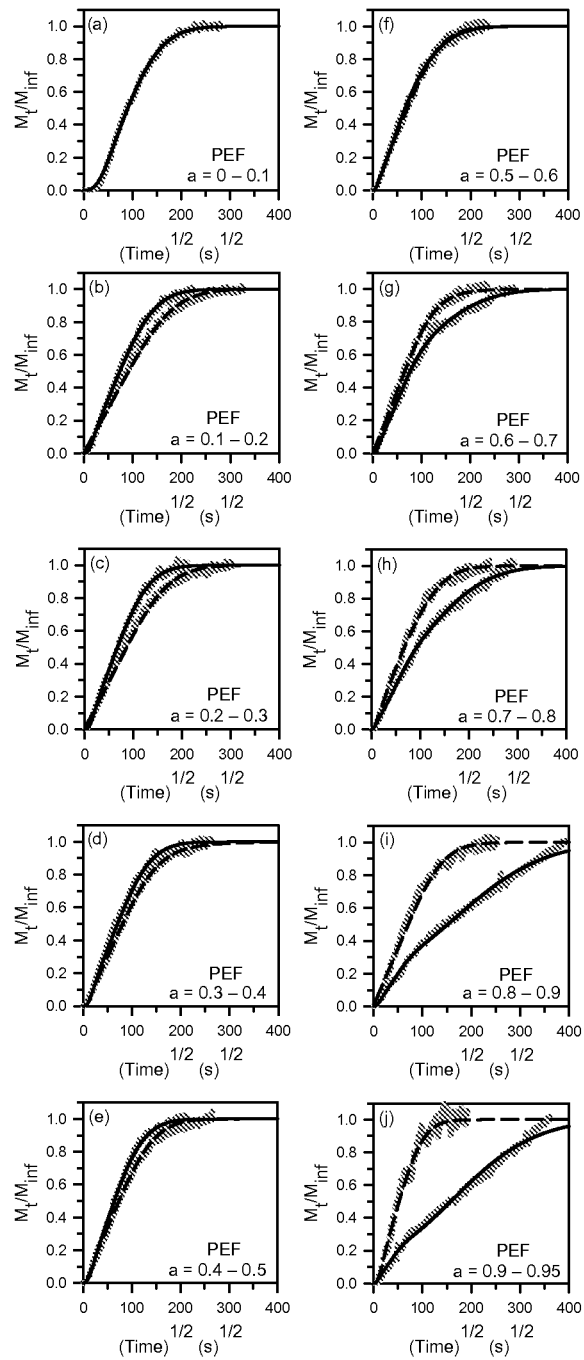
FIG. 12 shows kinetic sorption data from FIG. 10a for water in PEF at 35° C. measured by the VTI system. Lines represent model fits from Equation 17 corresponding to sorption (solid) and subsequent desorption (dashed), while experimental data are represented in grey. The sorption intervals are labeled in each respective graph.
Figure 13:
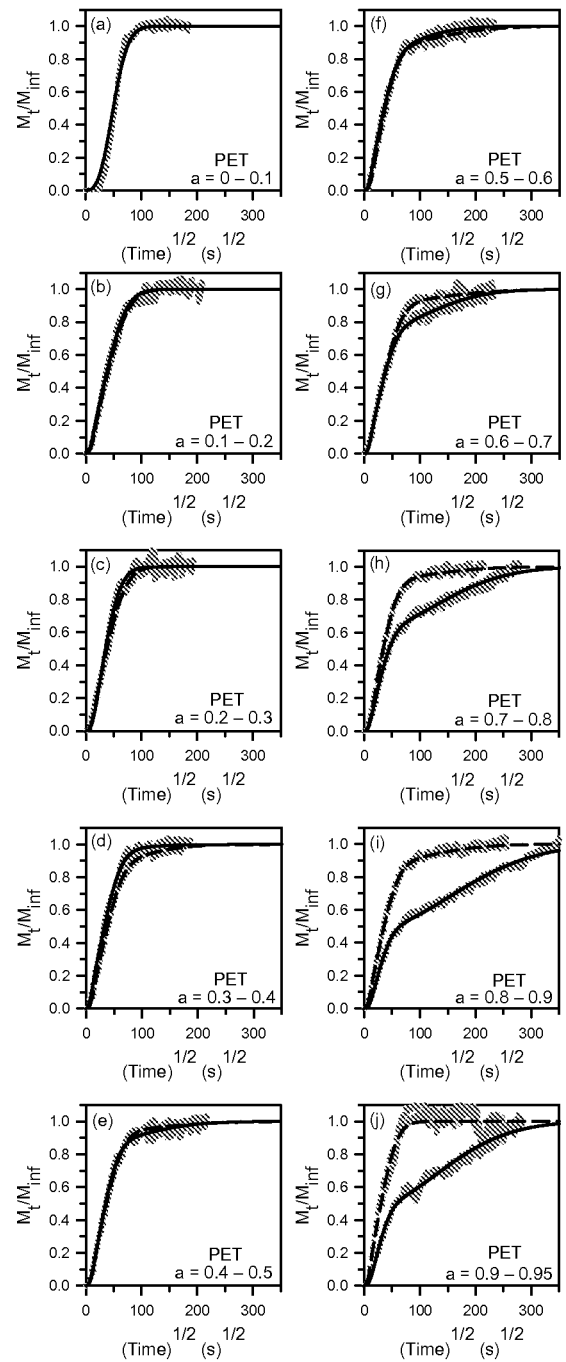
FIG. 13 shows kinetic sorption data from FIG. 10b for water in PET at 35° C. measured by the VTI system. Lines represent model fits from Equation 17 corresponding to sorption (solid) and subsequent desorption (dashed), while experimental data are represented in grey. The sorption intervals are labeled in each respective graph.

Individual partitioning of the sorption/desorption uptake curves depicted in FIG. 10a for PEF is provided in FIG. 12, while the corresponding curves in FIG. 10b for PET are provided in FIG. 13. Sorption/desorption curves measured over the same activity interval (i.e. 0.1-0.2 for sorption, and 0.2-0.1 for desorption) are plotted on the same respective graphs to allow for easy comparison. The solid lines in FIGS. 12 and 13 represent the BH-Exp model fit from Equation 17 to the experimental sorption data, while the dashed lines represent corresponding fits to the desorption data. Desorption data were not measured during the interval 0.1-0, and consequently, only the sorption curve between 0-0.1 activity is represented in FIGS. 12a and 13a.

Figure 14:
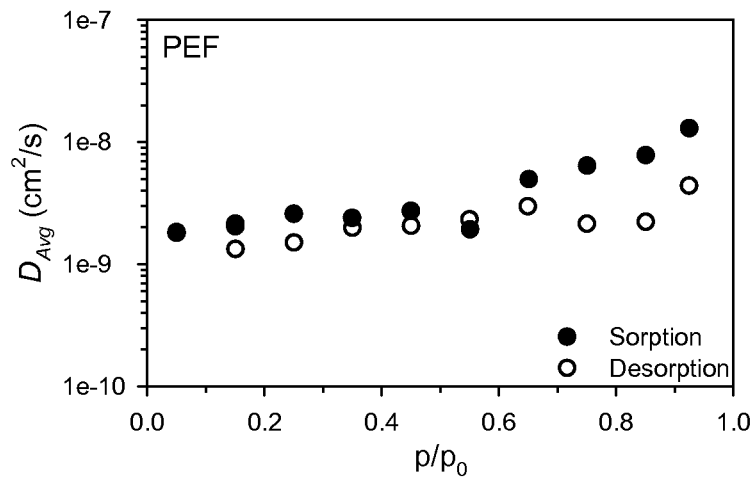
FIG. 14 shows $D_{Avg}$ values from Equation 17 for water in PEF at 35° C. measured from the VTI system. Sorption (solid circles) and subsequent desorption values (hollow circles) are plotted at the midpoint activity of the respective sorption interval, and correlate with model fits to the data in plots (a)-(j) from FIG. 12.
Figure 15:
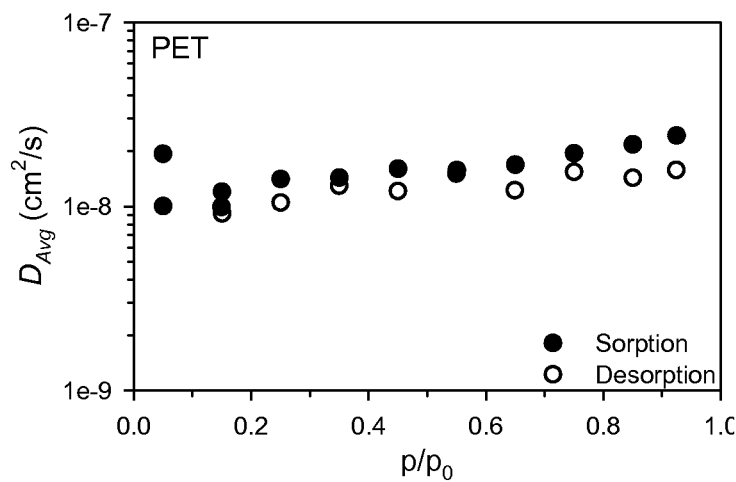
FIG. 15 shows $D_{Avg}$ values from Equation 17 for water in PET at 35° C. measured from the VTI system. Sorption (solid circles) and subsequent desorption (hollow circles) values are plotted at the midpoint activity of the respective sorption interval, and correlate with model fits to the data in plots (a)-(j) from FIG. 13.

Effective diffusion coefficients ($D_{Avg}$) obtained from the BH-Exp model fit to the sorption/desorption data for PEF in FIG. 12 are provided in FIG. 14, with corresponding values for PET from FIG. 13 provided in FIG. 15. From these figures, it is apparent that $D_{Avg}$ exhibits a positive correlation with increasing concentration during sorption for both polyesters, with the same behavior observed during subsequent desorption. The initial increase in $D_{Avg}$ values up to 0.6 activity can be described by typical dual-mode behavior, and is discussed fully in the supplemental information. Above 0.6 activity, however, positive deviations from ideal dual-mode behavior correlate with increased segmental mobility resulting from penetrant-induced plasticization. This behavior is opposite to that expected for penetrant clustering, which exhibits a decrease in diffusion coefficient with increasing concentration due to the larger kinetic diameter of the diffusing species [38, 39].

Data in FIGS. 14 and 15 also reveal slightly larger $D_{Avg}$ values for sorption compared to respective desorption values for both polyesters. This behavior is consistent when considering the positive correlation between $D_{Avg}$ and concentration. Crank notes that sorption is typically faster than desorption when the diffusion coefficient increases with concentration [19]. Regardless, the $D_{Avg}$ values for sorption and desorption are similar in magnitude over the entire concentration range, which is similar to the behavior observed for water diffusion in polysulfone (PSF) [40]. The trends in FIGS. 14 and 15 for PEF and PET, respectively, contrast those observed for water in polyethersulfone [41], 20% poly(vinyl pyrrolidone)/PSF [40], and water in some polyimides [42], where the latter polymers exhibit a decreasing $D_{Avg}$ with increasing concentration for sorption at high activity due to the presence of clustering.

A more accurate estimate of the true diffusion coefficient dependence vs. activity can be obtained by averaging the diffusion coefficients obtained during sorption and subsequent desorption over the same respective interval [19, 43]. Average diffusion coefficients obtained via this method are represented by $D_{(s+d)/2}$, where s and d represent sorption and desorption, respectively. $D_{(s+d)/2}$ values corresponding to both PEF and PET are plotted together in FIG. 16 to allow for easy comparison. A note regarding this average is that the morphology of the polyester material is slightly altered after initial sorption at high activity. Recall that the sorption steps were performed in series between 0-0.95 activity, followed by the desorption steps in series between 0.95-0 activity. Morphological changes in the polymer are observed via the non-Fickian relaxations in the current disclosure and by the distinct sorption hysteresis observed in FIGS. 14 and 15 presented in the disclosure at Part 1 [15]. Values of $D_{(s+d)/2}$ for PET divided by respective values for PEF between 0-0.95 activity vary from ~6.2 to ~2.3 at the low and high activity limits, respectively, with an average value of 5.0 across the entire concentration range. Reduced diffusion coefficients for PEF compared to PET originate from inherent differences in segmental mobility, as discussed elsewhere [5]. Similar diffusion coefficient behavior to that observed in FIG. 16 has been observed for both semicrystalline PET and amorphous poly(ethylene naphthalate) (PEN) [13], which exhibits similar rigidity to PEF.

Figure 16:
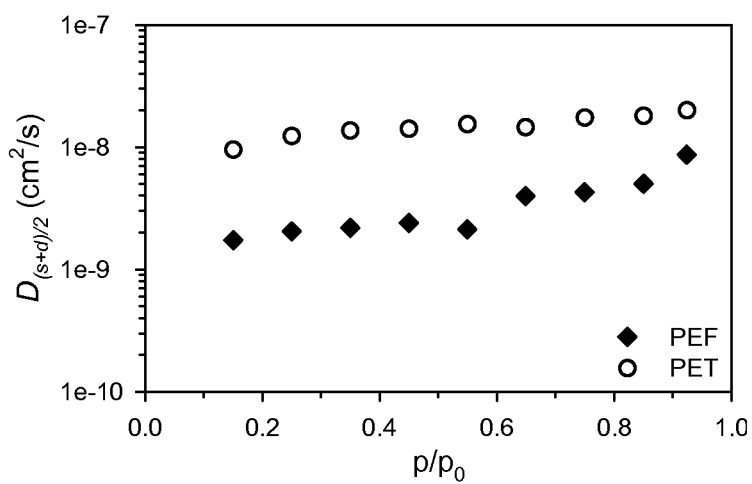
FIG. 16 shows sorption and desorption averaged diffusion coefficients ($D_{(s+d)/s}$) measured from the VTI system for water in PEF (diamonds) and PET (circles) at 35° C.
Figure 17:
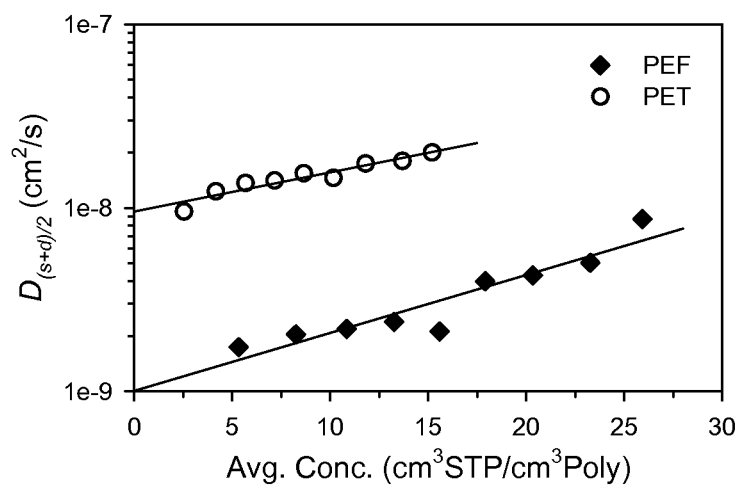
FIG. 17 shows diffusion coefficients from FIG. 16 versus equilibrium water concentration at 35° C. for PEF (diamonds) and PET (circles). Lines reflect model fits from Equation 19, and respective model parameters are included in the text.

The average diffusion coefficient data presented in FIG. 16 for both polyesters can also be plotted as a function of equilibrium water concentration ($cm^3$STP/$cm^3$Poly), which can be obtained from FIGS. 14 and 15 in Part 1 [15] for PEF and PET, respectively. Values of $D_{(s+d)/2}$ from FIG. 16 are plotted in FIG. 17 versus the average equilibrium concentration, which reflects the average concentration from beginning to end of the interval and averaged again between sorption and desorption concentrations to account for sorption hysteresis. The lines in FIG. 17 represent model fits from Equation 19, which assumes an exponential dependence for the diffusion coefficient on concentration.

$$D = D_\infty \exp(\beta C_{Avg}) \quad (19)$$

In Equation 19, $C_{Avg}$ represents the aforementioned average concentration, $\beta$ is a constant, and $D_\infty$ is the infinite dilution diffusion coefficient. Model parameters from Equation 19 for PEF are $D_\infty = 1.0 \times 10^{-9}$ $cm^2$/s and $\beta = 0.073$ ($cm^3$STP/$cm^3$Poly)$^{-1}$, while corresponding model parameters for PET are $D_\infty = 9.6 \times 10^{-9}$ $cm^2$/s and $\beta = 0.049$ ($cm^3$STP/$cm^3$Poly)$^{-1}$. Reports in the literature suggest that values for $\beta$ increase with increasing penetrant size for diffusion in PET, and the value of 0.049 for PET from the current disclosure is significantly lower than values reported for ethanol, n-propanol, i-propanol, i-butane, and ethyl acetate [21, 44, 45]. Additionally, PEF exhibits a larger concentration dependence than PET as evidenced by the slightly larger value for $\beta$. Such results are consistent with the observation of Chandra and Koros [21], who suggested a positive correlation between concentration dependence and interaction between penetrant and polymer matrix. The latter notion is discussed in Part 1 [15], where water is shown to exhibit higher compatible with PEF vs. PET due to the polar furan ring.

Figure 18:
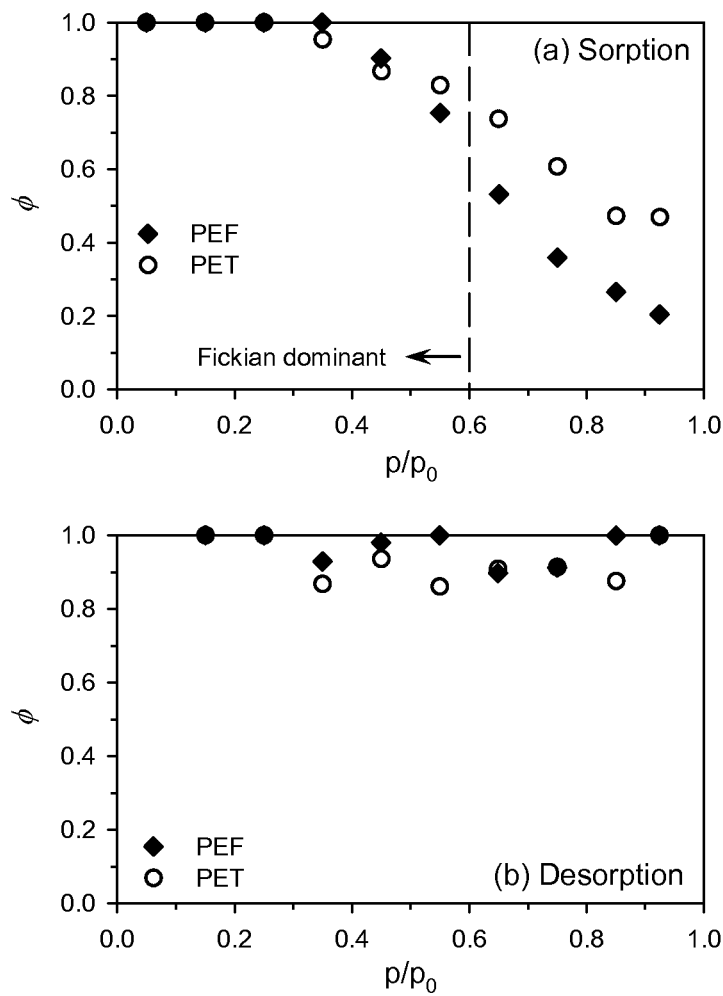
FIG. 18 shows a plot of $\phi_F$ from Equation 17 for water at 35° C. in PEF (solid diamonds) and PET (hollow circles) measured by the VTI system for sorption (a) and desorption (b).
Figure 19:
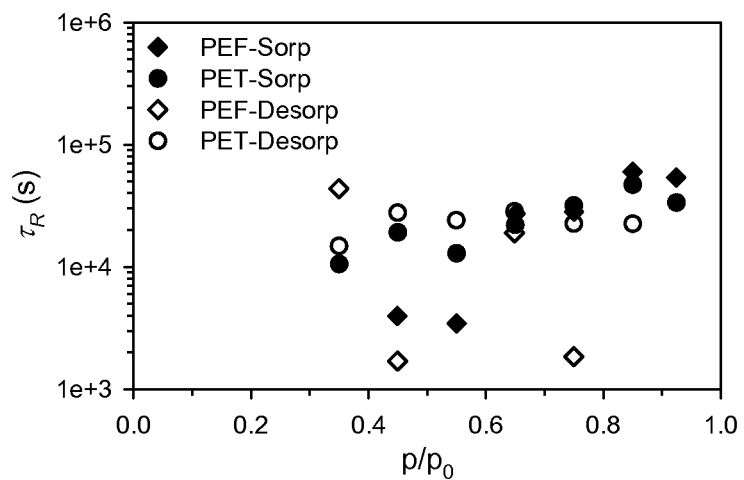
FIG. 19 shows a plot of $\tau_R$ from Equation 17 for water at 35° C. in PEF (diamonds) and PET (circles) measured by the VTI system for sorption (filled) and desorption (hollow). Values of $\tau_R$ are only provided for values of $\phi_F<1$ from FIG. 18.

The presence of non-Fickian relaxations during sorption at high activity (>0.6) for both polyesters is apparent via the long, protracted approach to equilibrium observed in FIGS. 10, 12, and 13. Similar non-Fickian behavior to that reported in the current disclosure has been reported by Schult and Paul [46] in their work regarding water sorption in polyethyloxazoline and polyethersulfone, and in additional studies regarding water sorption in PET [2, 47]. The onset of non-Fickian behavior in the current disclosure is best visualized by a plot of the respective $\phi_F$ values from Equation 17 for the best-fit models illustrated in FIG. 12 for PEF and FIG. 13 for PET. A plot of $\phi_F$ vs. activity during initial sorption is provided in FIG. 18a for both PEF (diamonds) and PET (circles), with the corresponding graph for desorption included in FIG. 18b. Simple Fickian diffusion is dominant during sorption up to 0.6 activity, as evidenced by $\phi_F$ values near unity for both polyesters in FIG. 18a. Alternatively, a large systematic decrease in $\phi_F$ is observed above 0.6 activity during sorption, thereby indicating a transition to relaxation-dominated mass uptake. Fickian kinetics dominate the desorption process, as observed by $\phi_F$ values near unity for both polyesters in FIG. 18b over the entire concentration range. It is also known that a slightly retarded approach to equilibrium during the final stages of desorption can accompany the specific type of concentration dependence observed in the current disclosure [19]. This protracted approach to equilibrium during desorption can also potentially result from deswelling of the previously swollen matrix, as observed by Berens [48] in the case of vinyl chloride sorption in poly(vinyl chloride) or by Bagley and Long [49] in the case of acetone sorption in cellulose acetate. Consequently, the values of $\phi_F$ not equal to unity in FIG. 18b are potentially a result of the relaxation-based model attempting to describe this deswelling process or the protracted approach resulting from the concentration dependence of the diffusion coefficient. Nevertheless, the observation of predominantly Fickian kinetics upon desorption is consistent with the notion that the collapse of extra free-volume which was introduced during sorption occurs significantly slower than the Fickian desorption process, thereby resulting in the appearance of Fickian kinetics [40, 48]. A brief discussion regarding the persistence of the morphological changes is provided in Part 1, which illustrates sorption hysteresis in both polyesters [15]. The remaining BH-Exp model parameters from Equation 17 for the best-fit curves in FIGS. 12 and 13 are provided in FIG. 19 for $\tau_R$ and in FIG. 20 for $\tau_S$.

Values of $\tau_R$ from Equation 17 can only be evaluated accurately via the MATLAB® modeling technique when $\phi_F < 1$. Consequently, FIG. 19 only reports $\tau_R$ values in conjunction with the respective $\phi_F$ parameters depicted in FIG. 18a during sorption, which are less than unity above ~0.5 activity. Corresponding $\tau_R$ values for desorption are also only provided for values of $\phi_F < 1$ as reported in FIG. 18b. It is interesting to observe that both PEF and PET exhibit similar relaxation rates during sorption at high activity despite seemingly large differences in segmental mobility [5].

Figure 20:
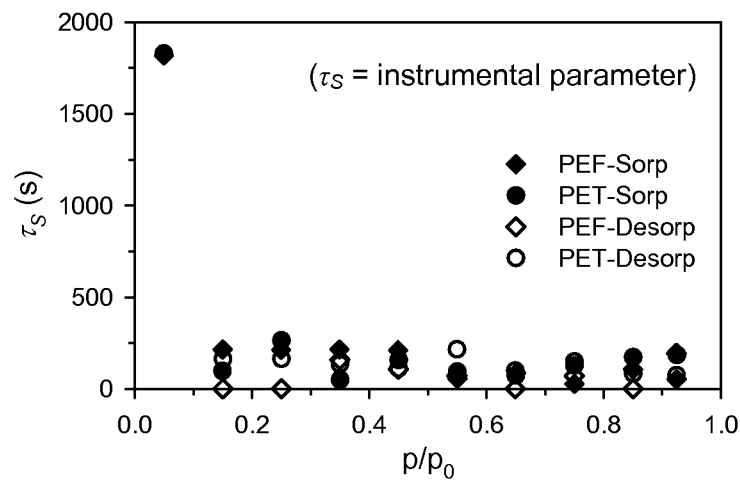
FIG. 20 shows a plot of $\tau_S$ from Equation 17 for water at 35° C. in PEF (diamonds) and PET (circles) measured by the VTI system for sorption (solid) and desorption (hollow). Recall that tis is an instrumental parameter, and does not reflect intrinsic properties of the polymer.

Values of the instrumental time constant associated with the process control lag ($\tau_S$) are plotted in FIG. 20 for PEF (diamonds) and PET (circles) during both sorption (solid) and desorption (hollow). To reiterate, $\tau_S$ is not a fundamental polymer parameter and is employed solely to remove the anomalous behavior introduced by the instrument control lag. Consequently, $\tau_S$ is approximately constant during the activity range between 0.1-0.95 for both polyesters. The exception is the interval starting from zero, which consistently produced larger values of $\tau_S$. As a consistency check, all values of $\tau_S$ reported in FIG. 20 were significantly smaller than $(l^2/D_{Avg})$, which is the respective time scale for diffusion. Automated VTI measurements using argon and helium in addition to nitrogen are provided in the supplemental information between the interval 0.1-0.2 activity to further explain the choice of Equation 17 and role of $\tau_S$ in the current disclosure.

As mentioned previously, extra time was allotted to allow for completion of sorption at activities greater than 0.6 (cf. FIGS. 10, 12, and 13); however, the uptake curves did not reach complete equilibrium and were still increasing when the system proceeded to the next activity step. This effect is accentuated at the highest sorption interval between 0.9-0.95 activity, which corresponds with the upswing in equilibrium vs. concentration reported in Part 1 [15]. Berens [48], who studied vinyl chloride sorption in poly(vinyl chloride), also terminated his runs before true equilibrium was reached due to excessively lengthened experiment times.

Recall that the diffusion model provided in Equation 17 represents a linear superposition of both Fickian and relaxation terms, where both are assumed to occur independently of the other [30]. Since enough time was allowed in FIGS. 12 and 13 to fully span the timescale needed for Fickian diffusion, it is possible, in theory, to obtain accurate values of the diffusion coefficient without reaching true uptake equilibrium [49]. Furthermore, not achieving true equilibrium due to the presence of relaxations should only affect the model parameters associated with the relaxation process, which are $\phi_F$ and $\tau_R$ in Equation 17. The end-result for the relaxation-based model parameters will be 1) a further decrease in $\phi_F$ than illustrated in FIG. 18a due to the larger contribution from the relaxation mode, and 2) an increase in $\tau_R$ for the values illustrated in FIG. 19 due to longer time needed for completion of the relaxation process. Only one relaxation term in the BH framework was considered in Equation 17 for simplicity and to achieve "uniqueness" in the final model parameters. It is possible, however, that additional relaxation terms in the BH framework might be needed to model the complete uptake curve in the case of achieving true equilibrium. Consequently, the relaxation parameters provided in FIGS. 18 and 19 serve the purpose of providing a workable, phenomenological description of the relaxation process in both polyesters. Continuing with the aforementioned discussion, the diffusion coefficients calculated in the absence of long-term relaxations (i.e. $p/p_0$<0.6 during sorption, and all activities during desorption) reflect a higher degree of confidence in the optimized values, while more uncertainty exists in the optimized values for $DA_{Avg}$ during sorption at high activity due to the large relaxation contribution from Equation 17.

3.3 Sorption/Desorption at 35° C. (Second Cycle) and Sorption at Unit Activity

The values for $D_{Avg}$ reported in FIGS. 14 (PEF) and 15 (PET) are for initial sorption (solid circles) and subsequent desorption (hollow circles). Recall that equilibrium uptake hysteresis was detailed in Part 1 of this disclosure, which included data for a second sorption cycle to examine the persistence of the sorption-induced morphological changes (cf. FIGS. 6 and 7 in [15]). The kinetic counterpart to the equilibrium data during the second sorption cycle at 35° C. will now be presented.

Sorption during the second cycle consisted of larger concentration intervals than used initially (i.e. 0-0.3, 0.3-0.6, and 0.6-0.95 for sorption, and 0.95-0.6, 0.6-0.3, 0.3-0.05 for desorption). Values of the average diffusion coefficient from sorption and desorption (i.e. $D_{(s+d)/2}$, discussed previously) during the second cycle at 35° C. are plotted via the hollow circles at the midpoint of the concentration interval in FIG. 21 for PEF and FIG. 22 for PET. Corresponding $D_{(s+d)/2}$ values obtained during the first cycle are plotted in FIGS. 21 and 22 (hollow diamonds) for comparison. Parameter values for the additional model parameters from the BH-Exp model (Equation 17) are similar to those reported for initial sorption (cf. FIGS. 18-20), and are not included.

Figure 21:
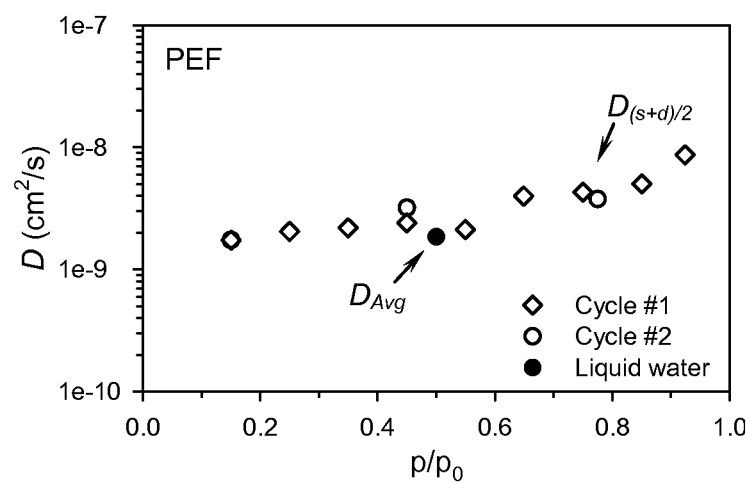
FIG. 21 shows diffusion coefficients for water in PEF at 35° C. Data for the first sorption cycle (hollow diamonds) and second sorption cycle (hollow circles) represent values of $D_{(s+d)/2}$, while the solid circle represents $D_{Avg}$ measured during sorption from 0-1 activity. Values are plotted at the midpoint of their respective activity intervals.
Figure 22:
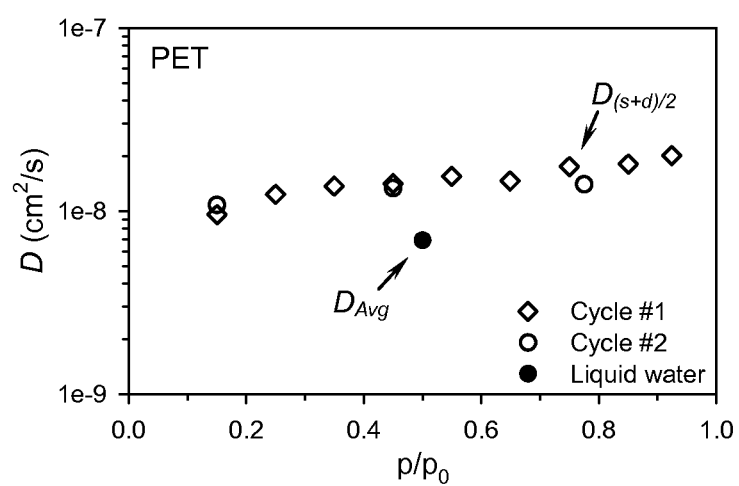
FIG. 22 shows diffusion coefficients for water in PET at 35° C. Data for the first sorption cycle (hollow diamonds) and second sorption cycle (hollow circles) represent values of $D_{(s+d)/2}$, while the solid circle represents $D_{Avg}$ measured during sorption from 0-1 activity. Values are plotted at the midpoint of their respective activity intervals.

Inspection of the diffusion coefficients in FIGS. 21 and 22 reveals excellent reproducibility between the average values during sorption/desorption for both the initial and subsequent sorption cycles. Not shown in FIGS. 21 and 22 are the separate diffusion coefficients obtained during sorption and subsequent desorption during the second sorption cycle. In fact, these respective values for both polyesters exhibited much closer agreement than the sorption/desorption values during the initial sorption cycle reported in FIGS. 14 and 15. This notion is consistent with the work of Berens [48], who hypothesized that the diffusion coefficients obtained during sorption and desorption would eventually converge if enough sorption cycles were performed.

Figure 23:
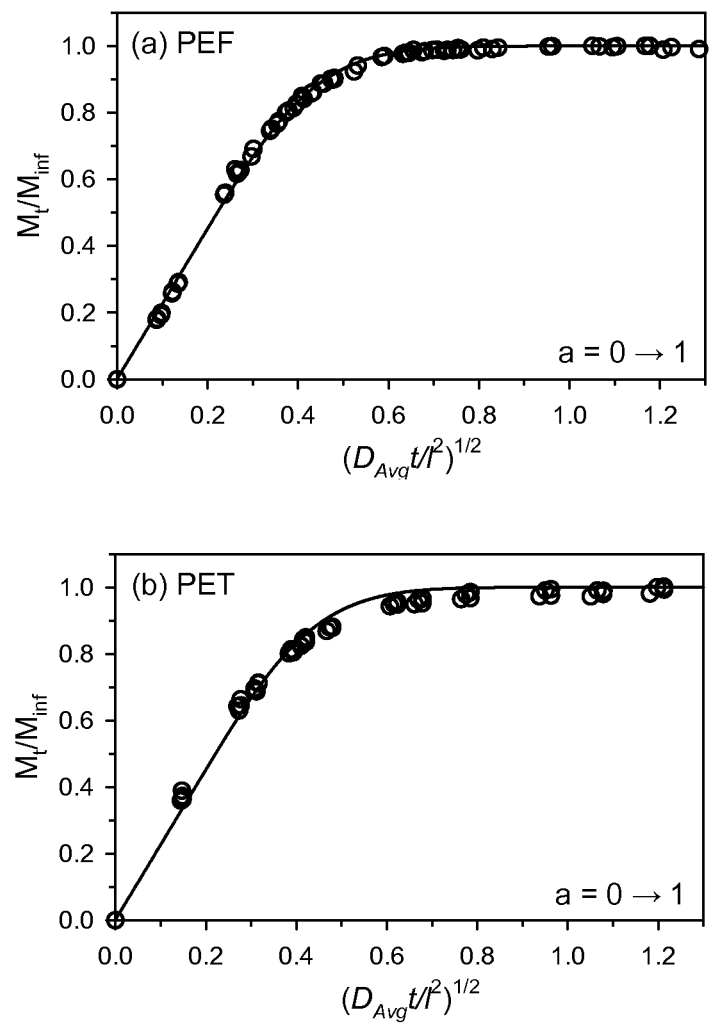
FIG. 23 shows kinetic sorption data during sorption between 0-1 activity for water at 35° C. in PEF (a) and PET (b). Lines represent the Fickian model fit from Equation 11, and corresponding $D_{Avg}$ values for PEF and PET plotted in FIGS. 21 and 22, respectively. Both (a) and (b) reflect normalized data from four separate sorption experiments.

As mentioned previously, uptake experiments at unit activity were performed using a gravimetric liquid water method. Kinetic uptake curves resulting from this method were predominantly Fickian despite the high activity of water, due to the thickness of the films needed to ensure large, experimentally accessible timescales for diffusion. Correspondingly, Deborah numbers (De) for both polyesters were significantly less than unity (i.e. De≈0.04 for PEF, De≈0.03 for PET), so the appearance of Fickian kinetics is not surprising. Kinetic uptake curves representing data from four separate sorption experiments are provided in FIG. 23 (a) for PEF and (b) for PET, and are plotted versus a non-dimensional time $(D_{Avg}t/l^2)^{1/2}$ to normalize differences in film thickness. Values for the diffusion coefficient measured during sorption ($D_{Avg}$) are provided for both polyesters in FIGS. 21 and 22 via the filled circles, and are plotted at the midpoint of the sorption interval (0.5 activity).

The value of $D_{Avg}$ plotted in FIG. 21 (filled circle) for PEF exhibits excellent agreement with the corresponding diffusion coefficients measured from the automated VTI instrument. However, the respective value for PET plotted in FIG. 22 (filled circle) is slightly lower than the values measured from the VTI instrument. Diffusion coefficients measured at unit activity in the literature for amorphous PET are somewhat varied [47, 50, 51], but are similar in magnitude to the value reported in the current disclosure.

3.4 Transport Energetics

In addition to the above measurements at 35° C., kinetic uptake curves were also measured at 15, 25, and 45° C. between the activity interval 0.1-0.2 for both polyesters. Equilibrium uptake data at 0.2 activity for all four temperatures are presented in Part 1 [15], which also reports estimates for the enthalpy of sorption for water in both polyesters. Measurements were performed between 0.1-0.2 activity to ensure simple Fickian diffusion ($\phi_F$=1) and to avoid large values of $\tau_S$ (discussed previously) associated with the sorption interval starting from zero. The resulting kinetic uptake curves were predominantly Fickian, with correspondingly small values of $\tau_S$ consistent with those reported in FIG. 20. The temperature dependence of the diffusion coefficients can be described via the Arrhenius representation in Equation 20 [52], where $E_D$ is the activation energy of diffusion (kJ/mol), R is the universal gas constant, and $D_0$ is the pre-exponential factor. Values of $D_{Avg}$ measured at 15, 25, 35, and 45° C. are plotted in semi-logarithmic form in FIG. 24 for both PEF (diamonds) and PET (circles). The lines represent the corresponding fits from Equation 20, and the uncertainty limits for $E_D$ are taken from the standard error of the model fits.

$$D = D_0 \exp(-E_D/RT) \quad (20)$$

Figure 24:
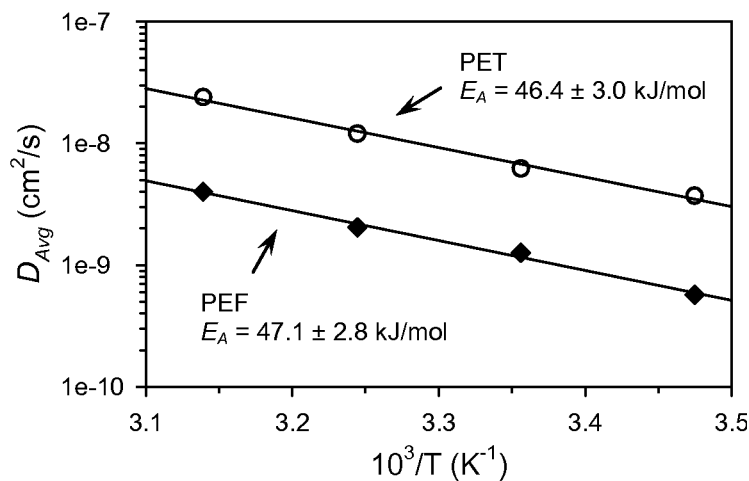
FIG. 24 shows temperature-dependent diffusion coefficients for PEF (diamonds) and PET (circles) measured during sorption between 0.1-0.2 activity. Lines reflect model fits from Equation 20.

Excellent linearity is observed in the Arrhenius model fits in FIG. 24, thereby giving confidence to the $E_D$ values of 47.1±2.8 kJ/mol for PEF and 46.4±3.0 kJ/mol for PET. Values of $E_D$ reported in the literature for water diffusion in both semicrystalline and amorphous PET are similar to those reported in the current disclosure for amorphous PET [47, 51, 53, 54], while no additional data exists in the literature for PEF. Quick inspection of the $E_D$ values for PEF and PET in FIG. 24 reveals a slightly higher value for PEF; however, the uncertainty limits result in statistically indistinguishable values for both polyesters. The $E_D$ values shown in FIG. 24 for water diffusion reveal distinct similarity to the respective $E_D$ values for oxygen diffusion in both polyesters [16]. Such behavior is consistent with the work of Yasuda and Stannett, who reported similar $E_D$ values for water and oxygen in the same polymer for rubber hydrochloride, PET, ethyl cellulose, and polypropylene [53].

Values of the effective enthalpy of water sorption ($\Delta H_S$) for both polyesters are calculated in Part 1, and reflect values of −47.5±0.6 kJ/mol for PEF and −47.0±0.6 kJ/mol for PET [15]. Combination of the enthalpy of sorption with the activation energy of diffusion for both polyesters yields an estimate for the effective activation energy of permeation ($E_P$), which can be calculated via Equation 21. Estimates of $E_P$ for water in PEF and PET are provided in Table 5, where the uncertainty limits originate from the standard error of the fit.

$$E_P = E_D + \Delta H_S \tag{21}$$

TABLE 5

Transport energetics for water in PEF and PET. Values of ΔHs are calculated in Part 1 [15].

|  | $E_D$ (kJ/mol) | $\Delta H_S$ (kJ/mol) | $E_P$ (kJ/mol) |
|---|---|---|---|
| PEF | 47.1 ± 2.8 | −47.5 ± 0.6 | −0.4 ± 2.8 |
| PET | 46.4 ± 3.0 | −47.0 ± 0.6 | −0.6 ± 3.1 |

Values of Ep reported in Table 5 exhibit small values close to zero, thereby reflecting a weak temperature dependence for water permeability in both polyesters over the measured activity range (0.1-0.2) Similar $E_P$ values for semicrystalline PET are reported in the literature [55, 56]. As a reminder, the $E_P$ values for both polyesters reported in Table 2 are first estimates, and will ideally be validated in the future by independent permeation tests.

4. Summary

This disclosure investigates the kinetic uptake properties of water in amorphous PEF and PET across the entire water activity interval at 35° C., and complements our prior study which investigates the corresponding equilibrium uptake properties at the same conditions [15]. Similar to previous work, uptake data was measured using three independent and complementary methodologies. Excellent agreement was observed between all three methodologies, thereby providing a consistency check for the reported data.

Simple Fickian behavior was observed for water diffusion in both polyesters up to ~0.6 activity, after which the presence of non-Fickian relaxations required treatment with the Berens-Hopfenberg model. Anomalous curvature was introduced in all uptake data measured by the automated VTI instrument due to lag introduced by the control scheme. Such anomalous behavior was successfully accounted for via implementation of the formal diffusion model proposed by Long and Richman [23]; however, the physical significance of the parameters are totally different in the two cases. In fact, the use of the Long and Richman model in the present case is simply for the sake of convenience, while the coefficients in the original Long and Richman work related to actual molecular relaxation times.

Both polyesters exhibited a positive correlation between diffusion coefficient and increasing concentration over the entire concentration range. Diffusion coefficient data between 0-0.6 activity can be described using the partial immobilization model (cf. supplemental information), after which positive deviations from dual mode behavior indicate the likely presence of plasticization. Permeation experiments, which were not conducted in this disclosure, are ultimately needed to further verify the presence of either plasticization or clustering at high activity in both polyesters.

PEF exhibits a significantly reduced water diffusion coefficient of ~5× averaged over the entire concentration range compared to PET at 35° C. The reduction in diffusion coefficient for PEF vs. PET originates from the reduction in segmental mobility due to the non-symmetrical furan ring in PEF compared to the symmetrical phenyl ring in PET [5]. Additionally, the added polarity of the furan ring in PEF imparts the increased equilibrium water solubility of ~1.8× averaged over the entire concentration range compared to PET [15]. The respective increase in solubility and decrease in diffusivity for water in PEF vs. PET can be combined using the common relationship P=DS to provide a permeability comparison for both polyesters. Multiplication of the aforementioned parameters yields an average permeability reduction of ~2.8× for water in PEF compared to PET at 35° C. over the entire concentration interval. This value is similar to the ~2× permeability reduction for PEF vs. PET reported by Avantium [17]. This disclosure, in combination with the Part 1 work [15], provides the first detailed investigation of water transport in PEF.

REFERENCES

1. Hodge R M, Bastow T J, Edward G H, Simon G P, and Hill A J. Free Volume and the Mechanism of Plasticization in Water-Swollen Poly(vinyl alcohol). Macromolecules 1996; 29(25):8137-8143.
2. Bastioli C, Guanella I, and Romano G. Effects of water sorption on the physical properties of PET, PBT, and their long fibers composites. Polymer Composites 1990; 11(1): 1-9.
3. Mali S, Sakanaka L S, Yamashita F, and Grossmann M V E. Water sorption and mechanical properties of cassava starch films and their relation to plasticizing effect. Carbohydrate Polymers 2005; 60(3):283-289.
4. Lahokallio S, Saarinen K, and Frisk L. Changes in water absorption and modulus of elasticity of flexible printed circuit board materials in high humidity testing. Microelectronics and Packaging Conference (EMPC), 2011 18th European, 2011. pp. 1-6.
5. Burgess S K, Leisen J E, Kraftschik B E, Mubarak C R, Kriegel R M, and Koros W J. Chain Mobility, Thermal, and Mechanical Properties of Poly(ethylene furanoate) Compared to Poly(ethylene terephthalate). Macromolecules 2014; 47(4): 1383-1391.
6. Gruter G-J M, Sipos L, and Adrianus Dam M. Accelerating research into bio-based FDCA-polyesters by using small scale parallel film reactors. Combinatorial Chemistry & High Throughput Screening 2012; 15(2):180-188.
7. Gandini A, Silvestre A J D, Neto C P, Sousa A F, and Gomes M. The furan counterpart of poly(ethylene terephthalate): An alternative material based on renewable resources. Journal of Polymer Science Part A: Polymer Chemistry 2009; 47(1):295-298.
8. Gomes M, Gandini A, Silvestre A J D, and Reis B. Synthesis and characterization of poly(2,5-furan dicarboxylate)s based on a variety of diols. Journal of Polymer Science Part A: Polymer Chemistry 2011; 49(17):3759-3768.
9. Papageorgiou G Z, Tsanaktsis V, and Bikiaris D N. Synthesis of poly(ethylene furandicarboxylate) polyester using monomers derived from renewable resources: thermal behavior comparison with PET and PEN. Physical Chemistry Chemical Physics 2014.
10. Knoop R J I, Vogelzang W, van Haveren J, and van Es D S. High molecular weight poly(ethylene-2,5-furanoate); key aspects in synthesis and mechanical property determination. Journal of Polymer Science Part A: Polymer Chemistry 2013; 51(19):4191-4199.

11. Gopalakrishnan P, Narayan-Sarathy S, Ghosh T, Mahajan K, and Belgacem M. Synthesis and characterization of bio-based furanic polyesters. Journal of Polymer Research 2013; 21(1):1-9.
12. Tonelli A E. PET versus PEN: what difference can a ring make? Polymer 2002; 43(2):637-642.
13. Rueda D R and Varkalis A. Water Sorption/Desorption Kinetics in Poly(Ethylene Naphthalene-2,6-Dicarboxylate) and Poly(Ethylene Terephthalate). Journal of Polymer Science Part B: Polymer Physics 1995; 33:2263-2268.
14. Rueda D R, Viksne A, Kajaks J, Balta-Calleja F J, and Zachmann H G. Properties of arylpolyesters with reference to water content. Macromolecular Symposia 1995; 94(1):259-268.
15. Burgess S K, Mikkilineni D S, Yu D, Kim D J, Mubarak C R, Kriegel R M, and Koros W J. Water Sorption in Poly(ethylene furanoate) Compared to Poly(ethylene terephthalate). Part I: Equilibrium Sorption. Polymer 2014; Submitted.
16. Burgess S K, Karvan O, Johnson J R, Kriegel R M, and Koros W J. Oxygen Sorption and Transport in Amorphous Poly(ethylene furanoate). Polymer 2014;Submitted.
17. Avantium—PEF bottles. www.avantium.com.
18. McBain J W and Bakr A M. A NEW SORPTION BALANCE1. Journal of the American Chemical Society 1926; 48(3):690-695.
19. Crank J. The Mathematics of Diffusion, 2nd ed.: Oxford Science Publications, 1975.
20. Chandra P and Koros W J. Sorption and transport of methanol in poly(ethylene terephthalate). Polymer 2009; 50:236-244.
21. Chandra P and Koros W J. Sorption of lower alcohols in poly(ethylene terephthalate). Polymer 2009; 50:4241-4249.
22. Crank J and Park G S. Diffusion in Polymers. London: Academic Press, 1968.
23. Long F A and Richman D. Concentration Gradients for Diffusion of Vapors in Glassy Polymers and their Relation to Time Dependent Diffusion Phenomena1,2. Journal of the American Chemical Society 1960; 82(3):513-519.
24. Rodriguez O, Fornasiero F, Arce A, Radke C J, and Prausnitz J M. Solubilities and diffusivities of water vapor in poly(methylmethacrylate), poly(2-hydroxyethylmethacrylate), poly(N-vinyl-2-pyrrolidone) and poly(acrylonitrile). Polymer 2003; 44(20):6323-6333.
25. Arce A, Fornasiero F, Rodriguez O, Radke C J, and Prausnitz J M. Sorption and transport of water vapor in thin polymer films at 35 [degree]C. Physical Chemistry Chemical Physics 2004; 6(1):103-108.
26. Weinmüller C, Langel C, Fornasiero F, Radke C J, and Prausnitz J M. Sorption kinetics and equilibrium uptake for water vapor in soft-contact-lens hydrogels. Journal of Biomedical Materials Research Part A 2006; 77A(2):230-241.
27. Mamaliga I and Negoescu C. SOME ASPECTS OF TWO STAGE DIFFUSION IN POLYMER FILMS AND MEMBRANES. Environmental Engineering & Management Journal (EEMJ) 2012; 11(11):2091-2099.
28. Sanopoulou M, Roussis P P, and Petropoulos J H. A detailed study of the viscoelosic nature of vapor sorption and transport in a cellulosic polymer. I. Origin and physical implications of deviations from Fickian sorption kinetics. Journal of Polymer Science Part B: Polymer Physics 1995; 33(7):993-1005.
29. Sanopoulou M and Petropoulos J H. Systematic Analysis and Model Interpretation of Micromolecular Non-Fickian Sorption Kinetics in Polymer Films. Macromolecules 2001; 34(5):1400-1410.
30. Berens A R and Hopfenberg H B. Diffusion and relaxation in glassy polymer powders: 2. Separation of diffusion and relaxation parameters. Polymer 1978; 19(5):489-496.
31. Sun Y-M. Sorption/desorption properties of water vapour in poly(2-hydroxyethyl methacrylate): 2. Two-stage sorption models. Polymer 1996; 37(17):3921-3928.
32. Joshi S and Astarita G. Diffusion-relaxation coupling in polymers which show two-stage sorption phenomena. Polymer 1979; 20(4):455-458.
33. Pomerantsev A L. Phenomenological modeling of anomalous diffusion in polymers. Journal of Applied Polymer Science 2005; 96(4):1102-1114.
34. Burgess S K, Kriegel R M, and Koros W J. Diffusion Coefficient Modeling in Polyester Barrier Materials: Applications of Infinite Series Solutions. Society of Plastics Engineers—ANTEC Las Vegas, Nev., 2014. pp. 830-835.
35. Vrentas J S, Jarzebski C M, and Duda J L. A Deborah number for diffusion in polymer-solvent systems. AIChE Journal 1975; 21(5):894-901.
36. Potreck J, Uyar F, Sijbesma H, Nijmeijer K, Stamatialis D, and Wessling M. Sorption induced relaxations during water diffusion in S-PEEK. Physical Chemistry Chemical Physics 2009; 11(2):298-308.
37. Detallante V, Langevin D, Chappey C, Metayer M, Mercier R, and Pinéri M. Kinetics of water vapor sorption in sulfonated polyimide membranes. Desalination 2002; 148(1-3):333-339.
38. Williams J L, Hopfenberg H B, and Stannett V. Water transport and clustering in poly[vinyl cloride], poly [oxymethylene], and other polymers. Journal of Macromolecular Science, Part B 1969; 3(4):711-725.
39. Wellons J D and Stannett V. Permeation, sorption, and diffusion of water in ethyl cellulose. Journal of Polymer Science Part A-1: Polymer Chemistry 1966; 4(3): 593-602.
40. Schult K A and Paul D R. Water sorption and transport in blends of poly(vinyl pyrrolidone) and polysulfone. Journal of Polymer Science Part B: Polymer Physics 1997; 35(4):655-674.
41. Schult K A and Paul D R. Water sorption and transport in a series of polysulfones. Journal of Polymer Science Part B: Polymer Physics 1996; 34(16):2805-2817.
42. Okamoto K-I, Tanihara N, Watanabe H, Tanaka K, Kita H, Nakamura A, Kusuki Y, and Nakagawa K. Sorption and diffusion of water vapor in polyimide films. Journal of Polymer Science Part B: Polymer Physics 1992; 30(11):1223-1231.
43. Petropoulos J H, Sanopoulou M, and Papadokostaki K G. Beyond Fick: How Best to Deal with non-Fickian Behavior in a Fickian Spirit. Diffusion Fundamentals 2009; 11:1-21.
44. Dhoot S N, Freeman B D, Stewart M E, and Hill A J. Sorption and transport of linear alkane hydrocarbons in biaxially oriented polyethylene terephthalate. Journal of Polymer Science Part B: Polymer Physics 2001; 39(11): 1160-1172.
45. Dhoot S N, Freeman B D, and Stewart M E. Sorption and Transport of Linear Esters and Branched Alkanes in Biaxially Oriented Poly(ethylene terephthalate). Industrial & Engineering Chemistry Research 2004; 43(12): 2966-2976.

46. Schult K A and Paul D R. Water sorption and transport in blends of polyethyloxazoline and polyethersulfone. Journal of Polymer Science Part B: Polymer Physics 1997; 35(6):993-1007.
47. Park H. Characterization of Moisture Diffusion into Polymeric Thin Film. Experimental Mechanics 2013; 53(9):1693-1703.
48. Berens A R. Effects of sample history, time, and temperature on the sorption of monomer vapor by PVC. Journal of Macromolecular Science, Part B 1977; 14(4): 483-498.
49. Bagley E and Long F A. Two-stage Sorption and Desorption of Organic Vapors in Cellulose Acetate1,2. Journal of the American Chemical Society 1955; 77(8): 2172-2178.
50. Langevin D, Grenet J, and Saiter J M. Moisture Sorption in PET: Influence on the Thermokinetic Parameters. European Polymer Journal 1994; 30(3):339-345.
51. Launay A, Thominette F, and Verdu J. Water sorption in amorphous poly(ethylene terephthalate). Journal of Applied Polymer Science 1999; 73(7):1131-1137.
52. Michaels A S, Vieth W R, and Barrie J A. Diffusion of Gases in Polyethylene Terephthalate. Journal of Applied Physics 1963; 34(1):13-20.
53. Yasuda H and Stannett V. Permeation, Solution, and Diffusion of Water in Some High Polymers. Journal of Polymer Science 1962; 57:907-923.
54. Henry B M, Erlat A G, McGuigan A, Grovenor C R M, Briggs G A D, Tsukahara Y, Miyamoto T, Noguchi N, and Niijima T. Characterization of transparent aluminium oxide and indium tin oxide layers on polymer substrates. Thin Solid Films 2001; 382(1-2):194-201.
55. Thornton E R, Stannett V, and Szwarc M. The permeation of vapors and liquids through polymer films. Journal of Polymer Science 1958; 28(117):465-468.
56. Hubbell W H, Brandt H, and Munir Z A. Transient and steady-state water vapor permeation through polymer films. Journal of Polymer Science: Polymer Physics Edition 1975; 13(3):493-507.

Part 2. Kinetic Sorption—Supplemental Information

1. Diffusion Model Justification

As stated in the kinetic sorption section (Part 2) of this disclosure, uptake curves generated from the automated VTI instrument exhibited anomalous curvature at short times due primarily to lag introduced by the automated control scheme (cf. FIG. 11 in [1]). Such data were formally modeled using the framework established by Long and Richman [2], which implements an exponential approach to surface concentration at the film surface. The boundary conditions and solution to the transient diffusion equation are reproduced in Equations S1 and S2 below, where l is the film thickness, C is concentration, $D_{Avg}$ is the effective diffusion coefficient averaged over the concentration interval, and $\tau_S$ is the time constant for achieving equilibrium saturation at the film surface.

$$C\left(\pm\frac{l}{2}, t>0\right) = C_1\left(1 - \exp\left(-\frac{t}{\tau_S}\right)\right) \quad (S1)$$

$$\frac{M_t}{M_\infty}\bigg|_{F-Exp} = \left[1 - \exp\left(-\frac{t}{\tau_S}\right)\left(\frac{4\tau_S D_{Avg}}{l^2}\right)^{1/2} \tan\left(\frac{l^2}{4\tau_S D_{Avg}}\right)^{1/2} - \frac{8}{\pi^2}\sum_{n=0}^{\infty} \frac{\exp\left(-D_{Avg}(2n+1)^2 \pi^2 \frac{t}{l^2}\right)}{(2n+1)^2\left(1 - (2n+1)^2\left(\frac{\tau_S D_{Avg} \pi^2}{l^2}\right)\right)}\right] \quad (S2)$$

In the original application of Long and Richman [2], Equations S1 and S2 were implemented to account for non-Fickian relaxations occurring in the polymer during vapor sorption. The model parameter $\tau_S$ therefore represents an intrinsic property of the material, and will vary based on the penetrant/polymer system being investigated. This disclosure differs from the original application, in that Equation S2 is implemented out of convenience to account for the lag introduced by the automated process control scheme of the VTI instrument. The automated VTI instrument operates by mixing two separate nitrogen streams, one completely humidified and the other dry, using differing respective flow rates to achieve the desired water activity. The resultant mixed stream is then split so that half flows into the chamber which contains the sample, and the other half flows into a separate reference chamber which contains an empty quartz basket. Additional details regarding operation of the VTI instrument are provided elsewhere [1, 3].

A secondary cause of the anomalous sorption kinetics observed in this disclosure originates from variability in water concentration at the film surface due to large residence times of the carrier gas inside the sample chamber. This behavior is conceptually similar to that observed for a concentration step change in a continuous stirred tank reactor (CSTR). The residence time ($\tau_{Res}$) for the carrier gas in this disclosure is defined as the volume of the sample chamber (cm$^3$) divided by the volumetric flow rate of the carrier gas (cm$^3$/min). The volume of the chamber is estimated to be ~152 cm$^3$ (~3.8×3.8×10.5 cm), and the combined wet/dry flow rate was automatically set at ~427 cm$^3$/min for all water activities. Calculation of the residence time for the carrier gas inside the sample chamber is straightforward and equals ~43 s (i.e. 152/(427/2)). The value of $\tau_{Res}$ is therefore lower than the value of ~133 s for $\tau_S$ averaged over the entire activity range during sorption and desorption in FIG. 20 in the kinetic sorption section (Part 2) of this disclosure, but still likely contributes to the overall anomalous kinetic behavior. Consequently, the $\tau_S$ parameter in Equation S2 reflects contributions from both the process control lag and the secondary residence time effects associated with a step change in water activity. Additional investigation of this notion is provided in Table S1, which lists $D_{Avg}$ and $\tau_S$ data measured for water in PEF using pure helium and pure argon as the carrier gas, in addition to nitrogen operated at lower flow rates via manual control. All data in Table S1 were measured at 45° C. between the sorption interval of 0.1-0.2 activity.

TABLE S1

$D_{Avg}$ and $\tau_s$ values for water in PEF measured at 45° C. during sorption between 0.1-0.2 water activity. The total flow rate reflects combination of both dry and humid streams, and is split into two separate streams before entering the sample and reference chambers.

| Carrier gas | Total flow rate (cm³/min) | $D_{Avg} \times 10^9$ (cm²/s) | $\tau_S$ (s) | $\tau_{Res}{}^c$ (s) |
|---|---|---|---|---|
| Nitrogen | 427$^a$ | 4.0 | 102 | ~43 |
|  | 213$^b$ | 4.0 | 102 | ~86 |
|  | 106$^b$ | 4.2 | 278 | ~173 |
| Helium | 427$^a$ | 4.2 | 48 | ~43 |
| Argon | 427$^a$ | 3.9 | 70 | ~43 |

$^a$Measurements obtained using automated flow control.
$^b$Measurements obtained using manual flow control.
$^c\tau_{Res} \approx$ (chamber volume)/(carrier gas flow rate in the sample chamber).

As seen from Table S1, values of $D_{Avg}$ and $\tau_S$ are similar in magnitude for all cases, with the possible exception being the $\tau_S$ value measured using the lowest nitrogen flow rate of 106 ccSTP/min. This behavior indicates that neither the carrier gas type nor the flow rate significantly impacts the anomalous contribution to the diffusion process. Furthermore, this behavior is consistent with the notion that the process control lag is the primary cause of the anomalous sorption behavior, with residence time effects likely existing as a secondary cause. These experiments further confirm the utility of Equation S1 and S2 in the this disclosure for removal of the non-physical "instrument-induced" anomalous behavior, thereby allowing extraction of more accurate intrinsic polymer parameters.

2. Quartz Spring Diffusion Coefficient Data at 35° C.

Figure 25:
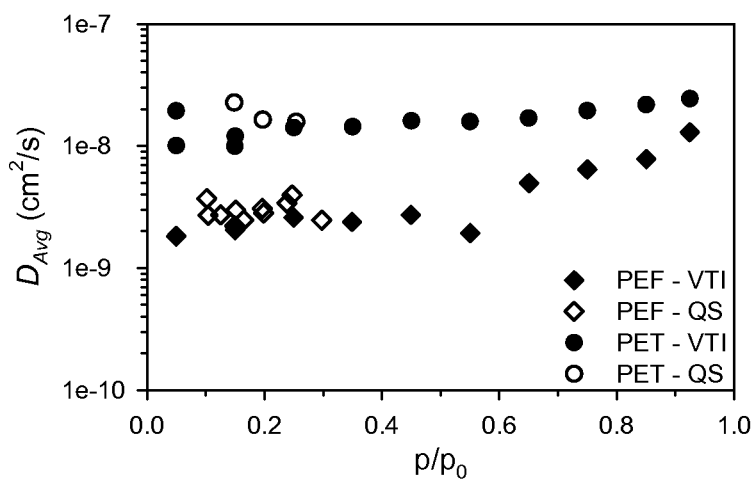
FIG. 25 shows $D_{Avg}$ values for water in PEF (diamonds) and PET (circles) measured at 35° C. by the automated VTI system (solid points) and the manual quartz spring system (QS, hollow points).

Diffusion coefficients obtained during water sorption at 35° C. are provided in FIG. 25 for PEF (diamonds) and PET (circles) measured by the automated VTI system (solid points) and the manual quartz spring system (hollow). The $D_{Avg}$ values in FIG. 25 are plotted at the midpoint of the sorption interval, and exhibit consistency between the two independent methods.

3. Partial Immobilization Model Interpretation

Diffusion of low-activity vapor in glassy polymers can often be described using the partial immobilization model (PIM), which assumes a different mobility exists for penetrant sorbed in the Henry's law environment compared to the Langmuir microvoids [4, 5]. The PIM representation of the diffusion coefficient averaged over a discrete interval is given in Equation S3 [6-8], where $D_D$ is the diffusion coefficient for the Henry's law environment, F is the difference in penetrant mobility between the Langmuir microvoids compared to the Henry's law environment ($D_H/D_D$), p is the penetrant pressure at the beginning of the interval (subscript 1) and end of the interval (subscript 2), b is the Langmuir affinity parameter, and $K = C_H'b/k_D$.

$$D_{Avg} = D_D \left( \frac{1 + \frac{FK}{(1+bp_1)(1+bp_2)}}{1 + \frac{K}{(1+bp_1)(1+bp_2)}} \right) \quad (S3)$$

As discussed in the Part 1 portion of this disclosure, simple dual mode sorption behavior was observed for water at 35° C. in both polyesters up to ~0.6 activity (cf. FIG. 1 in ref [3]). Values of the dual mode model parameters needed to evaluate Equation S3 (i.e. $C_H'$, b, and $k_D$) are provided in Table 2 of ref [3]. The parameter F can vary from zero to one, where the former represents the limit of total penetrant immobilization within the Langmuir microvoids and the latter represents no immobilization. Values of F near zero are common for condensable gas and vapor transport in PET, such as benzene [6] and methanol [9], and it is expected that corresponding parameters for water in PET and PEF will be analogously close to zero. Consequently, values of $F \approx 0$ are assumed for water transport in both polyesters in the subsequent discussions. FIGS. 26a and 26b provide diffusion coefficient data for water in PEF and PET, respectively, at 35° C. during initial sorption testing using the VTI instrument. The solid lines represent the optimized fit of Equation S3 to both respective data sets (with $F \approx 0$), where $D_D \approx 2.6 \times 10^{-9}$ cm²/s for water in PEF and $D_D \approx 1.5 \times 10^{-8}$ cm²/s for water in PET. The dashed line represents 0.6 activity (0.033 atm), which marks the departure from dual mode behavior.

Figure 26:
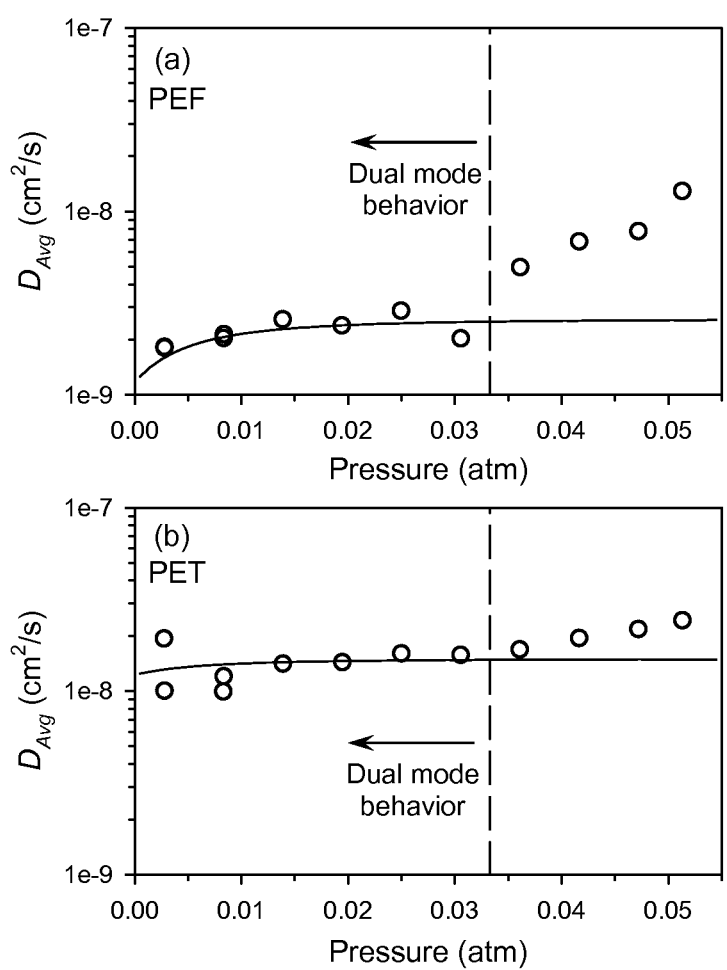
FIG. 26 shows diffusion coefficient data for water at 35° C. in PEF (a) and PET (b) measured by the VTI instrument (taken from FIGS. 22 and 23 of the kinetic sorption portion (Part 2) of this disclosure [1]). The solid lines represent the optimized fits from Equation S3 (F≈0) with $D_D=2.6\times10^{\times9}$ cm²/s for PEF and $D_D=1.5\times10^{-8}$ cm²/s for PET. The dashed lines represent 0.6 activity.
Figure 27:
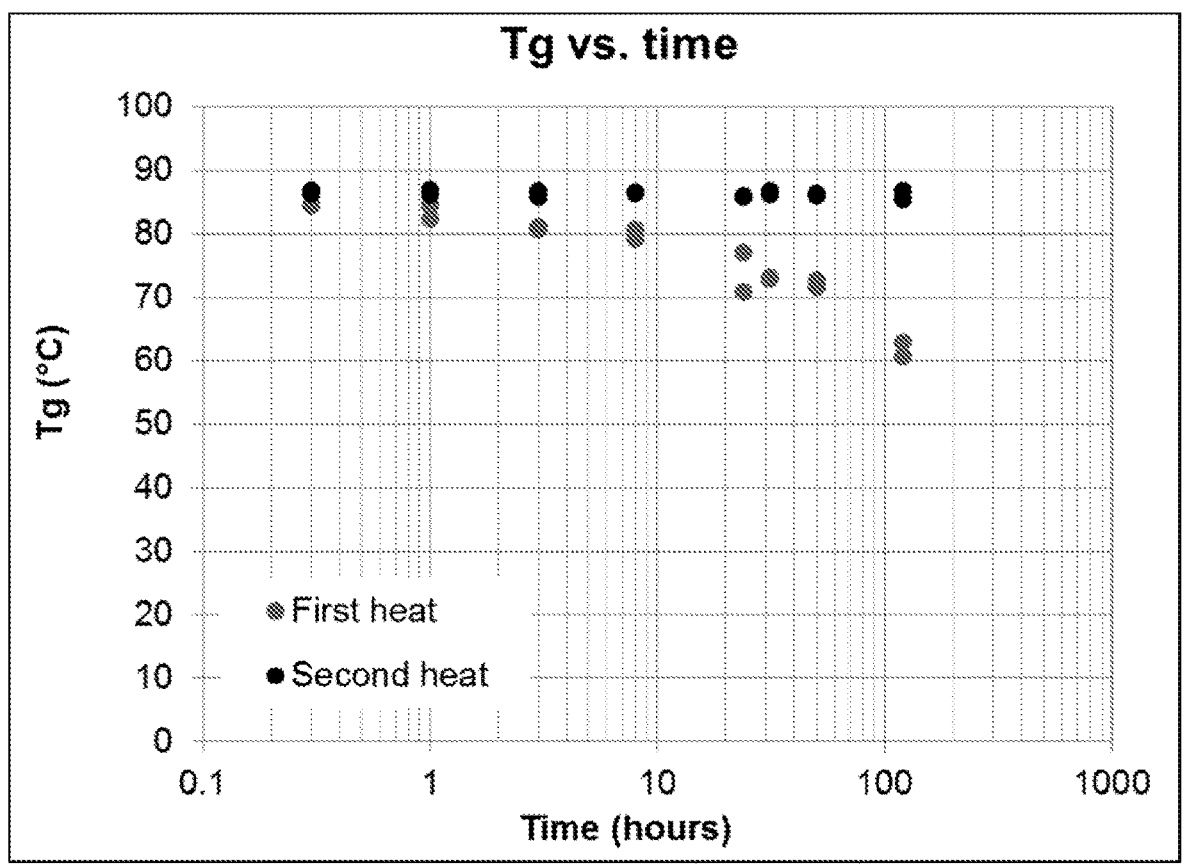
FIG. 27 shows Tg (Glass Transition Temperature) versus Time. The first and second heating cycles are shown on this graph and are tabulated in Tables A and B. The first heat shows that as more water is absorbed into the preform, a greater drop in the glass transition temperature is observed, indicating that the conditioning (or "pre-conditioning") protocol has a plasticizing effect. As the sample is heated, water is removed from the system by heating, and the thermal and processing history is erased upon melting. Therefore, the first heat illustrates properties of the polymer and the processing history, while the second heat only illustrates properties of the polymer. Thus, after first heat the polymer "resets" to a "blank slate" and all properties become the same, regardless of conditioning. This feature indicates that the conditioning effects are completely reversible and are due to water.
Figure 28:
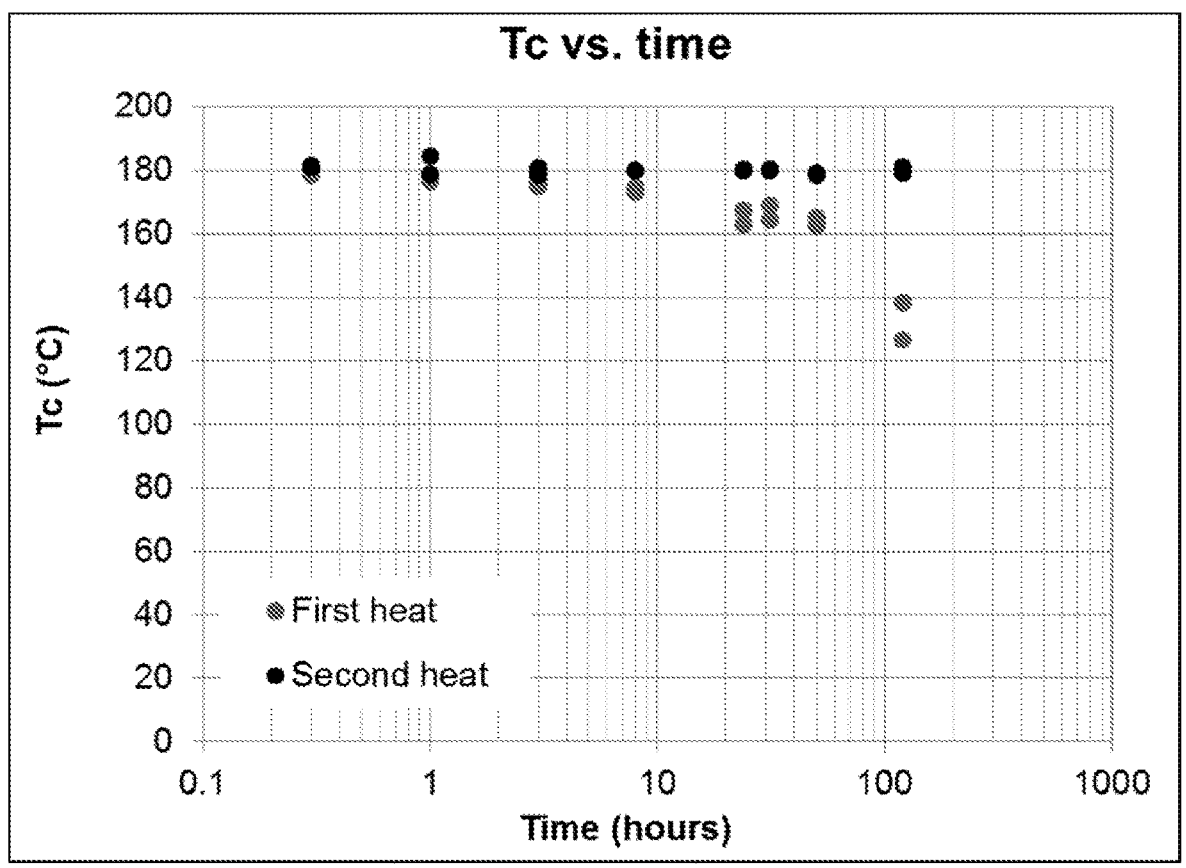
FIG. 28 shows Tc (Crystallization Temperature) versus Time. The crystallization temperature is indicative of a how combinations of chains can move into conformations that will allow for crystallization into a low energy lattice. As water is absorbed, a decrease in the glass transition temperature is seen, which indicates an increase in chain mobility as a function of conditioning time. The reversibility is also demonstrated as before. The samples extracted from the preforms in these experiments were taken across the preform, even though the cross-section exhibited a sandwich-type structure comprising two semi-crystalline outer layers abutting a predominately amorphous inner layer. The data presented in the table include a "smoothing" effect, since the sample included both differentiated layers. The overall conclusion is qualitatively the same, however the data obtained will be a function of how the sample was extracted.
Figure 29:
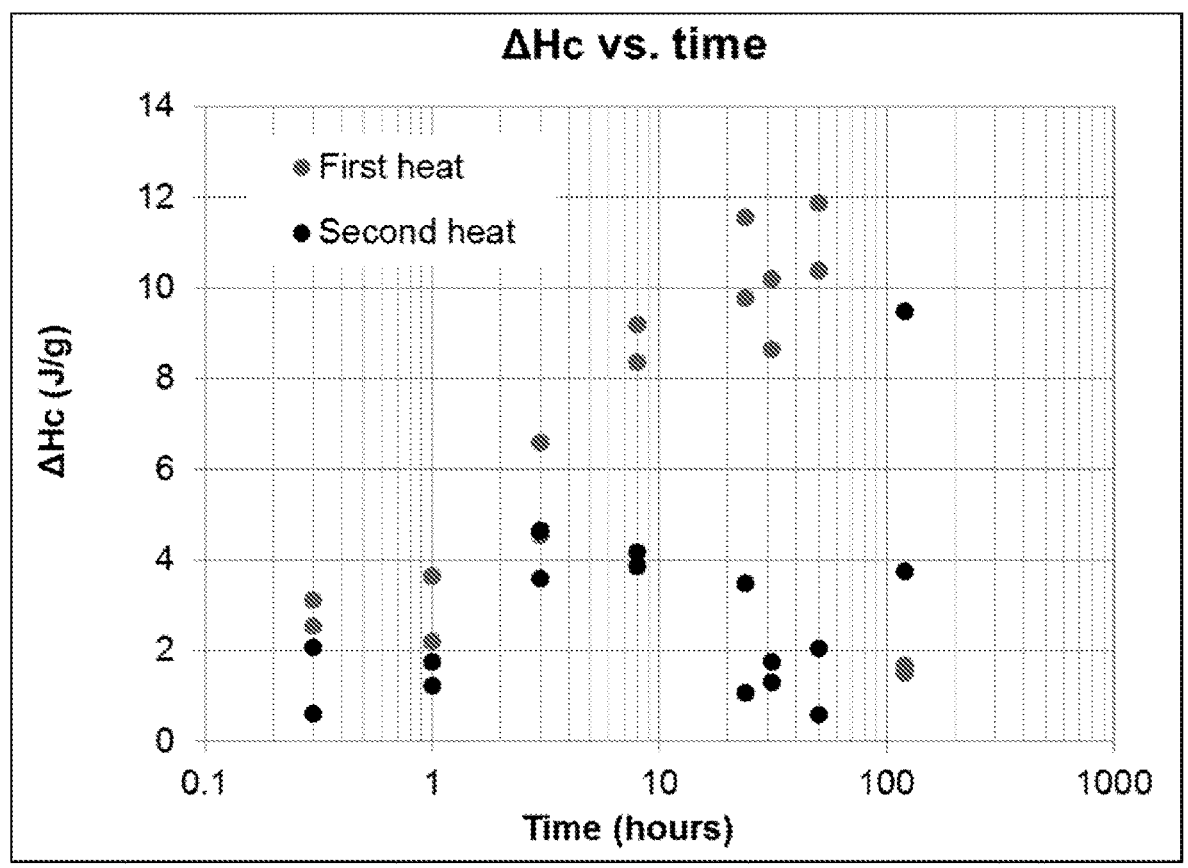
FIG. 29 shows ΔHc (Enthalpy of Crystallization) versus Time. The enthalpy of crystallization is an indication of the extent of crystallization. It can be seen from the graph that the enthalpy of crystallization increases with conditioning time, indicating that greater degrees of crystallization are achieved.
Figure 30:
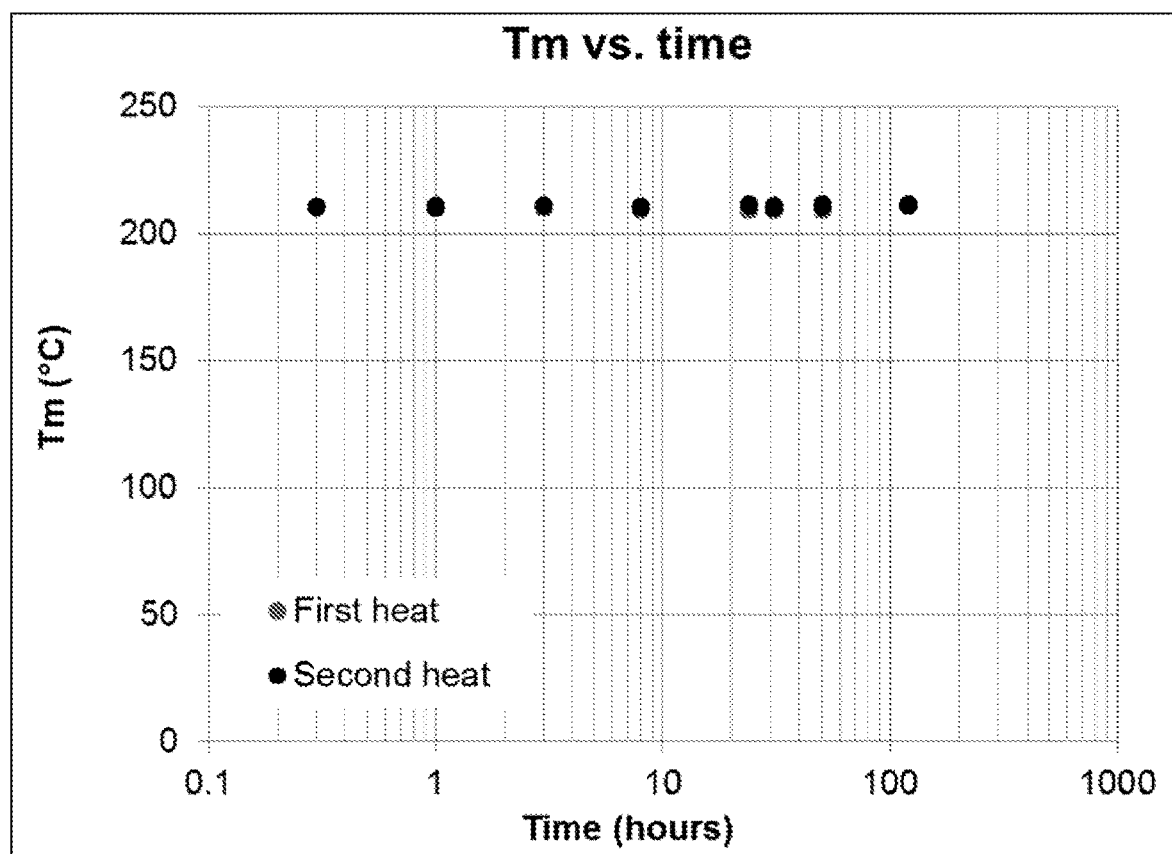
FIG. 30 shows Tm (Melting Temperature) versus Time. Despite the changes observed in the data provided in the figures above, the melting points do not change, indicating that any crystallization that occurs results in the same crystal type and quality.
Figure 31:
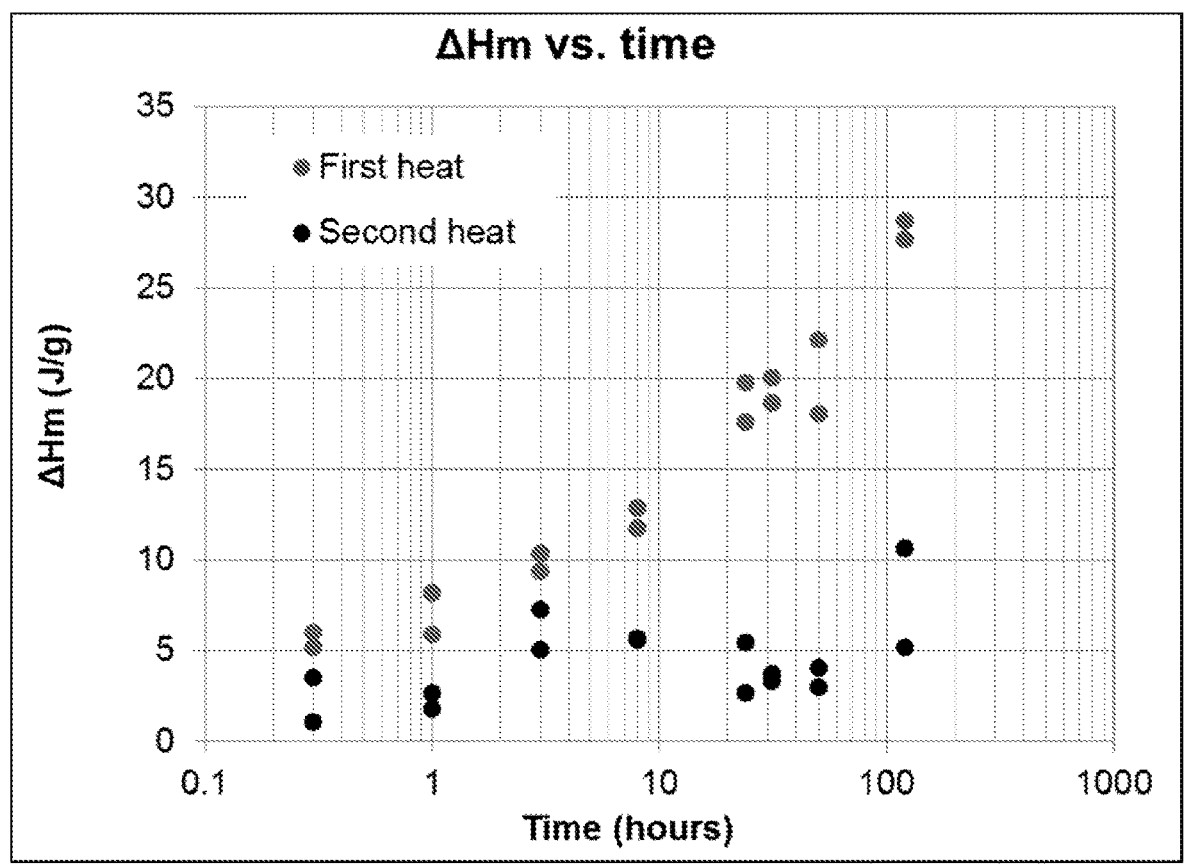
FIG. 31 shows ΔHm (Enthalpy of Melting) versus Time. The enthalpy of melting is also an indication of the extent of crystallization. Subtracting the enthalpy of crystallization from the enthalpy of melting indicates that amount of crystallization that was present in the system before cold crystallization.
Figure 32:
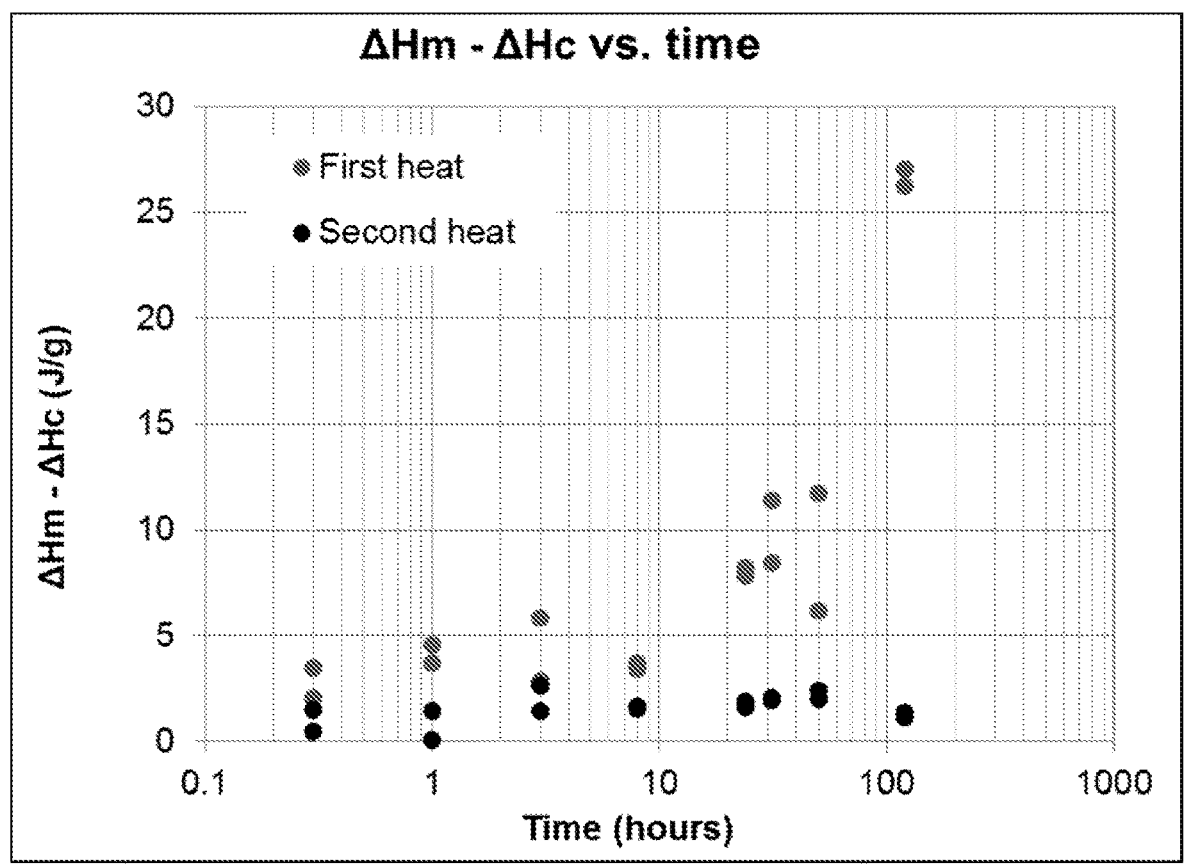
FIG. 32 shows ΔHm (Enthalpy of Melting)–ΔHc (Enthalpy of Crystallization) versus Time. This plot shows the difference in the amount of crystallization that occurred at 80° C. as a function of time. The difference shows that there is significant low temperature crystallization of PEF at 80° C. with water. Control samples without water do not exhibit any of these behaviors.
Figure 33:
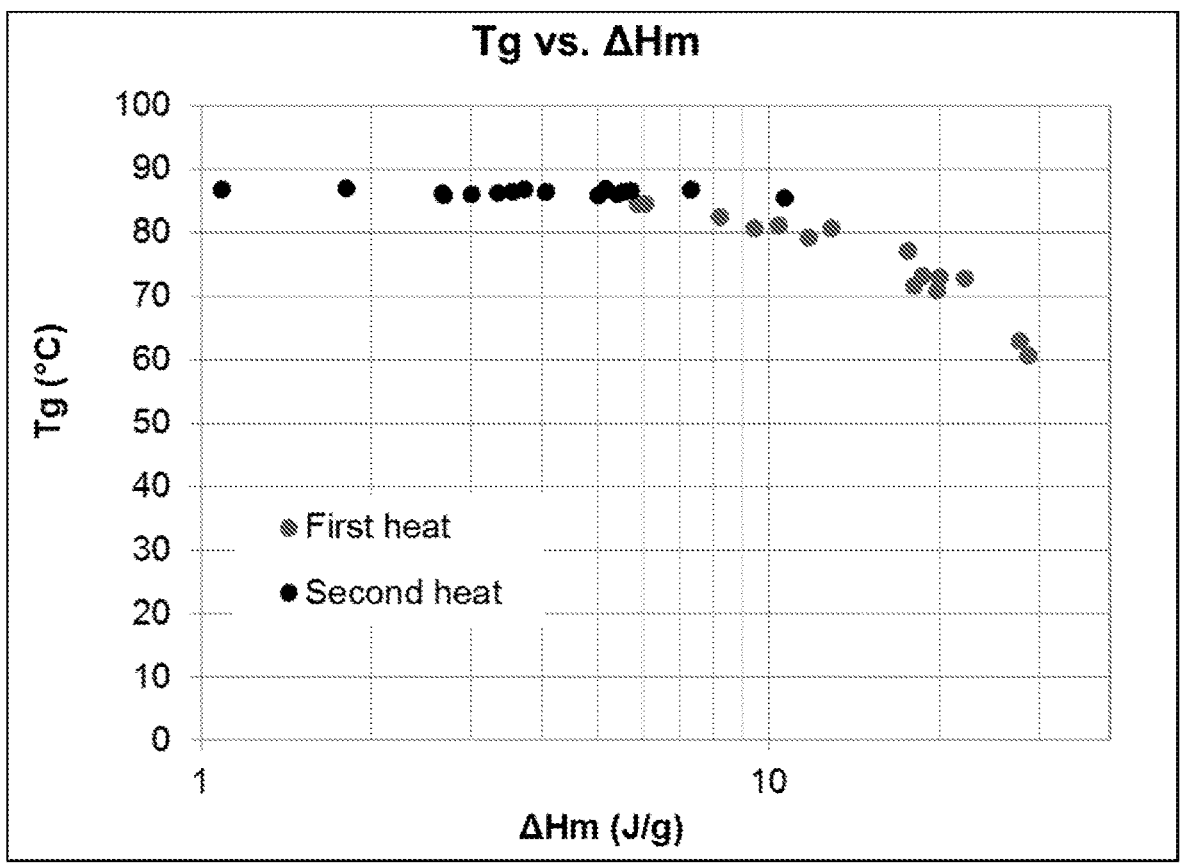
FIG. 33 shows Tg (Crystallization Temperature) versus ΔHm (Enthalpy of Melting). The enthalpy of melting is an indication of the extent of crystallization, and this plot shows how crystallization temperature, which is an indicator of how combinations of chains can move into conformations that will allow for crystallization into a low energy lattice varies with enthalpy of melting for the first heat and the second heat.

As seen in FIG. 26, the departure from simple dual mode behavior occurs at ~0.033 atm (0.6 activity) for both polyesters and is consistent with plasticization-type behavior. However, independent permeation experiments are needed to truly confirm the presence of plasticization and absence of penetrant clustering.

REFERENCES

1. Burgess S K, Mikkilineni D S, Yu D, Kim D J, Mubarak C R, Kriegel R M, and Koros W J. Water Sorption in Poly(ethylene furanoate) Compared to Poly(ethylene terephthalate). Part II: Kinetic Sorption. Polymer 2014;Submitted.
2. Long F A and Richman D. Concentration Gradients for Diffusion of Vapors in Glassy Polymers and their Relation to Time Dependent Diffusion Phenomena1,2. Journal of the American Chemical Society 1960; 82(3):513-519.
3. Burgess S K, Mikkilineni D S, Yu D, Kim D J, Mubarak C R, Kriegel R M, and Koros W J. Water Sorption in Poly(ethylene furanoate) Compared to Poly(ethylene terephthalate). Part I: Equilibrium Sorption. Polymer 2014; Submitted.
4. Petropoulos J H. Quantitative analysis of gaseous diffusion in glassy polymers. Journal of Polymer Science Part A-2: Polymer Physics 1970; 8(10):1797-1801.
5. Paul D R and Koros W J. Effect of Partially Immobilizing Sorption on Permeability and the Diffusion Time Lag. Journal of Polymer Science: Polymer Physics Edition 1976; 14:675-685.
6. Patton C J, Felder R M, and Koros W J. Sorption and transport of benzene in poly(ethylene terephthalate). Journal of Applied Polymer Science 1984; 29(4):1095-1110.
7. Koros W J and Hopfenberg H B. Small Molecule Migration in Products Derived from Glassy Polymers. Industrial & Engineering Chemistry Product Research and Development 1979; 18(4):353-358.
8. Koros W J, Patton C J, Felder R M, and Fincher S J. Kinetics and equilibria of sulfur dioxide sorption in kapton polyimide. Journal of Polymer Science: Polymer Physics Edition 1980; 18(7):1485-1495.
9. Lee J S, Chandra P, Burgess S K, Kriegel R, and Koros W J. An advanced gas/vapor permeation system for barrier materials: Design and applications to poly(ethylene terephthalate). Journal of Polymer Science Part B: Polymer Physics 2012; 50(17):1262-1270.

Part 3. Processing and Plasticizing PEF and PEF Co-Polymer Preforms by Water Sorption Overview In an aspect of the present disclosure, there are provided methods for processing and plasticizing poly(ethylene furanoate) (PEF) and PEF co-polymer preforms by water sorption. There is also disclosed a method of using PEF and PEF co-polymer preforms for fabricating polymer-based packaging, particularly for carbonated beverages. "Packaging material" includes for example a bottle, container, vessel, or receptacle that is made of, comprises, or includes primarily a polymer such as those disclosed herein. Other terms used in this disclosure for polymeric packaging material include, for example, a polymer based package, bottle, container, or vessel; a polymeric package, bottle, container, or vessel, or that is made of, comprises, or includes primarily a polymer such as poly(ethylene furanoate) disclosed herein.

1. Water-Modified PEF and PEF co-polymer Preforms

Among other things, there are provide herein methods for expanding the processing window for poly(ethylene furanoate) (PEF) and poly(ethylene furanoate) co-polymer (PEF co-polymer) polyester preforms such that these preforms can be beneficially used in the fabrication of bottles and containers, including bottles for carbonated soft drinks. For example, water-modified PEF and PEF co-polymer preforms exhibiting an expanded processing window can be made by water sorption according to the disclosure. Typically, water sorption is carried out at ambient or higher temperature water (or high humidity air) for enhanced plasticization of the PEF and PEF co-polymer preform. Thus, modification (plasticization) is carried out on the preform itself after it has been fabricated, typically by injection molding. Particular poly(ethylene furanoate) (PEF) preform characteristics that can be modified by the water sorption process according to the disclosure include, but are not limited to, Tg (glass transition temperature), ΔTg, process window, drying properties, and the like.

1.1 Uptake and Barrier

The solubility of water in PEF is detailed in prior sections of this disclosure. It is demonstrated that PEF has enhanced water solubility and a higher level of water at saturation compared to PET. This difference will make drying more difficult and possibly enhance the probability of adverse reactions during processing, making the discovery of parameters for processing inventive and non-obvious.

Diffusivity of water into and out of PEF resin and films is lower compared to PET. This also makes drying of PEF more difficult compared to PET as described in detail above. Overall, the permeability is the product of diffusion (lower than PET for PEF) and solubility (higher for PEF compared to PET) to give an overall reduction of 2 to 3 times compared to PET. This feature is an indicator that without a special understanding of the differences in their water sorption behavior, conventional PET processes for drying cannot be used for PEF processing, and instead, new methods and technologies need to be developed.

1.2 Activity

As suggested by the data presented herein, the mechanism of transport changes as a function of activity and time. At low concentrations of water or low relative humidity (RH), a standard dual mode model is followed. The mechanism changes at water activities above 0.6 or 60% RH from a dual mode model to a more continuous model, which can be used to advantage in pre-conditioning preforms for use. While not intending to be bound by theory, this observation may indicate clustering of water molecules or water network formation in PEF. This mechanism change likely indicates a change in the relationship and chemistry that occurs between water the polymer chain.

Further, plasticization is indicated most simply by a reduction in Tg. At activities above 0.6 the Tg of PEF drops but the modulus of the material increases. The increase in modulus has been considered as a proxy for anti-plasticization, and therefore the large increase in modulus is an unexpected and surprising result. Again, while not theorybound, the reduction in Tg may be due to water preventing polymer chain-chain interactions or through a lubricating effect such that the energetics of chain mobility are reduced by association with water.

1.3 Process Window

As shown in other Parts of this disclosure, water plasticizes PEF and results in a decrease in Tg temperatures. Again, while not intending to be bound by theory, this Tg decrease could be due to the association of water with the polymer chains and retarding chain-chain interactions and lowering the energy barriers for the chain segments to move. Accordingly, this lowering of the Tg of the resin allows the material to be stretched at lower temperatures than would be possible when the Tg is higher.

The decrease in Tg and enhanced plasticization are realized by treating or contacting the PEF or PEF co-polymer preform with water at ambient or above ambient (hot) temperature, including hot water that is above the glass transition temperature, for a period of time. In one aspect, the time period for contacting the PEF or PEF co-polymer preform with water the time needed to achieve a certain level of water content in the preform, for example, for about 1 minute to about 1 hour with sufficiently hot water. The high temperature treatment and resulting plasticization also allows for the relaxation of any stresses contained in the preform. In one aspect, the body and endcap of the preform are the only parts of the preform that are treated. Generally, the Tg of the material can determine the lower bound of the processing window for stretch blow molding, which defines, in part, the value of the water in the material. The removal of stress by hot water treatment also provides additional value to this method and the resulting product made by this method.

Also shown in other Parts of this disclosure, the modulus of the PEF has been found to increase with moisture content at sub-Tg temperatures. This surprising result has allowed the fabrication of a high strength material when processed according to this disclosure with a high moisture content in the material and the manufactured part. This feature also results in lower creep and greater temperature resistance in the final bottle, container, vessel or article.

In general terms, the process window for stretch blow molding or stretching is determined by the Tg and the crystallization temperature. A typical processing window can be defined from about 5 to 10 degrees above Tg to about 5 to 10 degrees below the crystallization temperature. It has been discovered that water in the PEF of the preform results in a drop in Tg temperature, while not having any significant effect on crystallization temperature or time. Therefore, as a result of the water sorption pre-conditioning process described herein, stretching temperatures can be lowered by treatment of the preform or manufactured article.

1.4 Drying

In an aspect of this disclosure, the shape, crystallinity and diffusion and solubility of water in PEF create challenges for the drying of PEF pellets or chips. The solubility of water in PEF is greater than that of comparable PET chips or pellets and so the amount of water that potentially needs to be removed is greater. The diffusion of water from PEF is approximately 6 to 7 times less than that observed a comparable PET pellet or chip, indicating that the removal of water will be problematic in terms of time and temperature. Further, the lack of drying to a water content of less than 40 to 50 ppm of water in the PEF can result in degradation of the resin, loss of molecular weight and intrinsic viscosity, and poor processing window and poor mechanical performance. Therefore, challenges exist to achieve effective drying or to offset the degradation of the material from the residual water.

In one aspect, it has been found that modifiers can be used to effect drying. Specifically, chain extending additives can be used to offset the effects of residual water in PEF due to insufficient drying. Chain extenders such as anhydrides can react with water and thereby prevent it from reacting with the polymer and reducing the chain length and IV (intrinsic viscosity). In another aspect, epoxide additives can provide the same result. Certain additives such as oxazolines can react with water and provide an unreactive intermediate to chemically dry the material. In addition, these additives can still serve to provide an increase in chain length and IV while scavenging water. Thus, damage to the polymer from unscavenged water that reacts with the main chain of the polymer can be offset by use of these additives. This approach is therefore dual purpose: 1) to remove water or offset hydrolysis damage; and 2) to build IV and modify the physical properties through chain extension or possible branching.

Certain modifiers also may be used to offset solid state polymerization (SSP). Thus, another advanced use of additives can offset the need for solid state polymerization by the use of additives to build IV and molecular weight. The SSP process, if done for long enough periods of time, may result in color formation in the resin and discoloration further during injection molding. Therefore, it is generally desirable to reduce the SSP time to minimize the color of the resin. A typical resin will be solid state polymerized to an IV of 0.8 to 0.95 dL/g from an ex-reactor IV of 0.55 to 0.65 dL/g. The higher the IV desired, the more SSP time will be required. Additives also can be used to build molecular weight so that low IV material in the 0.65 to 0.8 dL/g range can be used for the initial injection molding process but the manufactured parts will have an IV greater than 0.84 dL/g. Preferably, the manufactured parts will have an IV greater than about 0.9 dL/g. The lower starting IV of the resin generally will require more additive to achieve the target IV of the manufactured part, but loadings of chain extending additives in the range of from about 0.02 wt % to about 0.9 wt % can be used effectively in this manner.

2. Thermal Results for Water-Modified PEF Preforms and Other Tests 2.1 Differential Scanning Calorimetry Results Differential Scanning calorimetry (DSC) tests were conducted on PEF preforms that had been pre-conditioned under various conditions of exposure time and water temperature. The results of a first heat DSC scan are presented in Table A, and following cooling of the sample after the first heat, the results of a second heat DSC scan are show in Table B.

TABLE A

Differential Scanning Calorimetry (DSC) Results for First Heat.

| Hot bath treatment time (h) | Run # | $T_g$ (° C.) | $T_C$ (° C.) | $\Delta H_C$ (J/g) | $T_m$ (° C.) | $\Delta H_m$ (J/g) |
|---|---|---|---|---|---|---|
| 0.3 | 1 | 86.66 | 180.42 | 3.132 | 210.49 | 5.166 |
|  | 2 | 84.42 | 178.38 | 2.561 | 210.25 | 6.062 |
| 1 | 1 | 84.4 | 176.47 | 2.203 | 210.28 | 5.898 |
|  | 2 | 82.36 | 178.38 | 3.668 | 210.24 | 8.203 |
| 3 | 1 | 80.74 | 175.18 | 6.585 | 210.32 | 9.434 |
|  | 2 | 81.02 | 176.42 | 4.545 | 210.59 | 10.41 |
| 8 | 1 | 79.28 | 174.77 | 8.357 | 210.34 | 11.78 |
|  | 2 | 80.66 | 173.11 | 9.2 | 209.17 | 12.89 |
| 24 | 1 | 77.12 | 167.28 | 9.783 | 209.36 | 17.61 |
|  | 2 | 70.79 | 162.76 | 11.57 | 209.32 | 19.79 |
| 31 | 1 | 73.17 | 164.49 | 10.22 | 209.08 | 18.66 |
|  | 2 | 73 | 168.79 | 8.667 | 209.47 | 20.05 |
| 50 | 1 | 72.79 | 165 | 10.41 | 209.41 | 22.16 |
|  | 2 | 71.56 | 162.49 | 11.88 | 209.26 | 18.07 |
| 120 | 1 | 60.65 | 126.77 | 1.666 | 211.13 | 28.71 |
|  | 2 | 62.96 | 138.53 | 1.519 | 211.13 | 27.74 |

TABLE B

Differential Scanning Calorimetry (DSC) Results for Second Heat.

| Hot bath treatment time (h) | Run # | $T_g$ (° C.) | $T_C$ (° C.) | $\Delta H_C$ (J/g) | $T_m$ (° C.) | $\Delta H_m$ (J/g) |
|---|---|---|---|---|---|---|
| 0.3 | 1 | 86.69 | 181.44 | 0.6187 | 210.84 | 1.087 |
|  | 2 | 86.37 | 181.13 | 2.064 | 210.7 | 3.54 |
| 1 | 1 | 86.87 | 184.47 | 1.745 | 211 | 1.803 |
|  | 2 | 86.15 | 178.64 | 1.22 | 210.24 | 2.665 |
| 3 | 1 | 85.78 | 180.78 | 3.609 | 211.4 | 5.025 |
|  | 2 | 86.68 | 178.92 | 4.651 | 211.14 | 7.299 |
| 8 | 1 | 86.43 | 180.06 | 3.875 | 210.67 | 5.561 |
|  | 2 | 86.46 | 179.92 | 4.175 | 210.77 | 5.717 |
| 24 | 1 | 85.91 | 179.76 | 3.513 | 211.47 | 5.432 |
|  | 2 | 85.72 | 180.42 | 1.06 | 211.25 | 2.68 |
| 31 | 1 | 86.13 | 180.29 | 1.297 | 210.46 | 3.333 |
|  | 2 | 86.75 | 179.81 | 1.765 | 211 | 3.711 |
| 50 | 1 | 86.01 | 178.98 | 0.6009 | 211.5 | 2.991 |
|  | 2 | 86.42 | 178.58 | 2.052 | 210.94 | 4.046 |
| 120 | 1 | 85.51 | 179.1 | 9.502 | 211.51 | 10.66 |
|  | 2 | 86.67 | 181.18 | 3.762 | 211.35 | 5.162 |

The Tables A and B data obtained from the first and second heats are presented graphically in FIGS. 27-33, which provide a dramatic presentation of the characteristics that result upon water sorption, including the apparent mechanism change at water activities above 0.6 (or 60% RH) from a dual mode model to a more continuous model. A review of the data from Tables A and B and FIGS. 27-33 provides the following observations. First, as the hot water treatment time increases, reductions in the values of $T_g$ and $T_c$ during the first heat were observed. Measurements in $\Delta H$ values were also made, as the hot water treatment time increases, higher ($\Delta H_m$-$\Delta H_c$) values were measured. Further, generally crystallization was too slow at 160° C. such that no signal maximum was reached during the duration of the experiment.

Accordingly, as can be seen from the data above, the present disclosure provides among other things for a method for pre-conditioning a poly(ethylene furanoate) or poly (ethylene furanoate) co-polymer preform for stretch blow-molding, the method comprising:

a) providing a poly(ethylene furanoate) (PEF) or poly(ethylene furanoate) co-polymer (PEF co-polymer) preform; and
b) at a temperature greater than or equal to ambient temperature, contacting the PEF or PEF co-polymer preform with water or high (>50%) relative humidity air for a time period to form a pre-conditioned PEF or PEF co-polymer preform.

In one aspect, the PEF or PEF co-polymer preform can be contacted with at least about 65% relative humidity air at a temperature greater than about 45° C. for a time period from about 0.25 h to about 72 h. In other aspects, the PEF or PEF co-polymer preform can be contacted with at least about 90% relative humidity air at a temperature greater than about 50° C. for a time period from about 0.5 h to about 20 h. Alternatively, the PEF or PEF co-polymer preform can be contacted with room temperature water for a time period from about 3 h to about 30 h, or alternatively still, the PEF or PEF co-polymer preform can be contacted with water at a temperature of about 80° C. for up to about 15 h. This disclosure also provides a pre-conditioned poly(ethylene furanoate) (PEF) or poly(ethylene furanoate) co-polymer (PEF co-polymer) preform that is made according to the disclosed methods.

In addition to methods of making a preform, there is also provided a method for making a poly(ethylene furanoate) or poly(ethylene furanoate) co-polymer container, the method comprising:
a) pre-conditioning a poly(ethylene furanoate) (PEF) or poly(ethylene furanoate) co-polymer (PEF co-polymer) preform for stretch blow-molding according to any of the methods disclosed herein to form a pre-conditioned PEF or PEF co-polymer preform; and
b) stretch blow-molding the pre-conditioned PEF or PEF co-polymer preform to form a PEF or PEF co-polymer container at a temperature, a pressure, or both that is/are lower than the corresponding temperature, pressure, or both needed to stretch blow-mold a comparable non-pre-conditioned PEF or PEF co-polymer preform.

In this aspect, the PEF or PEF co-polymer preform can also be pre-conditioned by any of the methods disclosed herein. For example, the PEF or PEF co-polymer preform can be pre-conditioned by contacting with at least about 65% relative humidity air at a temperature greater than about 45° C. for a time period from about 0.25 h to about 72 h. In other aspects, the PEF or PEF co-polymer preform can be contacted with at least about 90% relative humidity air at a temperature greater than about 50° C. for a time period from about 0.5 h to about 20 h. Alternatively, the PEF or PEF co-polymer preform can be contacted with room temperature water for a time period from about 3 h to about 30 h, or alternatively still, the PEF or PEF co-polymer preform can be contacted with water at a temperature of about 80° C. for up to about 15 h. This disclosure also provides a poly(ethylene furanoate) (PEF) or poly(ethylene furanoate) co-polymer (PEF co-polymer) container or bottle that is made according to the disclosed methods.

In some embodiments, a PEF or PEF co-polymer preform is conditioned using about 50%, 55%, 60%, 65%, 70%, 75%, 80%, 85%, 90%, 91%, 92%, 93%, 94%, 95%, 96%, 97%, 98%, 99%, or 100% relative humidity air. Moreover, the relative humidity percentages can be increased at a value between any of these numbers, inclusive. This parameter can be adjusted independently of or simultaneously with any other parameter. In some embodiments, a PEF or PEF co-polymer preform is conditioned at a temperature of about 15, 20, 25, 30, 35, 40, 45, 50, 55, 60, 65, 70, 75, 80, 85, 90, 95, 100, 105, 110, 115, 120, 125, 130, 135, 140, 145, 150, 155, 160, 165, 170, 175, 180, or 185° C. Moreover, the temperature can be increased at a value between any of these numbers, inclusive. This parameter can be adjusted independently or simultaneously with any other parameter. In some embodiments, a PEF or PEF co-polymer preform is conditioned over a time period of about 0.25, 0.5, 0.75, 1, 1.5, 2, 2.5, 3, 4, 5, 6, 7, 8, 9, 10, 15, 20, 25, 30, 35, 40, 45, 50, 55, 60, 65, 70, 75, 80, or more hours. Moreover, the time period can be increased at a value between any of these numbers, inclusive. This parameter can be adjusted independently or simultaneously with any other parameter.

2.2 Additional Testing

Thermal properties ($T_g$ and $T_c$) generally provide indications of plasticization effects but also help define the bottom of the processing window. The data suggest a depression in the $T_g$ as a function of water content and equilibrium time. Stress patterns as visualized by photography through crossed polarizers can give an indication of stress in the preform and the degree of stress. The density and number of stress fringes generally are indicative of the degree of stress. The release of stress can be demonstrated, for example, by the reduction in the number of fringes or the substantial elimination of fringes, which may be attributable to time and temperature for hot molding or top accelerated aging for water plasticized preforms at lower water temperatures. The free blow data may provide the indication of release of stresses, which reduces the induction time needed before expansion, the rate of expansion and the final expansion values (i.e., stretch ratio).

The effect of stress and water on the differential stretch properties between axial and hoop directions are also of interest, and reduction in the stress level generally reduces the induction time, increases the rate of stretch and reduces the differential between axial and hoop stretch. Plasticization can have similar effects. Density measurements may be used to provide an indication of the amount and degree of crystallization during stretching, and density and degree of crystallization of the preforms indicates the level of strain hardening. Disks from free blow balloons may be tested for oxygen and $CO_2$ barrier properties, which in turn may provide an indication of the effects of mold temperature, stress, and process on the finished articles. Further, intrinsic viscosity can show the level of degradation during injection molding and provide a quick point of reference for the effects of mold and water on the preform. Instron testing on the free blow balloons and bottle side walls may be used to show the effect of axial and hoop stress and the impact of mold temperature and water content.

The present disclosure is further illustrated by the following examples, which are not to be construed in any way as imposing limitations upon the scope thereof. The examples are set forth to illustrate the disclosed subject matter and are not intended to be inclusive of all aspects of the subject matter disclosed herein, but rather to illustrate representative methods and results. These examples are not intended to exclude equivalents and variations of the present invention which are apparent to one skilled in the art.

EXAMPLES

Example 1

Preforms are produced using standard process and equipment and are stored in conditions (for example, in a condi tioning or "pre-conditioning" room) having a controlled relative humidity and temperature. The preforms are stored under conditions and in a manner that permits rapid and even exposure to the controlled relative humidity and temperature. Exposure time is based on the time sufficient to provide the desired properties, such as based on the data as provided herein.

Example 2

Preforms are produced using standard process and equipment and are stored in tank of water or "water bath" for specified periods of time (typically, about 1 to about 15 hours) and at a selected temperature. The preforms are stored in the water bath and the water is maintained at the desired temperature and properly circulated to promote even conditioning of the preforms. After the desired contract time, the preforms are removed from the water, tumbled to remove trapped water in the preform, and surface water is quickly removed via air knife or fan just prior to blow molding.

Example 3

Preforms are produced using standard process and equipment and are transferred to a jig in which they are held by the inside and outside of the finish section. The jig provides a means of exposure of the inside of the preform to high temperature water (circulating) and also allows for exposure of the outside of the preform to high temperatures and high relative humidity (>50%), or alternatively, exposure to bulk water at elevated temperature. After exposure to these conditions for the desired contact time and temperature, the preforms are removed from the jig, tumbled to remove bulk water, and surface water can be removed via air knife or fan and then immediately blown into bottles by stretch blow molding.

Example 4

Figure 34:
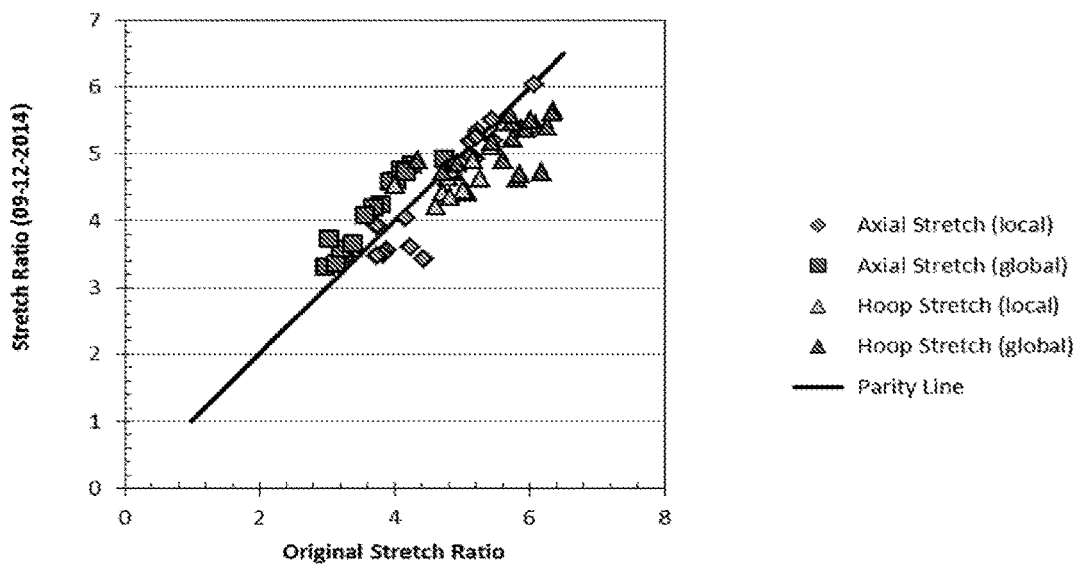
FIG. 34 shows the moisture effect on stretch ratios of a preform.

Table C and FIG. 34 provide data showing the moisture effect on stretch ratios of the preform in accordance with this disclosure.

TABLE C

| Status | Preform | Axial Stretch Ratio (Local) | | Axial Stretch Ratio (Global) | | Hoop Stretch Ratio (Local) | | Hoop Stretch Ratio (Global) | |
|---|---|---|---|---|---|---|---|---|---|
| | | Original Value | Value (9/12/14) | Original Value | Value (9/12/14) | Original Value | Value (9/12/14) | Original Value | Value (9/12/14) |
| Blow out | CT-10032-1 | 5.46 | 5.20 | 3.79 | 4.25 | 4.79 | 4.65 | 5.74 | 5.24 |
| Blow out | CT-10032-1 | 5.12 | 5.19 | 4.02 | 4.61 | 5.16 | 4.90 | 6.27 | 5.41 |
| Stretch, blow out | CT-10032-1 | 5.20 | 4.92 | 3.68 | 4.21 | 5.27 | 4.64 | 5.95 | 5.37 |
| Pressure low, did not stretch | CT-10032-1 | 5.23 | 5.34 | 3.94 | 4.58 | 4.90 | 4.72 | 5.75 | 5.47 |
| Pressure low, did not stretch | CT-10032-1 | 5.22 | 5.24 | 4.26 | 4.85 | 4.79 | 4.78 | 6.35 | 5.66 |
| Pressure low, did not stretch | CT-10032-1 | 6.06 | 6.04 | 4.73 | 4.92 | 5.63 | 5.47 | 6.33 | 5.61 |
| Stretch, blow out | CT-10032-1 | 5.13 | 4.96 | 3.56 | 4.08 | 4.82 | 4.77 | 5.44 | 5.19 |
| Stretch, blow out | CT-10032-1 | 5.88 | 5.38 | 4.10 | 4.77 | 6.09 | 5.43 | 5.71 | 5.59 |
| Stretch, blow out | CT-10032-1 | 5.44 | 5.50 | 4.16 | 4.73 | 5.42 | 5.11 | 6.02 | 5.51 |
| Stretch, blow out | CT-10029-1 | 4.17 | 4.04 | 3.36 | 3.59 | 4.87 | 4.85 | 5.60 | 4.91 |
| Stretch, blow out | CT-10029-1 | 3.88 | 3.56 | 2.98 | 3.32 | 4.71 | 4.42 | 5.81 | 4.64 |
| Stretch, blow out | CT-10029-1 | 4.23 | 3.61 | 3.24 | 3.52 | 5.08 | 4.42 | 6.17 | 4.73 |
| Stretch, blow out | CT-10029-1 | 3.83 | 3.49 | 3.14 | 3.37 | 4.61 | 4.21 | 4.72 | 4.73 |
| Stretch, blow out | CT-10029-1 | 4.43 | 3.43 | 3.21 | 3.59 | 5.01 | 4.45 | 5.86 | 4.70 |
| Stretch, blow out | CT-10029-1 | 3.74 | 3.92 | 3.03 | 3.74 | 4.01 | 4.54 | 4.35 | 4.90 |

TABLE C-continued

| Status | Preform | Axial Stretch Ratio (Local) | | Axial Stretch Ratio (Global) | | Hoop Stretch Ratio (Local) | | Hoop Stretch Ratio (Global) | |
|---|---|---|---|---|---|---|---|---|---|
| | | Original Value | Value (9/12/14) | Original Value | Value (9/12/14) | Original Value | Value (9/12/14) | Original Value | Value (9/12/14) |
| Stretch, blow out | CT-10029-1 | 3.73 | 3.47 | 3.39 | 3.67 | 4.82 | 4.36 | 4.93 | 4.86 |
| Pressure low, did not stretch | CT-10029-1 | | | | | | | | |
| Pressure low, did not stretch | CT-10029-1 | | | | | | | | |
| Pressure low, did not stretch | CT-10029-1 | | | | | | | | |
| Pressure low, did not stretch | CT-10029-1 | | | | | | | | |
| Pressure low, did not stretch | CT-10029-1 | | | | | | | | |
| Blow out | CT-10029-1 | | | | | | | | |

Values or ranges may be expressed herein as "about", from "about" one particular value, and/or to "about" another particular value. When such values or ranges are expressed, other embodiments disclosed include the specific value recited, from the one particular value, and/or to the other particular value. Similarly, when values are expressed as approximations, by use of the antecedent "about," it will be understood that the particular value forms another embodiment. It will be further understood that there are a number of values disclosed herein, and that each value is also herein disclosed as "about" that particular value in addition to the value itself. In aspects, "about" can be used to mean within 10% of the recited value, within 5% of the recited value, or within 2% of the recited value.

Any headings that may be employed herein are also not intended to be used to construe the scope of the claims or to limit the scope of the subject matter that is disclosed herein. Any use of the past tense to describe an example otherwise indicated as constructive or prophetic is not intended to reflect that the constructive or prophetic example has actually been carried out.

Unless indicated otherwise, when a range of any type is disclosed or claimed, for example a range of weight percentages, processing times, and the like, it is intended that the stated range disclose or claim individually each possible number that such a range could reasonably encompass, including any sub-ranges and combinations of sub-ranges encompassed therein. For example, when describing a range of measurements such as weight percentages, every possible number that such a range could reasonably encompass can, for example, refer to values within the range with one significant digit more than is present in the end points of a range. In this example, a weight percentage between 10 percent and 20 percent includes individually 10, 11, 12, 13, 14, 15, 16, 17, 18, 19, and 20 weight percent. Applicant's intent is that these two methods of describing the range are interchangeable. Moreover, when a range of values is disclosed or claimed, which Applicants intent to reflect individually each possible number that such a range could reasonably encompass, Applicants also intend for the disclosure of a range to reflect, and be interchangeable with, disclosing any and all sub-ranges and combinations of sub-ranges encompassed therein. Applicants reserve the right to proviso out or exclude any individual members of any such group, including any sub-ranges or combinations of sub-ranges within the group, if for any reason Applicants choose to claim less than the full measure of the disclosure, for example, to account for a reference that Applicants are unaware of at the time of the filing of the application.

In any application before the United States Patent and Trademark Office, the Abstract of this application is provided for the purpose of satisfying the requirements of 37 C.F.R. § 1.72 and the purpose stated in 37 C.F.R. § 1.72(b) "to enable the United States Patent and Trademark Office and the public generally to determine quickly from a cursory inspection the nature and gist of the technical disclosure." Therefore, the Abstract of this application is not intended to be used to construe the scope of the claims or to limit the scope of the subject matter that is disclosed herein. Moreover, any headings that are employed herein are also not intended to be used to construe the scope of the claims or to limit the scope of the subject matter that is disclosed herein.

Any use of the past tense to describe an example otherwise indicated or understood as constructive or prophetic is not intended to reflect that the constructive or prophetic example has actually been carried out.

The following numbered clauses are provided which describe aspects according to this disclosure, which state various attributes, features, and embodiments of the present invention both independently, or in any combination when the context allows. That is, as the context allows, any single numbered aspect and any combination of the following numbered aspects disclose the various attributes, features, and embodiments of the present disclosure.

We claim:

1. A method of pre-conditioning a poly(ethylene furanoate) or poly(ethylene furanoate) co-polymer preform for stretch blow-molding, the method comprising:
   a) providing or having a poly(ethylene furanoate) (PEF) or poly(ethylene furanoate) co-polymer (PEF co-polymer) preform; and
   b) contacting the PEF or PEF co-polymer preform with liquid water at a temperature of about 80° C. for up to about 15 h; and
   c) drying the PEF or PEF co-polymer preform to a water concentration of less than 40 to 50 ppm of water in the PEF or PEF co-polymer preform.

2. The method of claim 1, wherein the PEF or PEF co-polymer preform comprises a modifier that offsets the effects of residual water in the PEF or PEF co-polymer preform or reduces solid state polymerization time.

3. The method of claim 2, wherein the modifier extends chain length of PEF or PEF co-polymer in the PEF or PEF co-polymer preform.

4. The method of claim 2, wherein the modifier is an anhydride, epoxide, or oxazoline.

5. The method of claim 2, wherein the modifier increases intrinsic viscosity or molecular weight of PEF or PEF co-polymer in the PEF or PEF co-polymer preform.

6. The method of claim 2, wherein the modifier constitutes about 0.02 wt % to about 0.9 wt % of the PEF or PEF co-polymer preform.

7. The method of claim 1, further comprising subjecting the PEF or PEF co-polymer preform to a solid state polymerization (SSP) process so as to increase an average intrinsic viscosity to form a PEF or PEF co-polymer preform having an average intrinsic viscosity (IV) greater than or equal to about 0.8 dl/g.

8. The method of claim 1, wherein the pre-conditioned PEF or PEF co-polymer preform has a lower glass transition temperature relative to an unconditioned PEF or PEF co-polymer preform.

9. The method of claim 1, further comprising the following steps after the contacting step and before the drying step:
   i) removing the PEF or PEF co-polymer preform from the liquid water;
   ii) tumbling the PEF or PEF co-polymer preform to remove trapped water in the PEF or PEF co-polymer preform; and
   iii) removing surface water from the PEF or PEF co-polymer preform using an air-knife or a fan.

10. A pre-conditioned poly(ethylene furanoate) (PEF) or poly(ethylene furanoate) co-polymer (PEF co-polymer) preform made according to claim 1.

11. A method for making a poly(ethylene furanoate) or poly(ethylene furanoate) co-polymer container, the method comprising:
   a) pre-conditioning a poly(ethylene furanoate) (PEF) or poly(ethylene furanoate) co-polymer (PEF co-polymer) preform according to claim 1 to form a pre-conditioned PEF or PEF co-polymer preform; and
   b) stretch blow-molding the pre-conditioned PEF or PEF co-polymer preform to form a PEF or PEF co-polymer container.

12. The method of claim 11, wherein the stretch blow-molding step occurs in a process window that is defined from about 5° C. above the glass transition temperature of the pre-conditioned PEF or PEF co-polymer preform to about 5° C. below the crystallization temperature of the pre-conditioned PEF or PEF co-polymer preform.

13. The method of claim 11, wherein the pre-conditioned PEF or PEF co-polymer preform is stretch blow-molded to form the PEF or PEF co-polymer container at a temperature, a pressure, or both that is/are lower than the corresponding temperature, pressure, or both needed to stretch blow-mold a comparable non-pre-conditioned PEF or PEF co-polymer preform.

14. The method of claim 11, wherein surface water on the PEF or PEF co-polymer preform is removed using an air-knife or a fan just prior to stretch blow-molding the pre-conditioned PEF or PEF co-polymer preform.

15. A poly(ethylene furanoate) (PEF) or poly(ethylene furanoate) co-polymer (PEF co-polymer) container made according to claim 11.

* * * * *